US008059109B2

(12) United States Patent
Yamazaki et al.

(10) Patent No.: US 8,059,109 B2
(45) Date of Patent: Nov. 15, 2011

(54) DISPLAY DEVICE AND ELECTRONIC APPARATUS

(75) Inventors: Shunpei Yamazaki, Tokyo (JP); Jun Koyama, Kanagawa (JP); Yoshifumi Tanada, Kanagawa (JP); Mitsuaki Osame, Kanagawa (JP); Hajime Kimura, Kanagawa (JP); Ryota Fukumoto, Kanagawa (JP); Hiromi Yanai, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1049 days.

(21) Appl. No.: 11/382,622

(22) Filed: May 10, 2006

(65) Prior Publication Data

US 2011/0181786 A1 Jul. 28, 2011

(30) Foreign Application Priority Data

May 20, 2005 (JP) ................................ 2005-148833

(51) Int. Cl.
*G06F 3/038* (2006.01)
*G09G 5/00* (2006.01)

(52) U.S. Cl. ........................................ 345/204; 345/207

(58) Field of Classification Search ........................ None
See application file for complete search history.

(56) References Cited

U.S. PATENT DOCUMENTS 3,838,209 A 9/1974 Tsuchiya et al.
4,386,345 A 5/1983 Narveson et al.
5,168,270 A * 12/1992 Masumori et al. ............ 345/100
5,333,243 A 7/1994 Best et al.
5,363,118 A 11/1994 Okumura
5,406,305 A 4/1995 Shimomura et al.
5,489,918 A 2/1996 Mosier
5,523,772 A * 6/1996 Lee ................................ 345/98
5,585,856 A * 12/1996 Nakaya et al. ................ 348/441

(Continued)

FOREIGN PATENT DOCUMENTS

EP 1 103 946 A2 5/2001

(Continued)

OTHER PUBLICATIONS

Hajime Washio et al.; "TFT-LCDs with Monolithic Multi-Drivers for High Performance Video and Low-Power Text Modes"; *SID Digest '01 : SID International Symposium Digest of Technical Papers*; pp. 276-279; Jan. 1, 2001.

(Continued)

*Primary Examiner* — Amare Mengistu
*Assistant Examiner* — Antonio Xavier
(74) *Attorney, Agent, or Firm* — Fish & Richardson P.C.

(57) ABSTRACT

To provide a display device whose display can be recognized even in dark places or under the strong outside light. The display device performs display by controlling the number of gray scales in accordance with the intensity of outside light, which means a display mode can be switched in accordance with the data to be displayed on the display screen. A video signal generation circuit is controlled in each display mode in such a manner that it directly outputs an input video signal with an analog value, outputs a signal with a binary digital value, or outputs a signal with a multivalued digital value. As a result, gray scales displayed in pixels are timely changed. Accordingly, clear images can be displayed while maintaining high visibility in various environments, in the wide range from, for example, dark places or indoors (e.g., under a fluorescent lighting) to outdoors (e.g., under the sunlight).

50 Claims, 39 Drawing Sheets

U.S. PATENT DOCUMENTS

| | | | | |
|---|---|---|---|---|
| 5,705,424 | A | 1/1998 | Zavracky et al. | |
| 5,744,864 | A | 4/1998 | Cillessen et al. | |
| 5,818,419 | A | 10/1998 | Tajima et al. | |
| 5,867,140 | A | 2/1999 | Rader | |
| 5,933,130 | A | 8/1999 | Wagner | |
| 6,037,917 | A | 3/2000 | Kawakami | |
| 6,040,812 | A | 3/2000 | Lewis | |
| 6,088,012 | A | 7/2000 | Shigeta et al. | |
| 6,201,535 | B1 * | 3/2001 | Hwang | 345/213 |
| 6,229,505 | B1 | 5/2001 | Fujii | |
| 6,339,422 | B1 | 1/2002 | Kuwajima et al. | |
| 6,396,508 | B1 | 5/2002 | Noecker | |
| 6,414,661 | B1 | 7/2002 | Shen et al. | |
| 6,417,824 | B1 | 7/2002 | Tokunaga et al. | |
| 6,462,726 | B1 * | 10/2002 | Hamada et al. | 345/98 |
| 6,504,522 | B2 | 1/2003 | Shiraki et al. | |
| 6,552,736 | B2 | 4/2003 | Honda et al. | |
| 6,646,625 | B1 | 11/2003 | Shigeta et al. | |
| 6,678,834 | B1 | 1/2004 | Aihara et al. | |
| 6,693,614 | B2 | 2/2004 | Kamiya et al. | |
| 6,738,036 | B2 | 5/2004 | Janssen et al. | |
| 6,753,918 | B1 * | 6/2004 | Kanayama | 348/335 |
| 6,784,898 | B2 | 8/2004 | Lee et al. | |
| 6,806,859 | B1 | 10/2004 | Kanoh et al. | |
| 6,970,121 | B1 * | 11/2005 | Sun | 341/144 |
| 7,061,014 | B2 | 6/2006 | Hosono et al. | |
| 7,286,105 | B2 | 10/2007 | Akimoto et al. | |
| 7,487,273 | B2 | 2/2009 | Kobayashi | |
| 7,515,126 | B2 | 4/2009 | Senda et al. | |
| 7,636,078 | B2 | 12/2009 | Yamazaki et al. | |
| 2001/0005193 | A1 | 6/2001 | Yokoyama | |
| 2001/0005196 | A1 | 6/2001 | Ishii | |
| 2001/0011989 | A1 | 8/2001 | Hayashi | |
| 2001/0017609 | A1 * | 8/2001 | Okumura et al. | 345/98 |
| 2001/0022565 | A1 | 9/2001 | Kimura | |
| 2001/0033252 | A1 | 10/2001 | Yamazaki et al. | |
| 2002/0000969 | A1 | 1/2002 | Ozawa | |
| 2002/0011978 | A1 | 1/2002 | Yamazaki et al. | |
| 2002/0012006 | A1 * | 1/2002 | Yamada et al. | 345/660 |
| 2002/0015043 | A1 | 2/2002 | Matsuda | |
| 2002/0024529 | A1 | 2/2002 | Miller et al. | |
| 2002/0036612 | A1 | 3/2002 | Miyajima et al. | |
| 2002/0036613 | A1 | 3/2002 | Yokoyama et al. | |
| 2002/0047568 | A1 | 4/2002 | Koyama | |
| 2002/0047852 | A1 | 4/2002 | Inukai et al. | |
| 2002/0056838 | A1 | 5/2002 | Ogawa | |
| 2002/0075249 | A1 * | 6/2002 | Kubota et al. | 345/204 |
| 2002/0089481 | A1 | 7/2002 | Tsutsui et al. | |
| 2002/0109659 | A1 | 8/2002 | Hiroki | |
| 2002/0132454 | A1 | 9/2002 | Ohtsu et al. | |
| 2002/0154151 | A1 | 10/2002 | Koyama | |
| 2002/0158857 | A1 | 10/2002 | Iisaka | |
| 2002/0163591 | A1 | 11/2002 | Tsutsui | |
| 2002/0171607 | A1 | 11/2002 | Senda et al. | |
| 2003/0001814 | A1 * | 1/2003 | Lee | 345/100 |
| 2003/0020677 | A1 * | 1/2003 | Nakano | 345/87 |
| 2003/0025659 | A1 * | 2/2003 | Kondo et al. | 345/87 |
| 2003/0025663 | A1 | 2/2003 | Waterman et al. | |
| 2003/0058235 | A1 | 3/2003 | Moon | |
| 2003/0063077 | A1 | 4/2003 | Koyama | |
| 2003/0085862 | A1 | 5/2003 | Tsutsui | |
| 2003/0174153 | A1 | 9/2003 | Koyama | |
| 2004/0038446 | A1 | 2/2004 | Takeda et al. | |
| 2004/0095364 | A1 | 5/2004 | Koyama et al. | |
| 2004/0127038 | A1 | 7/2004 | Carcia et al. | |
| 2004/0155873 | A1 * | 8/2004 | Miyazawa | 345/204 |
| 2004/0189630 | A1 | 9/2004 | Huh et al. | |
| 2004/0207671 | A1 * | 10/2004 | Kusunoki et al. | 347/10 |
| 2004/0227775 | A1 * | 11/2004 | Shimizu et al. | 345/690 |
| 2004/0257359 | A1 | 12/2004 | Muroi et al. | |
| 2005/0007317 | A1 * | 1/2005 | Koyama | 345/76 |
| 2005/0007392 | A1 | 1/2005 | Kasai et al. | |
| 2005/0012731 | A1 | 1/2005 | Yamazaki et al. | |
| 2005/0017963 | A1 | 1/2005 | Yamazaki et al. | |
| 2005/0017964 | A1 | 1/2005 | Yamazaki et al. | |
| 2005/0127846 | A1 | 6/2005 | Kim | |
| 2005/0140641 | A1 | 6/2005 | Kim et al. | |
| 2005/0190142 | A1 | 9/2005 | Ferguson | |
| 2005/0206588 | A1 * | 9/2005 | Min et al. | 345/63 |
| 2005/0231673 | A1 * | 10/2005 | Yamazaki et al. | 349/139 |
| 2005/0275038 | A1 | 12/2005 | Shih et al. | |
| 2006/0035452 | A1 | 2/2006 | Carcia et al. | |
| 2006/0055629 | A1 | 3/2006 | Van | |
| 2006/0082568 | A1 | 4/2006 | Yamazaki et al. | |
| 2006/0086933 | A1 | 4/2006 | Iechi et al. | |
| 2006/0108529 | A1 | 5/2006 | Saito et al. | |
| 2006/0108636 | A1 | 5/2006 | Sano et al. | |
| 2006/0114213 | A1 | 6/2006 | Yokoyama | |
| 2006/0170111 | A1 | 8/2006 | Isa et al. | |
| 2006/0197092 | A1 | 9/2006 | Hoffman et al. | |
| 2006/0228974 | A1 | 10/2006 | Thelss et al. | |
| 2006/0244702 | A1 | 11/2006 | Yamazaki et al. | |
| 2006/0262066 | A1 * | 11/2006 | Yamazaki et al. | 345/98 |
| 2006/0273999 | A1 * | 12/2006 | Yamazaki et al. | 345/81 |
| 2006/0286737 | A1 | 12/2006 | Levy et al. | |
| 2007/0004202 | A1 | 1/2007 | Fujii | |
| 2007/0026580 | A1 | 2/2007 | Fujii | |
| 2007/0054507 | A1 | 3/2007 | Kaji et al. | |
| 2007/0072439 | A1 | 3/2007 | Akimoto et al. | |
| 2007/0108446 | A1 | 5/2007 | Akimoto | |
| 2007/0272922 | A1 | 11/2007 | Kim et al. | |
| 2008/0006877 | A1 | 1/2008 | Mardilovich et al. | |
| 2008/0024091 | A1 | 1/2008 | Yamazaki et al. | |
| 2008/0084403 | A1 | 4/2008 | Kimura et al. | |
| 2009/0141202 | A1 | 6/2009 | Yoshida | |
| 2010/0066653 | A1 | 3/2010 | Yamazaki et al. | |

FOREIGN PATENT DOCUMENTS

| | | | |
|---|---|---|---|
| EP | 1111577 | A3 | 1/2002 |
| EP | 1 184 833 | A2 | 3/2002 |
| EP | 1 103 946 | A3 | 11/2002 |
| EP | 1 298 637 | A2 | 4/2003 |
| EP | 1 298 637 | A3 | 12/2003 |
| EP | 1538591 | A2 | 6/2005 |
| EP | 1249822 | A3 | 3/2006 |
| GB | 2 177 829 | | 1/1987 |
| JP | 08-069690 | | 3/1996 |
| JP | 11-133921 | | 5/1999 |
| JP | 2001-324958 | | 11/2001 |
| JP | 2001-343933 | | 12/2001 |
| JP | 2002-108285 | | 4/2002 |
| JP | 2002-149113 | | 5/2002 |
| JP | 2003-186455 | | 7/2003 |
| JP | 2007096055 | A | 4/2007 |
| TW | 78107405 | | 1/1991 |
| WO | WO2004059605 | A2 | 7/2004 |
| WO | WO2004059605 | A3 | 9/2004 |

OTHER PUBLICATIONS

Search Report, Application No. 06009376.2, dated Aug. 22, 2006.

Search Report, Application No. 06007738.5, dated May 25, 2007.

Office Action, Application No. 06009376.2, dated Apr. 23, 2008.

Askakuma, N., et al., "Crystallization and Reduction of Sol-Gel-Derived Zinc Oxide Films by irradition with Ultraviolet Lamp," Journal of So-Gel Science and Technology, 203, vol. 26, pp. 181-184.

Nomura, Kenji et al., "Room-Temperature Fabrication of Transparent Flexible Thin-Film Transistors Using Amorphous Oxide Semiconductors," Nature, Nov. 25, 2004, pp. 488-492, vol. 432, Nature Publishing Group.

* cited by examiner

DISPLAY DEVICE AND ELECTRONIC APPARATUS

BACKGROUND OF THE INVENTION

1. Field of the Invention

The present invention relates to a display device having a display screen for displaying text, still images, moving images, and the like. In addition, the invention relates to a technique for improving the visibility of a display screen in various usage environments.

2. Description of the Related Art

In recent years, a so-called self-luminous display device is attracting attention, which has pixels each formed with a light-emitting element such as a light-emitting diode (LED). As a light-emitting element used in such a self-luminous display device, there is an organic light-emitting diode (also called an OLED (Organic Light-Emitting Diode), an organic EL element, an electroluminescence (EL) element, or the like), which has been attracting attention and used for an EL display (e.g., an organic EL display). Since the light-emitting element such as an OLED is a self-luminous type, it is advantageous as compared to a liquid crystal display in that high visibility of pixels is ensured, no backlight is required, high response speed is achieved, and the like. The luminance of a light-emitting element is controlled by the value of current flowing therein.

As a method of controlling gray scales (luminance) in such a display device, there are a digital gray scale method and an analog gray scale method. In the digital gray scale method, gray scales are expressed by controlling on/off of a light-emitting element in a digital manner. On the other hand, as for the analog gray scale method, there is a method of controlling the light-emission intensity of a light-emitting element in an analog manner, or a method of controlling the light-emission time of a light-emitting element in an analog manner.

In the digital gray scale method, only two states of a light-emitting element can be selected, which are a light-emission state and a non-light-emission state; therefore, only two gray scales can be expressed. Thus, the digital gray scale method is often used in combination with another method to achieve multi-gray scale display. As a method for achieving multi-gray scales, a time gray scale method is often used in combination (see Patent Documents 1 and 2).

As examples of a display which expresses gray scales by digitally controlling a light-emission state of pixels in combination with the time gray scale method, there are an organic EL display using a digital gray scale method, a plasma display, and the like.

The time gray scale method is a method of expressing gray scales by controlling the length of light-emission periods or the number of light-emitting operations. That is, one frame is divided into a plurality of subframes, and each subframe is weighted in the number of light-emitting operations, the length of light-emission periods, or the like, so that the total weight (the sum of the light-emitting operations or the sum of the light-emission periods) is varied between different gray scales, in order to express each gray scale.

Thus far, such display panels have been required to provide high image quality, and display panels having functions of automatically or manually adjusting brightness or contrast have been in widespread use. For example, there is a liquid crystal display device having a function of adjusting visibility of gray scales by changing the transmissivity of liquid crystals (see Patent Document 3).

[Patent Document 1] Japanese Patent Laid-Open No. 2001-324958

[Patent Document 2] Japanese Patent Laid-Open No. 2001-343933

[Patent Document 3] Japanese Patent Laid-Open No. 2003-186455

However, although a liquid crystal panel exhibits excellent visibility in the indoor environment with an illuminance of 300 to 700 lx, it has a problem in exhibiting a significantly low visibility in the outdoor environment with an illuminance of 1,000 lx or higher. There is a panel called a reflective liquid crystal panel which has a structure where the outside light is reflected by a pixel electrode; however, it has low image quality under an indoor fluorescent lighting; therefore, it cannot solve the essential problem. That is, it has been impossible to ensure high visibility in various environments in the range from, for example, dark places or indoors (e.g., under a fluorescent lighting) to outdoors (e.g., under the sunlight).

SUMMARY OF THE INVENTION

In view of the foregoing, it is an object of the invention to provide a display device whose display can be recognized even in dark places or under the strong outside light.

A feature of the invention is to provide a display device including a matrix arrangement of a plurality of pixels. The display device further includes a source driver, a gate driver, and at least two display modes. The display modes are switched in accordance with the intensity of outside light in such a manner that an analog signal is supplied to the source driver in the first display mode, while a digital signal is supplied to the source driver in the second display mode.

A feature of the invention is to provide a display device including a matrix arrangement of a plurality of pixels. The display device further includes a source driver, a gate driver, and at least two display modes. The display modes are switched in accordance with the intensity of outside light in such a manner that an analog signal is supplied to the source driver to be supplied to the pixel in the first display mode, while a digital signal is supplied to the source driver to be supplied to the pixel in the second display mode.

A feature of the invention is to provide a driving method of a display device including a matrix arrangement of a plurality of pixels, a source driver, and a gate driver, which includes the step of switching between a first display mode and a second display mode in accordance with the intensity of outside light. In the first display mode, an analog signal is supplied to the source driver, while in the second display mode, a digital signal is supplied to the source driver.

A feature of the invention is to provide a driving method of a display device including a matrix arrangement of a plurality of pixels, a source driver, and a gate driver, which includes the step of: switching between a first display mode and a second display mode in accordance with the intensity of outside light. In the first display mode, an analog signal is supplied to the source driver to be supplied to the pixel, while in the second display mode, a digital signal is supplied to the source driver to be supplied to the pixel.

Note that hat various kinds of transistors can be used as the transistor of the invention. Therefore, transistors applicable to the invention are not limited to a certain type. Thus, the invention may employ a thin film transistor (TFT) using a non-single crystalline semiconductor film typified by amorphous silicon or polycrystalline silicon, a MOS transistor formed with a semiconductor substrate or an SOI substrate, a junction transistor, a bipolar transistor, a transistor formed with a compound semiconductor such as ZnO or a-InGaZnO, a transistor formed with an organic semiconductor or a carbon nanotube, or other transistors. In the case of using a non-single crystalline semiconductor film, it may contain hydrogen or halogen. In addition, a substrate over which transistors are formed is not limited to a certain type, and various kinds of substrates can be used. Accordingly, transistors can be formed over a single crystalline substrate, an SOI substrate, a glass substrate, a plastic substrate, a paper substrate, a cellophane substrate, a quartz substrate, or the like. Alternatively, after forming transistors over a substrate, the transistors may be transposed onto another substrate.

Note also that the structure of a transistor is not limited to a certain type and various structures may be employed. For example, a multi-gate structure having two or more gates may be used. By using a multi-gate structure, off-current can be reduced as well as the withstand voltage can be increased to improve the reliability of the transistor, and even when the drain-source voltage fluctuates at the time when the transistor operates in the saturation region, flat characteristics can be provided without causing fluctuations of a drain-source current. In addition, such a structure may also be employed that gate electrodes are formed to sandwich a channel. By using such a structure that gate electrodes are formed to sandwich a channel, the area of the channel region can be enlarged to increase the value of current flowing therein, and a depletion layer can be easily formed to increase the S value. In addition, any of the following structures may be employed that: a gate electrode is formed over a channel; a gate electrode is formed below a channel; a staggered structure; an inversely staggered structure; a structure where a channel region is divided into a plurality of regions and connected in parallel; or a structure where a channel region is into a plurality of regions and connected in series. In addition, a channel (or a part of it) may overlap a source electrode or a drain electrode. By forming a structure where a channel (or a part of it) overlaps a source electrode or a drain electrode, unstable operation can be prevented, which would otherwise be caused in the case where charges gather in a part of the channel. In addition, an LDD region may be provided. By providing an LDD region, off-current can be reduced as well as the withstand voltage can be increased to improve the reliability of the transistor, and even when the drain-source voltage fluctuates at the time when the transistor operates in the saturation region, flat characteristics can be provided without causing fluctuations of a drain-source current.

In the invention, a connection means both an electrical connection and a direct connection. Accordingly, in the configuration disclosed in the invention, other elements which enable an electrical connection (e.g., a switch, a transistor, a capacitor, an inductor, a resistor, or a diode) may be interposed between elements having a predetermined connection relation. Alternatively, elements of the invention may be directly connected to each other without interposing other elements therebetween. Note that when elements are directly connected without interposing other elements which enable an electrical connection therebetween, the elements connected will be described as being "directly connected" unless electrically connected. Meanwhile, when elements are described as being "electrically connected", there are both cases where the elements are connected electrically and directly.

In the invention, a pixel means one element whose brightness can be controlled. For example, a pixel means one color element, and in such a case, brightness is expressed with one color element. Thus, in the case of a color display device having color elements of R (Red), G (Green), and B (Blue), a minimum unit of an image is composed of three pixels of an R pixel, a G pixel, and a B pixel. Note that the color element is not limited to three colors, and it may be composed of more than three colors. For example, there is RGBW (W means white), or RGB plus yellow, cyan, and/or magenta. As another example, there is a case where one color element is controlled in brightness by using a plurality of regions. In such a case, one region corresponds to one pixel. For example, in the case of performing an area gray scale display, one color element has a plurality of regions for controlling brightness, so that the whole regions are used for expressing gray scales. In this case, one region for controlling brightness corresponds to one pixel. Accordingly, in such a case, one color element is composed of a plurality of pixels. Further, there may be a case where regions utilized for displaying gray scales have different sizes between pixels. In addition, viewing angles may be widened by supplying slightly different signals to a plurality of regions for controlling brightness in one color element, that is, a plurality of pixels which form one color element.

Note that in the invention, pixels may be provided (arranged) in matrix. Herein, when it is described that pixels are provided (arranged) in matrix, there may be a case where the pixels are provided in a lattice arrangement of vertical stripes and lateral stripe so that dots of each color element are arranged in stripes. In the case of performing a full color display with three color elements (e.g., RGB), there may be a case where dots of three color elements are arranged in delta pattern. Further, there may be a case where the color elements are provided in the Bayer arrangement. The area of a light-emitting region may differ between dots of the respective color elements.

Note that a transistor is an element having at least three terminals of a gate, a drain, and a source. A gate means a part or all of a gate electrode and a gate wire (also called a gate line or a gate signal line). A gate electrode means a conductive film which overlaps a semiconductor for forming a channel region or an LDD (Lightly Doped Drain) region with a gate insulating film sandwiched therebetween. A gate wire means a wire for connecting gate electrodes of different pixels, or a wire for connecting a gate electrode with another wire.

Note that a gate wire includes a portion functioning as both a gate electrode and a gate wire. Such a region may be called either a gate electrode or a gate wire. That is, there is a region where a gate electrode and a gate wire cannot be clearly distinguished from each other. For example, in the case where a channel region overlaps a gate wire which is extended, the overlapped region of the gate wire functions as both a gate wire and a gate electrode. Accordingly, such a region may be called either a gate electrode or a gate wire.

In addition, a region formed with the same material as the gate electrode, while being connected to the gate electrode may be called a gate electrode. Similarly, a region formed with the same material as the gate wire, while being connected to the gate wire may be called a gate wire. In the strict sense, such a region may not overlap the channel region or may not have a function of connecting to another gate electrode. However, there is a case where this region is formed with same material as the gate electrode or the gate wire, while being connected to the gate electrode or the gate wire in order to provide a sufficient manufacturing margin. Accordingly, such a region may also be called either a gate electrode or a gate wire.

In addition, in the case of a multi-gate transistor, for example, a gate electrode of a transistor is connected to a gate electrode of another transistor with the use of a conductive film which is formed with the same material as the gate electrode. Since this region is a region for connecting a gate electrode to another gate electrode, it may be called a gate wire, while it may also be called a gate electrode since the multi-gate transistor may be regarded as one transistor. That is, the region may be called a gate electrode or a gate wire as long as it is formed of the same material as the gate electrode or the gate wire and connected thereto. In addition, a part of a conductive film which connects a gate electrode to a gate wire, for example, may also be called a gate electrode or a gate wire.

Note that a gate terminal means a region of a gate electrode or a part of a region electrically connected to the gate electrode.

Note that a source means a part or all of a source region, a source electrode, and a source wire (also called a source line, a source signal line, or the like). A source region is a semiconductor region containing a large amount of p-type impurities (e.g., boron or gallium) or n-type impurities (e.g., phosphorus or arsenic). Accordingly, it does not include a region containing a slight amount of p-type impurities or n-type impurities, that is a so-called LDD (Lightly Doped Drain) region. A source electrode is a conductive layer formed of a different material from the source region, while being electrically connected to the source region. Note that there is a case where a source electrode and a source region are collectively referred to as a source electrode. A source wire is a wire for connecting source electrodes of different pixels, or a wire for connecting a source electrode with another wire.

Note that a source wire includes a portion functioning as both a source electrode and a source wire. Such a region may be called either a source electrode or a source wire. That is, there is a region where a source electrode and a source wire cannot be clearly distinguished from each other. For example, in the case where a source region overlaps a source wire which is extended, the overlapped region of the source wire functions as both a source wire and a source electrode. Accordingly, such a region may be called either a source electrode or a source wire.

In addition, a region formed with the same material as a source electrode, while being connected to the source electrode may be called a source electrode. A part of a source wire which overlaps a source region may be called a source electrode as well. Similarly, a region formed with the same material as the source wire, while being connected to the source wire may be called a source wire as well. In the strict sense, such a region may not have a function of connecting to another source electrode. However, there is a case where this region is formed with same material as the source electrode or the source wire, while being connected to the source electrode or the source wire in order to provide a sufficient manufacturing margin. Accordingly, such a region may also be called either a source electrode or a source wire.

In addition, a part of a conductive film which connects a source electrode to a source wire may be called a source electrode or a source wire, for example.

Note that a source terminal means a part of a source region, a source electrode, or a part of a region electrically connected to the source electrode.

Note also that a drain has a similar structure to the source.

In the invention, when it is described that an object is formed on another object, it does not necessarily mean that the object is in direct contact with the another object. In the case where the above two objects are not in direct contact with each other, still another object may be sandwiched therebetween. Accordingly, when it described that a layer B is formed on a layer A, it means either case where the layer B is formed in direct contact with the layer A, or where another layer (e.g., a layer C or a layer D) is formed in direct contact with the layer A, and then the layer B is formed in direct contact with the layer C or D. In addition, when it is described that an object is formed over or above another object, it does not necessarily mean that the object is in direct contact with the another object, and another object may be sandwiched therebetween. Accordingly, when it described that a layer B is formed over or above a layer A, it means either case where the layer B is formed in direct contact with the layer A, or where another layer (e.g., a layer C or a layer 13) is formed in direct contact with the layer A, and then the layer B is formed in direct contact with the layer C or D. Similarly, when it is described that an object is formed below or under another object, it means either case where the objects are in direct contact with each other or not in contact with each other.

According to the invention, a display device with excellent visibility can be provided by controlling the number of gray scales of an image to be displayed in accordance with the intensity of outside light. That is, a display device which exhibits high visibility in various environments can be provided, in the wide range from, for example, dark places or indoors (e.g., under a fluorescent lighting) to outdoors (e.g., under the sunlight).

BRIEF DESCRIPTION OF THE DRAWINGS

In the accompanying drawings.

DETAILED DESCRIPTION OF THE INVENTION

Although the invention will be fully described by way of embodiment modes with reference to the accompanying drawings, it is to be understood that various changes and modifications will be apparent to those skilled in the art. Therefore, unless otherwise such changes and modifications depart from the scope of the invention, they should be construed as being included therein.

Embodiment Mode 1

Figure 1:
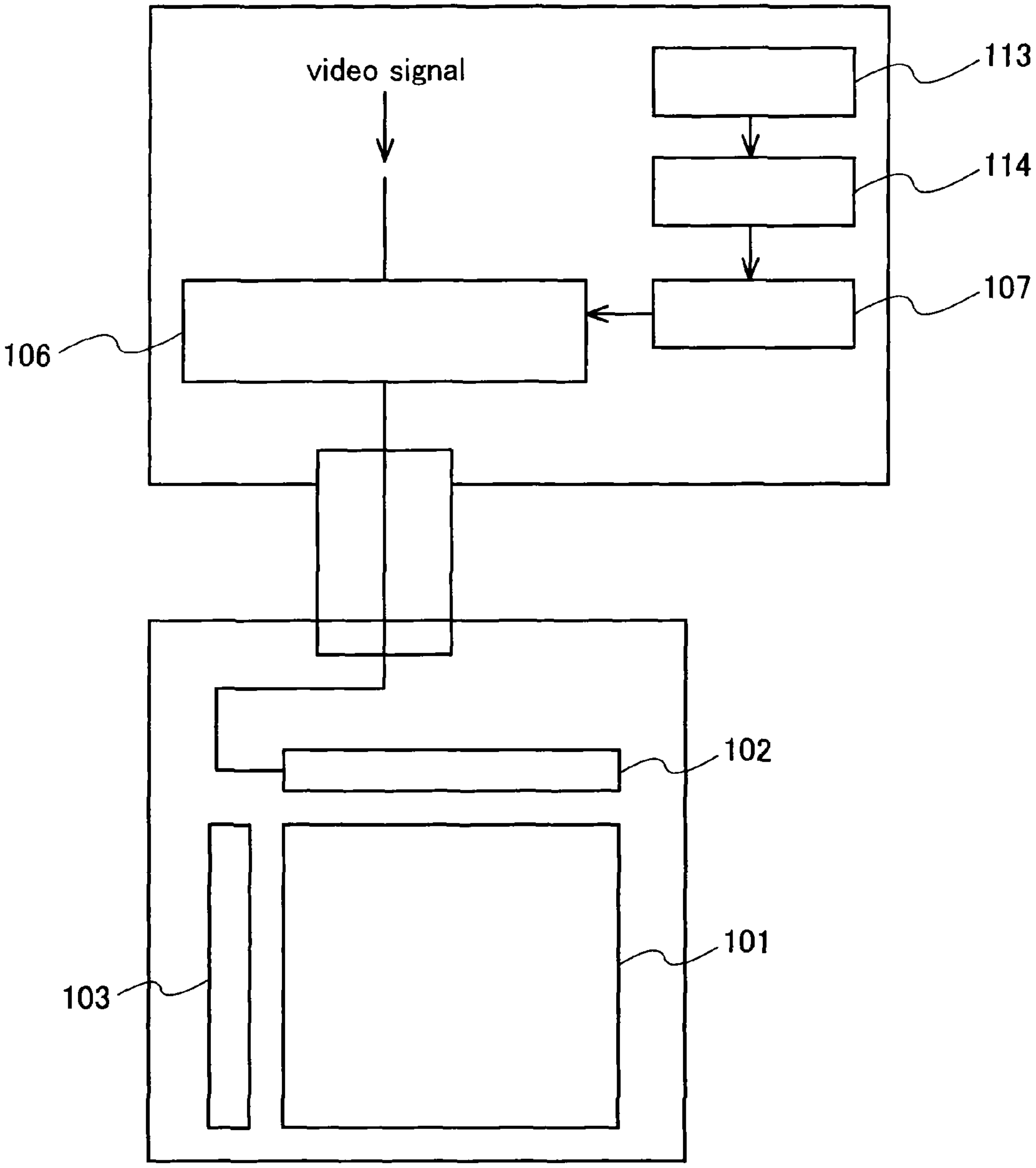
FIG. 1 illustrates a configuration of a display device of the invention.

FIG. 1 shows a schematic view of a display device. A source driver 102 and a gate driver 103 are disposed in order to drive a pixel array 101. The source driver 102 receives video signals. Note that number of the source driver 102 and the gate driver 103 may be more than one.

An optical sensor 113 detects outside light (light from outside that the display device receives), and the output is supplied to an amplifier 114. The amplifier 114 amplifies an electric signal output from the optical sensor 113, and supplies the amplified signal to a controller 107. Note that the amplifier 114 is not required if the electric signal output from the optical sensor 113 is sufficiently large.

Note that a part or all of the source driver may be provided outside a substrate having the pixel array 101, and for example, it may be constructed of an external IC chip.

Note also that the amplifier 114 and the optical sensor 113 may be provided over the same substrate as the pixel array 101. In that case, they may be formed over the same substrate as the pixel array 101. Alternatively, the amplifier 114 and the optical sensor 113 may be attached onto the substrate having the pixel array 101 by COG (Chip On Glass) bonding or bump bonding.

Note that transistors in the invention may be any type of transistors and may be formed over any type of substrates as is already descried. Therefore, all of the circuits shown in FIG. 1 may be formed over a glass substrate, a plastic substrate, a single crystalline substrate, an SOI substrate, or any other substrates. Alternatively, such a structure may be employed that a part of the circuits shown in FIG. 1 is formed over a substrate, while another part of the circuits is formed over another substrate. That is, not the whole circuits shown in FIG. 1 are required to be formed over a common substrate. For example, such a structure may be employed that the pixel array 101 and the gate driver 103 are formed over a glass substrate by using TFTs, while the source driver 102 (or a part of it) is formed over a single crystalline substrate so that the IC chip is attached onto the glass substrate by COG (Chip on Glass) bonding. Alternatively, the IC chip may be connected to the glass substrate by TAB (Tape Automated Bonding) or by use of a printed board.

Similarly, an optical sensor in the invention may be any type of optical sensors, and may be formed over any type of substrates. As examples of the optical sensor, there are a PIN junction diode, a PN junction diode, a Schottky diode, and the like. In addition, the optical sensor may be formed with any material. It may be formed with amorphous silicon, polysilicon, single crystalline silicon, SIO, or the like. When the optical sensor is formed with amorphous silicon or polysilicon, it may be formed over the same substrate as and with the same manufacturing process as the pixel array, which can contribute to cost saving.

Accordingly, the optical sensor and the amplifier may all be formed over any of a glass substrate, a plastic substrate, a single crystalline substrate, an SOI substrate, or other substrates. Alternatively, such a structure may be employed that a part of the optical sensor or the amplifier is formed over a substrate, while another part thereof is formed over another substrate. That is, not all the optical sensor and amplifier are required to be formed over a common substrate. For example, such a structure may be employed that the optical sensor 113, the pixel array 101, and the gate driver 103 in FIG. 1 are formed over a glass substrate by using TFTs, while the source driver 102 (or a part of it) is formed over a single crystalline substrate so that the IC chip is attached onto the glass substrate by COG (Chip on Glass) bonding. Alternatively, the IC chip may be connected to the glass substrate by TAB (Tape Automated Bonding) or by use of a printed board.

A video signal input to the source driver 102 is generated in accordance with each display mode, in a video signal generating circuit 106 for each display mode (hereinafter simply referred to as a video signal generating circuit 106). The video signal generating circuit 106 is controlled by the controller 107. The video signal generating circuit 106 receives an original video signal. Then, the video signal generating circuit 106 generates a video sign al corresponding to each display mode based on the original video signal, and outputs the signal to the source driver 102.

The controller 107 controls the video signal generating circuit 106 based on a signal input from the optical sensor 113. Thus, the number of gray scales of a video signal supplied to the source driver 102 is controlled by using the signal from the optical sensor 113, that is, in accordance with the surrounding brightness. In order to control the number of gray scales, the number of gray scales may be gradually changed in accordance with the surrounding brightness, or it may be changed by providing several display modes, so that one display mode is switched to another display mode.

A display mode can be broadly classified into an analog mode and a digital mode. In the analog mode, a video signal input to a pixel has an analog value. In the digital mode, on the other hand, a video signal input to a pixel has a digital value.

The display mode, that is, the number of gray scales to be displayed is changed based on the output of the optical sensor 113. Specifically, when the display device receives strong light from outside and the output of the optical sensor 113 exceeds a certain value, the total number of gray scales of an image to be displayed on the display screen is controlled to be reduced. When the display device receives strong light from outside, the boundary between adjacent gray scales becomes ambiguous, thereby an image displayed on the display screen is blurred. However, if the total number of gray scales is reduced in accordance with the outside light that the display device receives, the boundary between adjacent gray scales can be made clear, thereby visibility of an image displayed on the display panel can be improved.

In the case of controlling an image displayed on the display screen to have a total of two gray scales by the output of the optical sensor 113, a black image is generally displayed on the white background; however, the color may be reversed such that a white image is displayed on the black background. Accordingly, visibility of the display screen can be further improved. In addition, by increasing the luminance of a white image, visibility of the display screen can be improved even more. The combination of a background image and a main image is not limited to the aforementioned, and an arbitrary combination of colors may be employed as long as a clear contrast (clear light/dark ratio) is ensured.

The output of the optical sensor 113 is transmitted to the controller 107 through the amplifier 114. The controller 107 detects whether the output of the optical sensor 113 is equal to or more than a predetermined value. In the case where the output of the optical sensor 113 is less than the predetermined value, the total number of gray scales of a video signal to be output to the display panel is not changed. On the other hand, in the case where the output of the optical sensor 113 is equal to or more than the predetermined value, the total number of gray scales of a video signal to be output to the display panel is corrected to be smaller.

As shown in Table 1, the indoor and outdoor brightness vary widely depending on the state of lightings, climate conditions such as the weather, time, and the like. For example, the illuminance of a room with a lighting fixture is about 800 to 1,000 lx, the illuminance during daytime in cloudy weather is about 32,000 lx, and the illuminance during daytime in fine weather is 100,000 lx or higher.

TABLE 1

| Illuminance (lx) | Rough Indication of Brightness | (lx) |
|---|---|---|
| 1,000,000 | Mt. Fuji or seacoast in midsummer | >100,000 |
| | Sunlight at noon (in fine weather) | 100,000 |
| | Sunlight at 10:00 am (in fine weather) | 65,000 |
| | Sunlight at 3:00 pm (in fine weather) | 35,000 |
| | Sunlight at noon (in cloudy weather) | 32,000 |
| | Sunlight at 10:00 am (in cloudy weather) | 25,000 |
| 10,000 | Sunlight 1 hour after the sunrise (in cloudy weather) | 2,000 |
| 1,000 | Sunlight 1 hour before the sunset (in fine weather) | 1,000 |
| | Inside the pinball (pachinko) parlor | 1,000 |
| | Inside the department store | 500 to 700 |
| | Office with fluorescent lighting fixtures | 400 to 500 |
| | At sunrise or sunset | 300 |
| | Room (about 13 m2) with two fluorescent lamps of 30 W | 300 |
| | Arcaded sidewalk at night | 150 to 200 |
| 100 | Under a fluorescent lamp | 50 to 100 |
| | Cigar lighter with a flame of 30 cm | 15 |
| 10 | Candle with a flame of 20 cm | 10 to 15 |
| | Civil twilight (at a solar zenith distance of 96 degrees) | 5 |
| 1 | Moonlight | 0.5 to 1 |
| | Nautical twilight (at a solar zenith distance of 102 degrees) | 0.01 |
| | Astronomic twilight (at a solar zenith distance of 108 degrees) | 0.001 |

Table 2 shows a comparison result of visibility between a display panel utilizing electroluminescence (EL panel), a transmissive liquid crystal panel (transmissive LCD panel), a semi-transmissive liquid crystal panel (semi-transmissive LCD panel), and a reflective liquid crystal panel (reflective LCD).

TABLE 2

| | | 500 to 1,500 [1x] Indoors → | ... ← Auditorium with Lightings → | 10,000 [1x] | ... ← Outdoors (Cloudy Weather) → | 100,000 [1x] | ... ← Outdoors (Fine Weather) | Power Consumption |
|---|---|---|---|---|---|---|---|---|
| EL Panel (2.0 QVGA) | 2 gray scales | Both natural images and text exhibit high visibility. | ⊚ or ○ | Only text exhibits high visibility. However, when the contrast is low due to the background color, visibility is low correspondingly. | ○ | Certain visibility is maintained only in displaying text. | ○ or Δ | ⊚ |
| | 8 gray scales | | | | | Certain visibility is maintained. However, when the contrast is low, visibility is low correspondingly. | Δ | ⊚ |
| | natural images (>64 gray scales) | | | Visibility is low in displaying a middle gray scale, | Δ | Visibility is low. When the contrast is low, the visibility is low correspondingly. | Δ or X | ○ |
| Transmissive LCD Panel (1.9QVGA) | | Both natural images and text exhibit high visibility. However, contrast is slightly low as compared to the EL panel. | ⊚ or ○ | Same as the above. Although visibility of text is about an equal level to that of the EL panel, visibility of natural images is lower than that of the EL panel. | Δ or X | Visibility is low. In particular, the panel cannot be seen under the direct sunlight in some cases. | X | ○ or Δ |
| Semi-transmissive LCD Panel (2.1QCIF+) | | Both natural images and text exhibit high visibility. | ○ | Relatively high visibility is maintained in displaying natural images without | ○ | Relatively high visibility is maintained since the reflective components of the outside light | ○ | ○ |

TABLE 2-continued

| | 500 to 1,500 [1x] Indoors → ← Auditorium with Lightings → | . . . | 10,000 [1x] ← Outdoors (Cloudy Weather) → | . . . | 100,000 [1x] ← Outdoors (Fine Weather) | . . . | Power Consumption |
|---|---|---|---|---|---|---|---|
| | However, contrast is slightly low as compared to the EL panel and a transmissive LCD panel. | | causing a color deviation or a significant decline in the contrast. | | are increased. | | |
| Reflective LCD Panel | Visibility is significantly low. When the contrast is low, visibility is low correspondingly. | Δ or X | Visibility is low in displaying a middle gray scale, | ○ | Relatively high visibility is maintained since the reflective components of the outside light are increased. | ○ | ◎ |

As a result, in the environment with an illuminance of up to about 1,500 lx (mainly, indoors or an auditorium with lightings), high visibility could be obtained in a display pattern (e.g., natural images or text such as characters or symbols) of an EL panel and LCD panels except a reflective LCD panel. Meanwhile, at an illuminance of 10,000 lx (during daytime in cloudy weather), it could be seen that a low-contrast portion such as a middle gray scale portion has significantly low visibility in displaying natural images in an EL panel and a transmissive LCD panel. However, in this case also, the EL panel has higher visibility than the transmissive LCD panel. In addition, in the case of reducing the number of gray scales (2 to 8 gray scales) in the EL panel, visibility is recovered and practically good visibility is obtained, in particular in displaying text. On the other hand, as for the transmissive LCD panel, contrast is low as a whole in both the indoor and outdoor environments. However, it exhibits high visibility in an environment with 10,000 lx. Regarding the power consumption, the reflective LCD panel has a superior property; however, it has a tendency that the visibility is low in the environment with relatively low illuminance such as the indoor environment. The transmissive LCD panel consumes power in its backlight portion; therefore, it has higher power consumption that the reflective LCD panel. To the contrary, low power consumption is achieved in the EL display panel which is set on a display mode by which the number of gray scales is set low.

As is evident from Table 2, a display device which has low power consumption while maintaining high visibility either in the indoor or outdoor environment can be provided by using an EL panel, and setting a display mode by which the number of gray scales is controlled in accordance with the intensity of outside light.

For example, in the display device shown in FIG. 1, when the optical sensor 113 detects that the display device receives outside light with 10 to 100 lx, the total number of gray scales is kept unchanged as 64 to 1024. Meanwhile, when the optical sensor 113 detects that the display device receives outside light with 100 to 1,000 lx, the total number of gray scales is corrected to be 16 to 64. When the optical sensor 113 detects that the display device receives outside light with 1,000 to 10,000 lx, the total number of gray scales is corrected to be 4 to 16. When the optical sensor 113 detects that the display device receives outside light with 10,000 to 100,000 lx, the total number of gray scales is corrected to be 2 to 4.

Note that the display device may be provided with a selection switch so that a display mode can be selected by a user. In such a case, the user may select a display mode by operating the selection switch. Alternatively, even when a display mode is selected with the selection switch, a gray scale corresponding to the selected display mode may be automatically increased or reduced in accordance with a signal from the optical sensor 113 (intensity of outside light).

Figure 2:
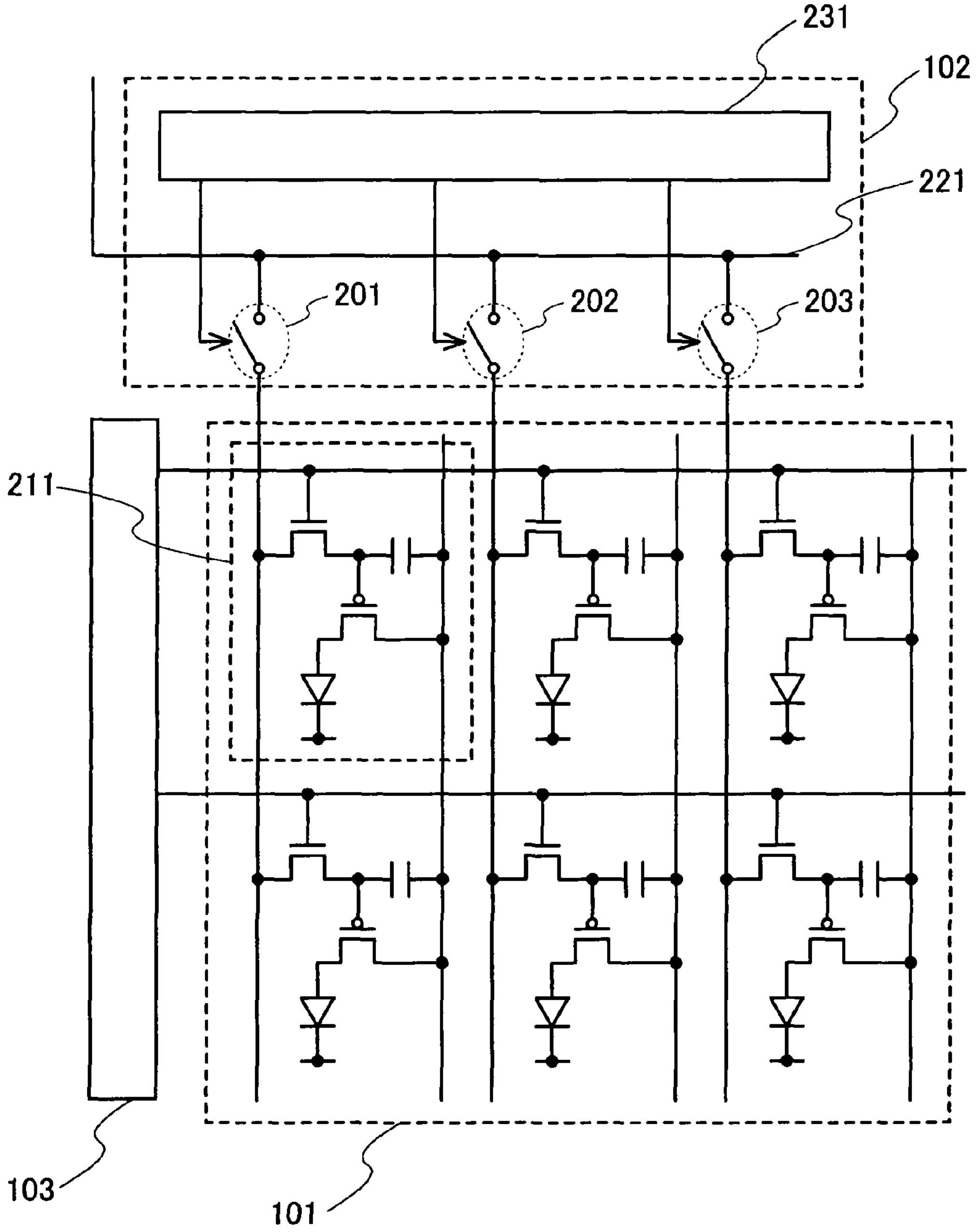
FIG. 2 illustrates a configuration of a display device of the invention.

Next, circuits will be described. FIG. 2 shows a configuration of the source driver 102. A shift register 231 is a circuit which outputs signals (so-called sampling pulses) for sequentially selecting sampling switches. Accordingly, the invention is not limited to the shift register as long as a similar function can be implemented. For example, a decoder circuit may be used.

Sampling pulses output from the shift register are input to sampling switches 201 to 203. Then, video signals are sequentially input to a video signal line 221, and the sampling switches 201 to 203 are sequentially turned on in accordance with the sampling pulses, so that the video signals are input to the pixel array 101. The pixel array 101 has a matrix arrangement of pixels 211.

Although FIG. 2 shows a case of providing two rows by three columns of the pixels 211, the invention is not limited to this configuration. Thus, an arbitrary number of pixels may be provided.

Figure 15:
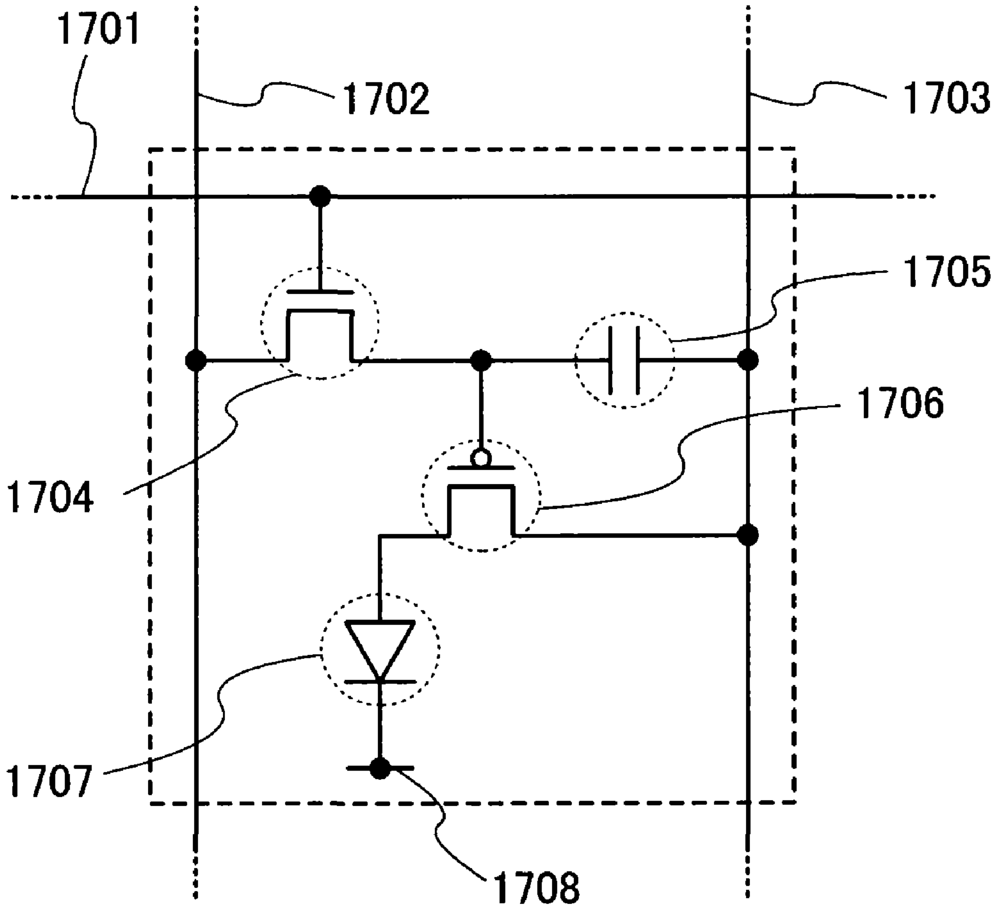
FIG. 15 illustrates a configuration of a display device of the invention.

FIG. 15 shows an example of the pixel 221 as one pixel. A selection transistor 1704 is controlled with a gate signal line 1701. When the selection transistor 1704 is turned on, a video signal is input from a source signal line 1702 to a holding capacitor 1705. Then, a driving transistor 1706 is turned on or off in accordance with the video signal, thereby a current flows into a counter electrode 1708 from a power supply line 1703 through a light-emitting element 1707.

Note that the pixel configuration is not limited to the one shown in FIG. 15. For example, a configuration with which variations of driving transistors can be corrected may be used.

As a pixel configuration with which variations of driving transistors can be corrected, there are mainly two types of (1) a configuration where variations of the threshold voltage of transistors are corrected, and (2) a configuration where a current is input as a video signal.

Figure 31:
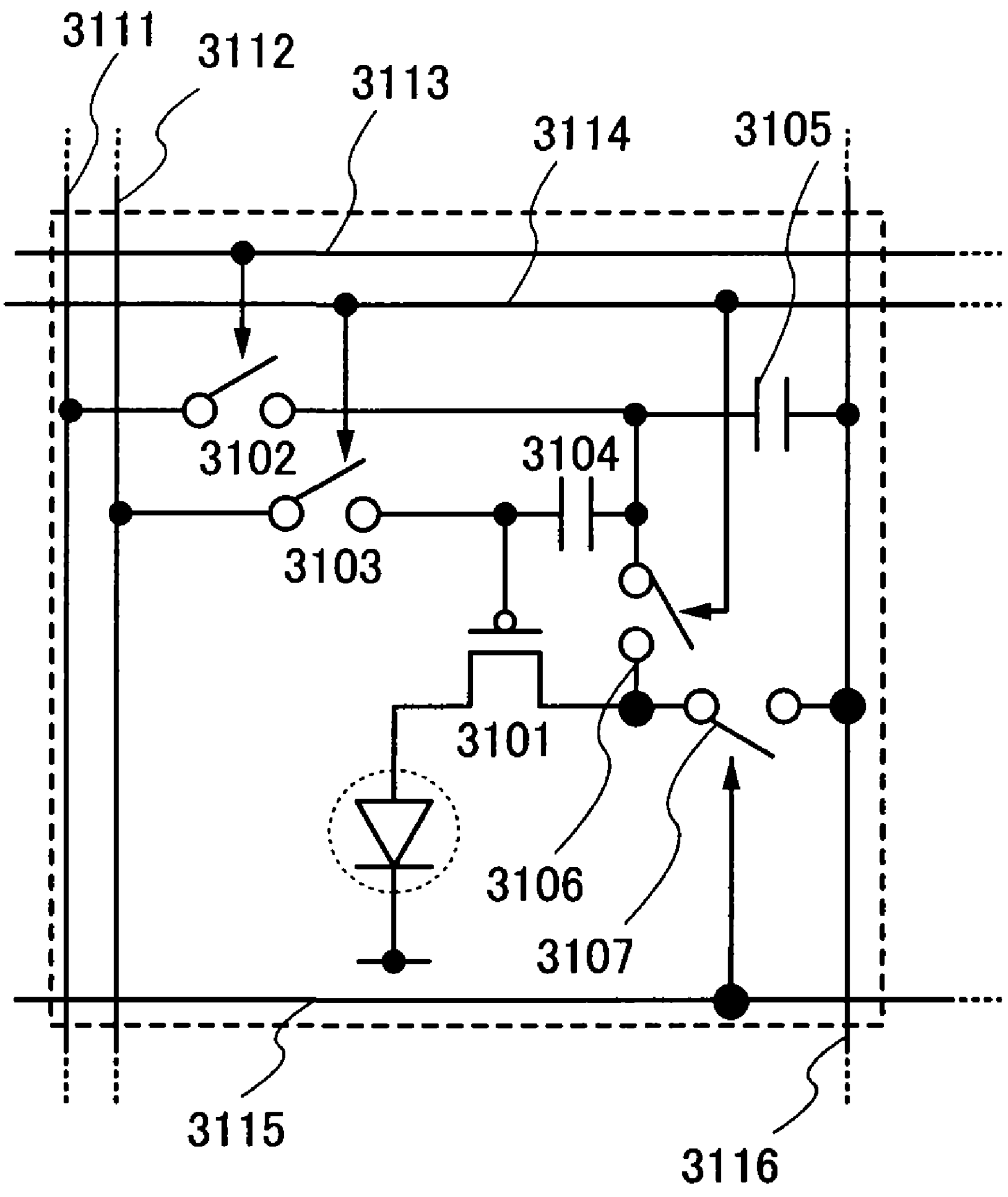
FIG. 31 illustrates a configuration of a display device of the invention.

FIG. 31 shows a pixel configuration of the type (1) where variations of the threshold voltage of transistors are corrected. The threshold voltage of a driving transistor 3101 is stored in a holding capacitor 3104 by controlling a switch 3107. The switch 3103 functions to initialize a gate potential of the driving transistor 3101. Then, a video signal is input from a source signal line 3111 through a switch 3102.

Figure 32:
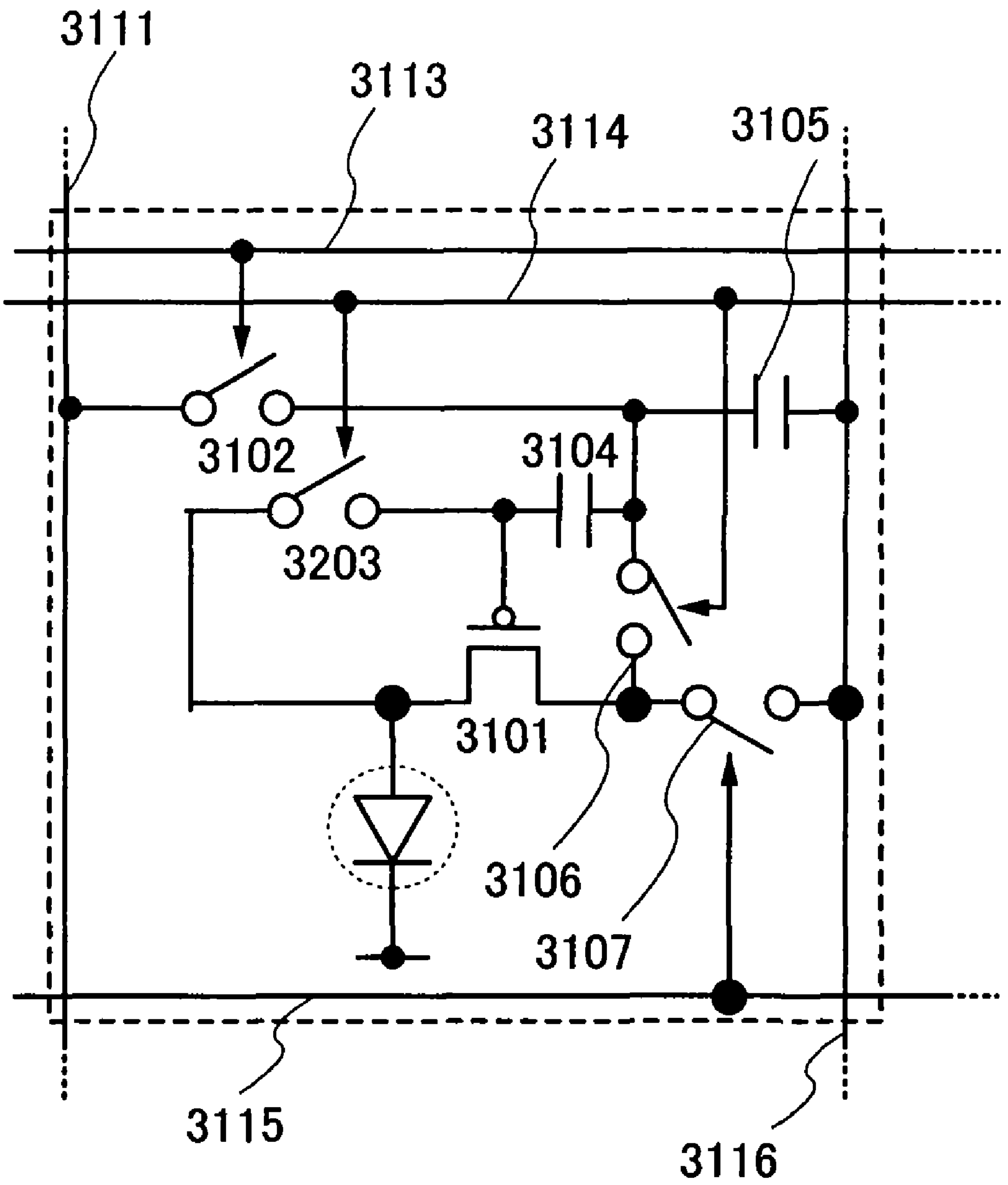
FIG. 32 illustrates a configuration of a display device of the invention.

Although a wire 3112 for initializing the gate potential of the driving transistor 3101 is required in FIG. 31, FIG. 32 shows a pixel configuration without the wire 3112. A gate of the driving transistor 3101 is connected to a drain thereof through a switch 3203.

Note that there are many types of pixel configurations where variations of the threshold voltage of transistors can be corrected; therefore, the invention is not limited to the configurations shown in FIG. 31 and FIG. 32. In this manner, by using a pixel configuration where variations of the threshold voltage of transistors can be corrected, variations of a current flowing in light-emitting elements can be reduced. Such a configuration is preferable in that uniform luminance can be maintained in an analog mode, in particular.

Figure 33:
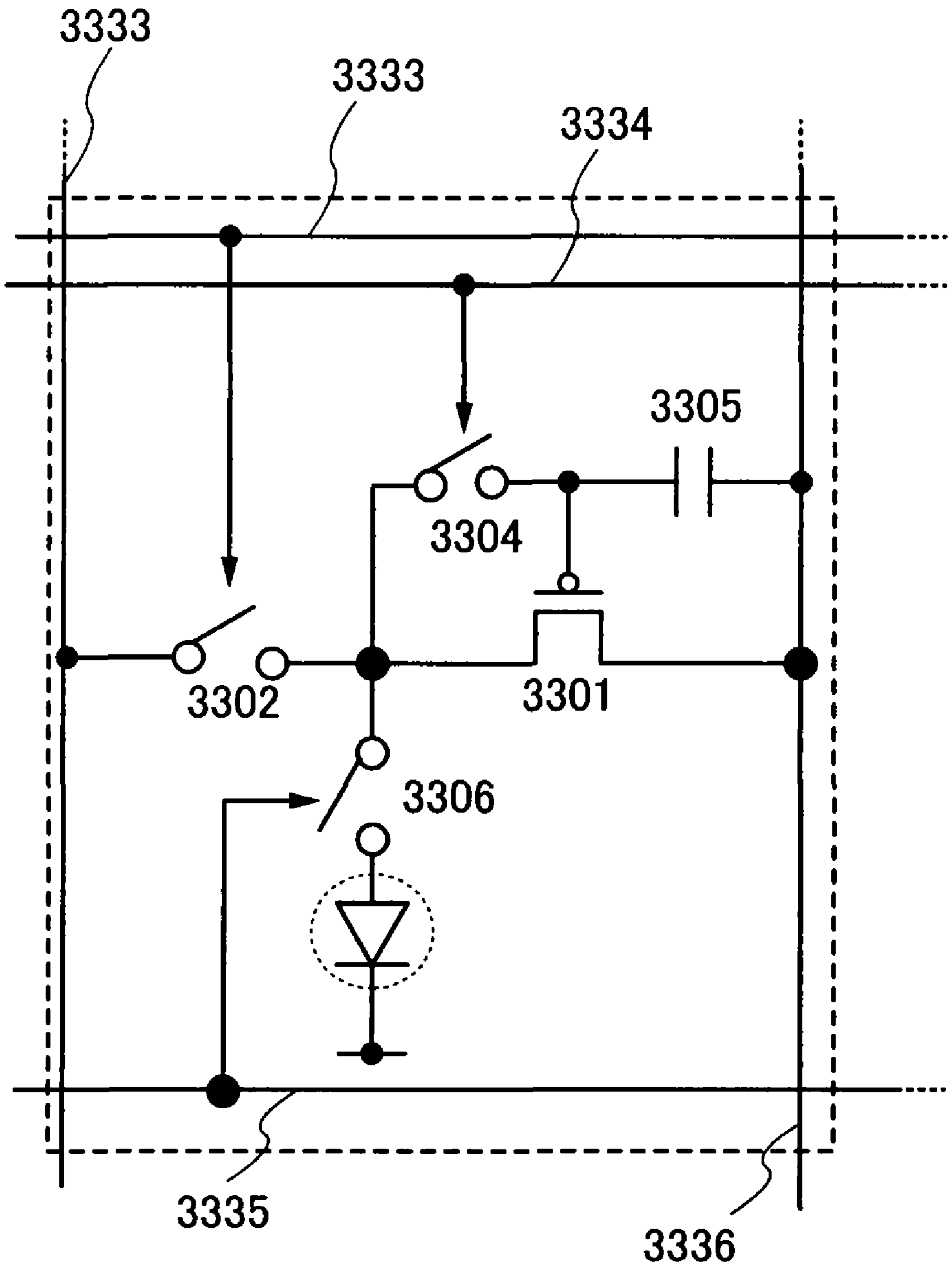
FIG. 33 illustrates a configuration of a display device of the invention.
Figure 34:
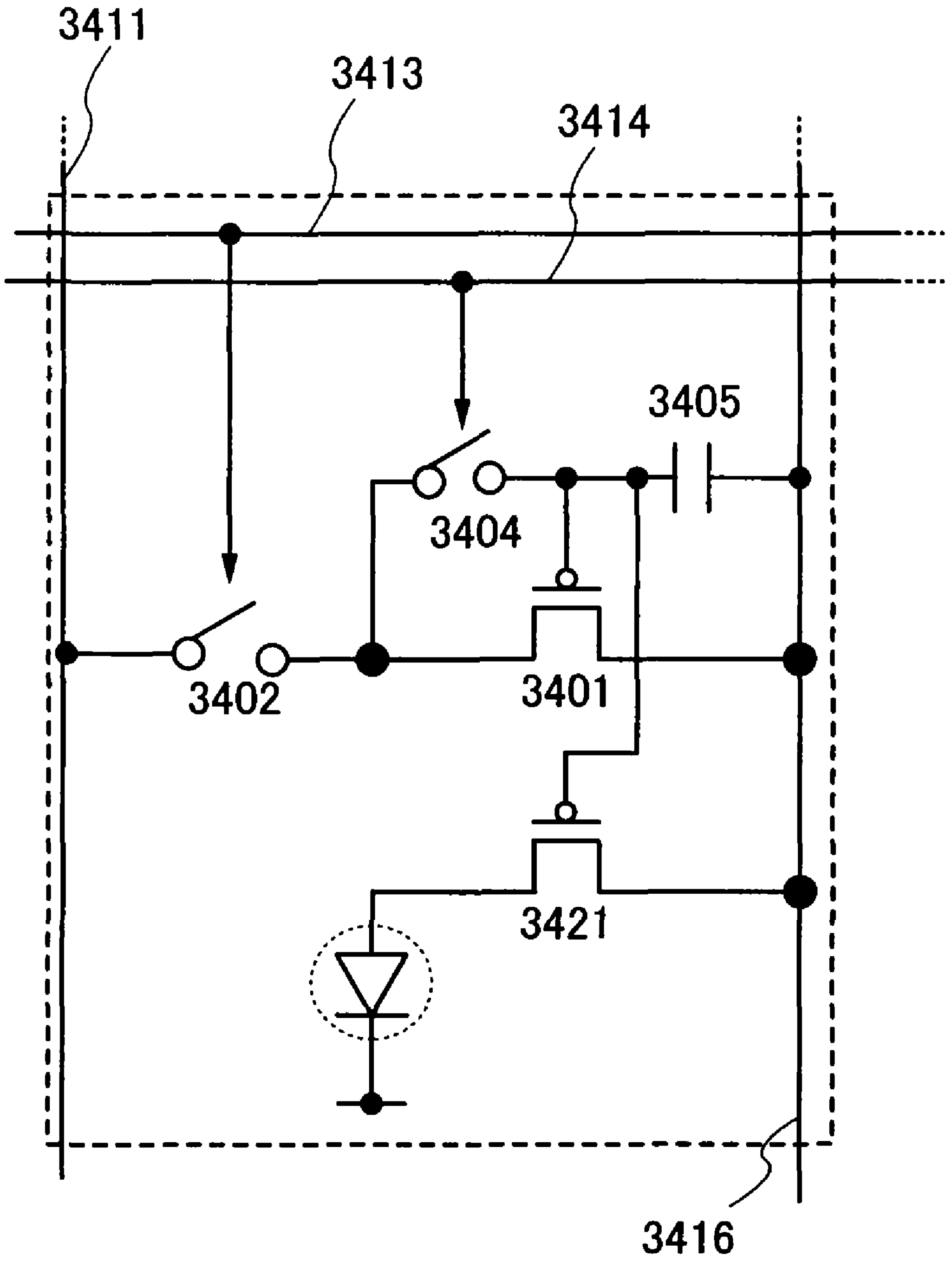
FIG. 34 illustrates a configuration of a display device of the invention.

Next, FIG. 33 shows a pixel configuration of the type (2) where a current is input as a video signal. A current is supplied to a source signal line in accordance with a video signal. Then, the current flows into a driving transistor 3301, and a gate-source voltage is generated accordingly. The gate-source voltage is once stored in a holding capacitor 3305, and thereafter a current is supplied to a light-emitting element. Although FIG. 33 shows an example where one transistor functions as both a transistor which receives a signal current and a transistor which supplies a current to a light-emitting element, these transistors may be separately provided as well. FIG. 34 shows such a case. A transistor 3401 which receives a signal current is separately provided from a transistor 3421 which supplies a current to a light-emitting element.

Note that there are many types of pixel configurations where variations of the threshold voltage of transistors can be corrected by inputting a current; therefore, the invention is not limited to the configurations shown in FIG. 33 and FIG. 34. In this manner, by using a pixel configuration where variations of the threshold voltage of transistors can be corrected by inputting a current, variations of a current flowing in the light-emitting elements can be reduced. Such a configuration is preferable in that uniform luminance can be maintained in an analog mode, in particular.

Note that an element disposed in a pixel is not limited to a specific type of display element. As an example of a display element disposed in a pixel, there is a display medium whose contrast changes by an electromagnetic function, such as an EL element (e.g., an organic EL element, an inorganic EL element, or an EL element containing an organic material and an inorganic material), an electron-emissive element, a liquid crystal element, electronic ink, an optical diffractive element, a discharging element, digital micromirror device (DMD), a piezoelectric element, or a carbon nanotube. In addition, a display device using an EL element includes an EL display; a display device using an electron-emissive element includes a field emission display (FED) or a surface-conduction electron-emitter display (SED); a display device using a liquid crystal element includes a liquid crystal display; a display device using electronic ink includes electronic paper, a display device using an optical diffractive element includes a display using a grating light valve (GLV); and a display using a discharging element includes a plasma display panel (PDP); a display device using a digital micromirror device (DMD) includes a digital light processing (DLP) display device; a display using a piezoelectric element includes a piezoelectric ceramic display; and a display device using a carbon nanotube includes an NED (Nano Emissive Display).

Note that the holding capacitor 1705 functions to hold a gate potential of the driving transistor 1706. Although the holding capacitor 1705 is connected between a gate of the driving transistor 1706 and the power supply line 1703, the invention is not limited to this configuration. The holding capacitor 1705 may be provided anywhere as long as it can hold the gate potential of the driving transistor 1706. In addition, the holding capacitor 1705 may be omitted in the case where a gate capacitance of the driving transistor 1706 and the like can be used for holding the gate potential of the driving transistor 1706.

The video signal generating circuit 106 may be formed over the same substrate as the pixel array 101, an FPC (Flexible Printed Circuit), or a PCB (Printed Circuit board).

In addition, the video signal generating circuit 106 may be formed by using similar transistors to those used for constructing the pixel array 101. Alternatively, the video signal generating circuit 106 may be formed with other transistors. For example, such a structure may be employed that the pixel array 101 is formed with thin film transistors, while the video signal generating circuit 106 is formed with MOS transistors or bipolar transistors formed over a bulk substrate or an SOI substrate.

Figure 3:
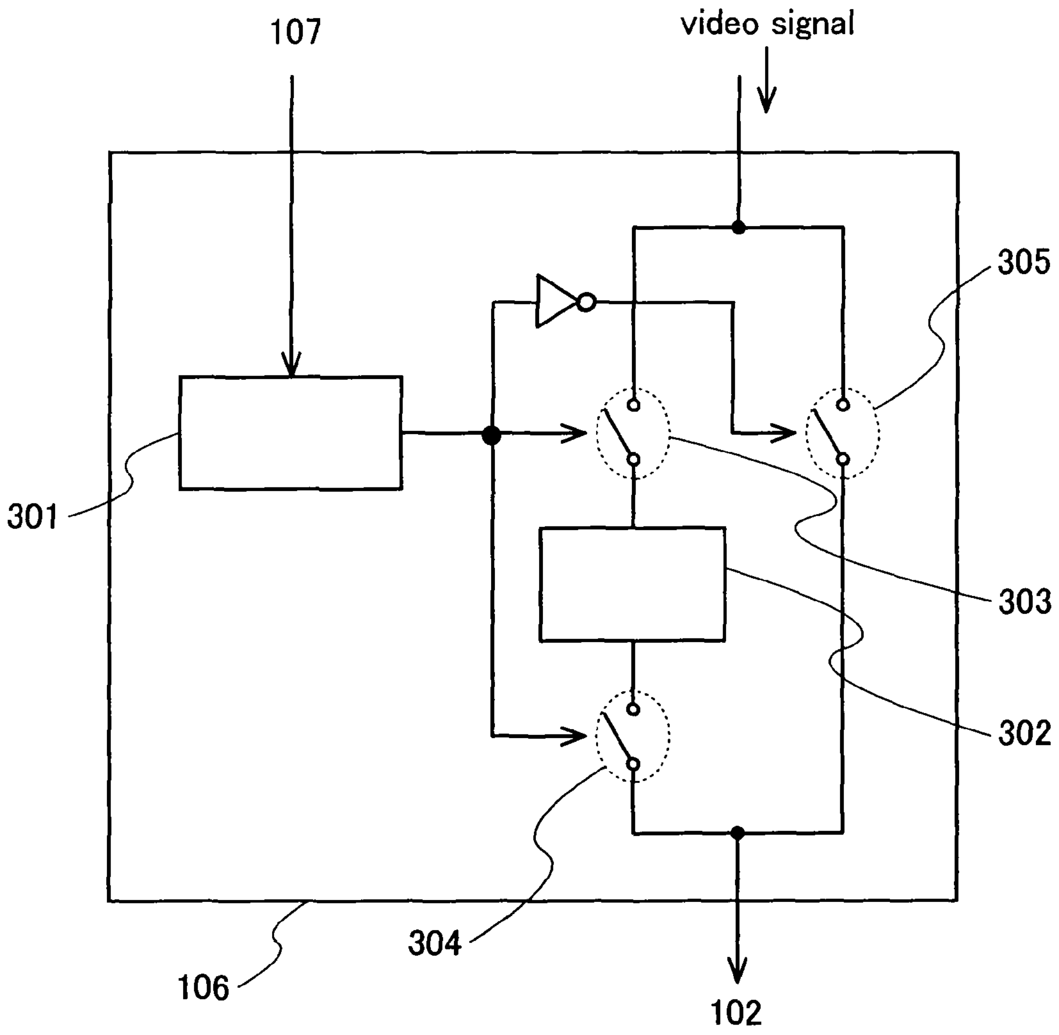
FIG. 3 illustrates a configuration of a display device of the invention.

Next, FIG. 3 shows a specific configuration of the video signal generating circuit 106. A display mode controlling circuit 301 performs control based on a signal input from the controller 107, so that display can be performed in accordance with each display mode. For example, switches 303 and 304 are turned on when a digital mode is selected. Then, an input video signal is processed with a binarization circuit 302, which outputs a new signal to the source driver 102. In that case, a switch 305 is turned off. On the other hand, when an analog mode is selected, a switch 305 is turned on to directly output an incoming signal to the source driver 102. If a video signal input to the video signal generating circuit 106 has an analog value, it is directly output without undergoing any process; therefore, a signal with an analog value is output to the source driver 102.

Figure 4A:
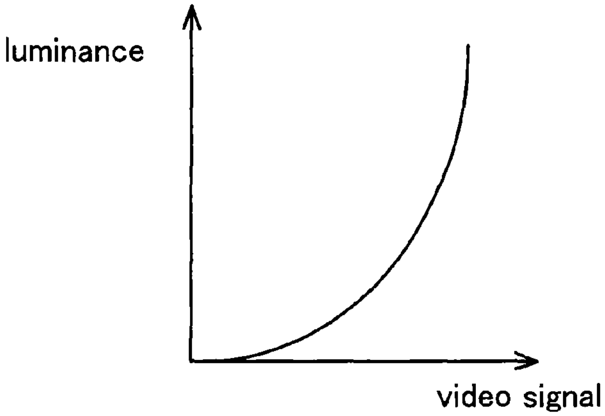
FIGS. 4A to 4C illustrate driving methods of a display device of the invention.
Figure 4B:
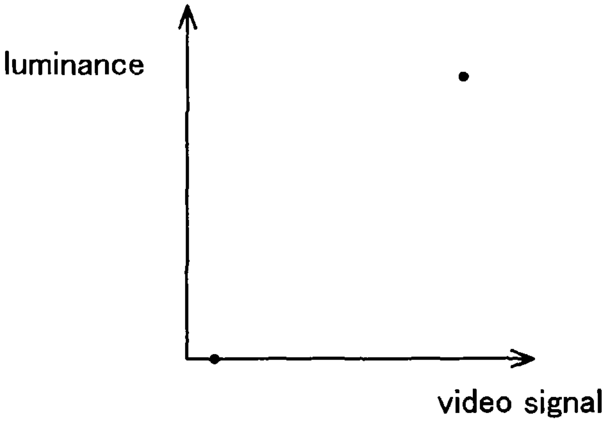
Figure 4C:
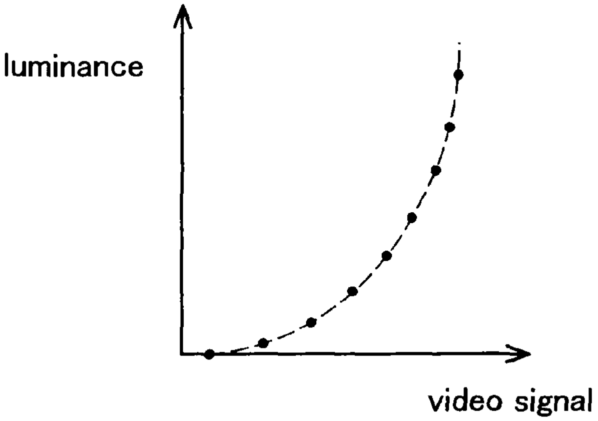

Although FIG. 3 illustrates the case of using two kinds of display modes, which are an analog mode and a digital mode, the invention is not limited to these. A display mode using a discrete value, but not a binary value will be called a multivalued mode. FIGS. 4A to 4C each show the exemplary relationship between video signals and luminance.

FIG. 4A shows a case of an analog mode. When a video signal changes in an analog manner, luminance changes in an analog manner correspondingly, in this Embodiment Mode.

FIG. 4B shows a case of a digital mode. A video signal has a binary value. A pixel emits light when an input video signal has one of the two values, while the pixel does not emit light when an input video signal has the other of the two values.

FIG. 4C shows a case of a multivalued mode. Although a video signal has a discrete value, it does not have a binary value, in this Embodiment Mode.

Figure 5:
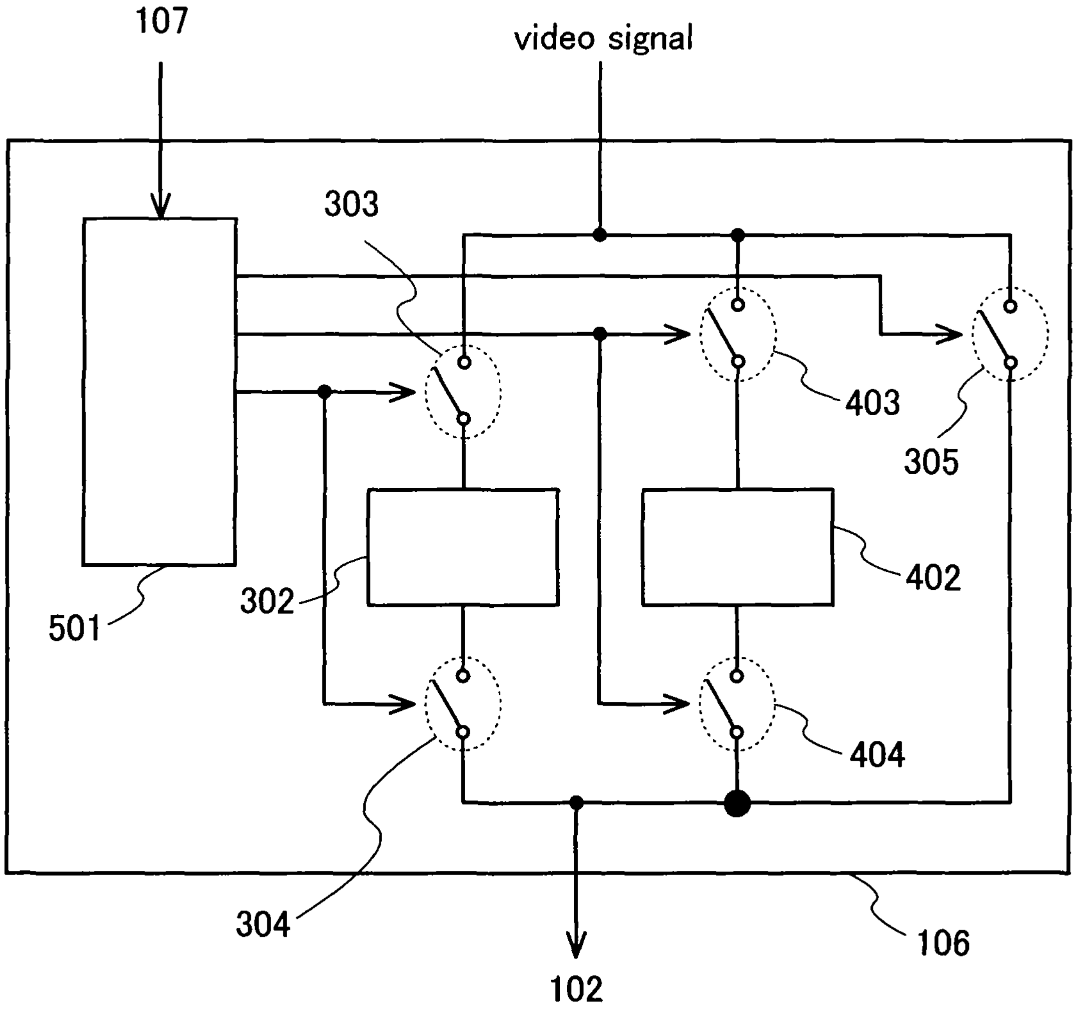
FIG. 5 illustrates a configuration of a display device of the invention.

FIG. 5 shows a specific configuration of the video signal generating circuit 106 which corresponds to the case of a multivalued mode in addition to the aforementioned analog mode and digital mode. A display mode controlling circuit 501 performs control based on a signal input from the controller 107, so that display can be performed in accordance with each display mode. For example, when a digital mode is selected, the switches 303 and 304 are turned on. Then, an input video signal is processed with the binarization circuit 302, which outputs a new signal to the source driver 102. In that case, switches 403, 404, and 305 are turned off. On the other hand, when an analog mode is selected, the switch 305 is turned on to directly output an incoming signal to the source driver 102. If a video signal input to the video signal generating circuit 106 has an analog value, it is directly output without undergoing any process; therefore, a signal with an analog value is output to the source driver 102. When a multivalued mode is selected, the switches 403 and 404 are turned on. Then, an input video signal is processed with a signal value conversion circuit 402 to be output to the source driver 102. In this case, the switches 303, 304, and 305 are turned off. Note that the signal value conversion circuit means a circuit for converting an analog signal into a signal having a discrete value of two or more.

Figure 6A:
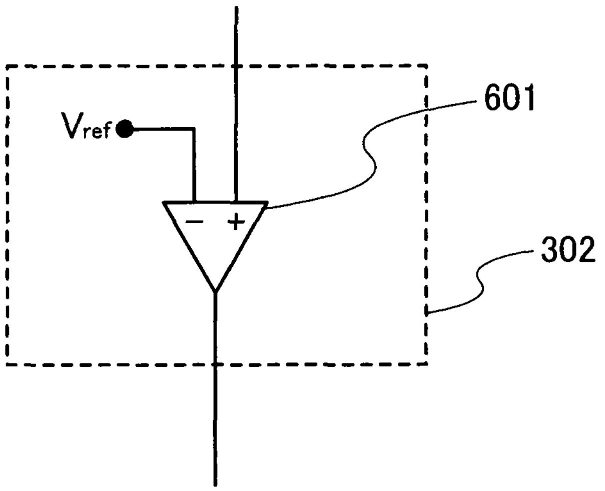
FIGS. 6A and 6B illustrate configurations of a display device of the invention.
Figure 6B:
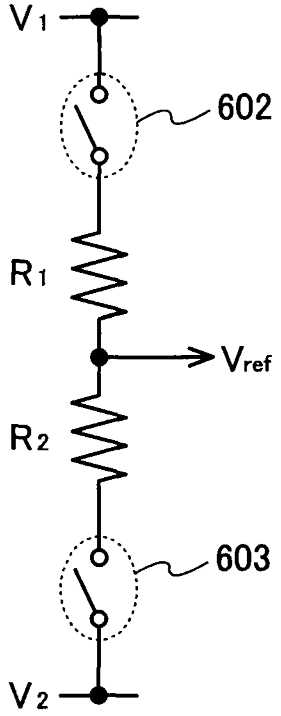

FIGS. 6A and 6B show specific configurations of the binarization circuit 302. As shown in the circuit diagram of FIG. 6A, a comparator circuit is constructed by using an operational amplifier. Depending on whether an input voltage is higher or lower than a reference potential Vref, an H signal or an L signal is output, thereby performing binarization.

Although an operational amplifier is used to construct a comparator circuit herein, the invention is not limited to this. The comparator circuit may be constructed with a chopper inverter comparator circuit or other circuits.

FIG. 6B shows a circuit for generating a reference potential Vref. A level of the reference potential Vref corresponds to a potential difference between voltages V1 and V2, which are divided by resistors R1 and R2. Switches 602 and 603 are required to be turned on only when operating the binarization circuit. As a result, a period in which a current flows through the resistors R1 and R2 can be shortened, thereby power consumption can be reduced.

Figure 7:
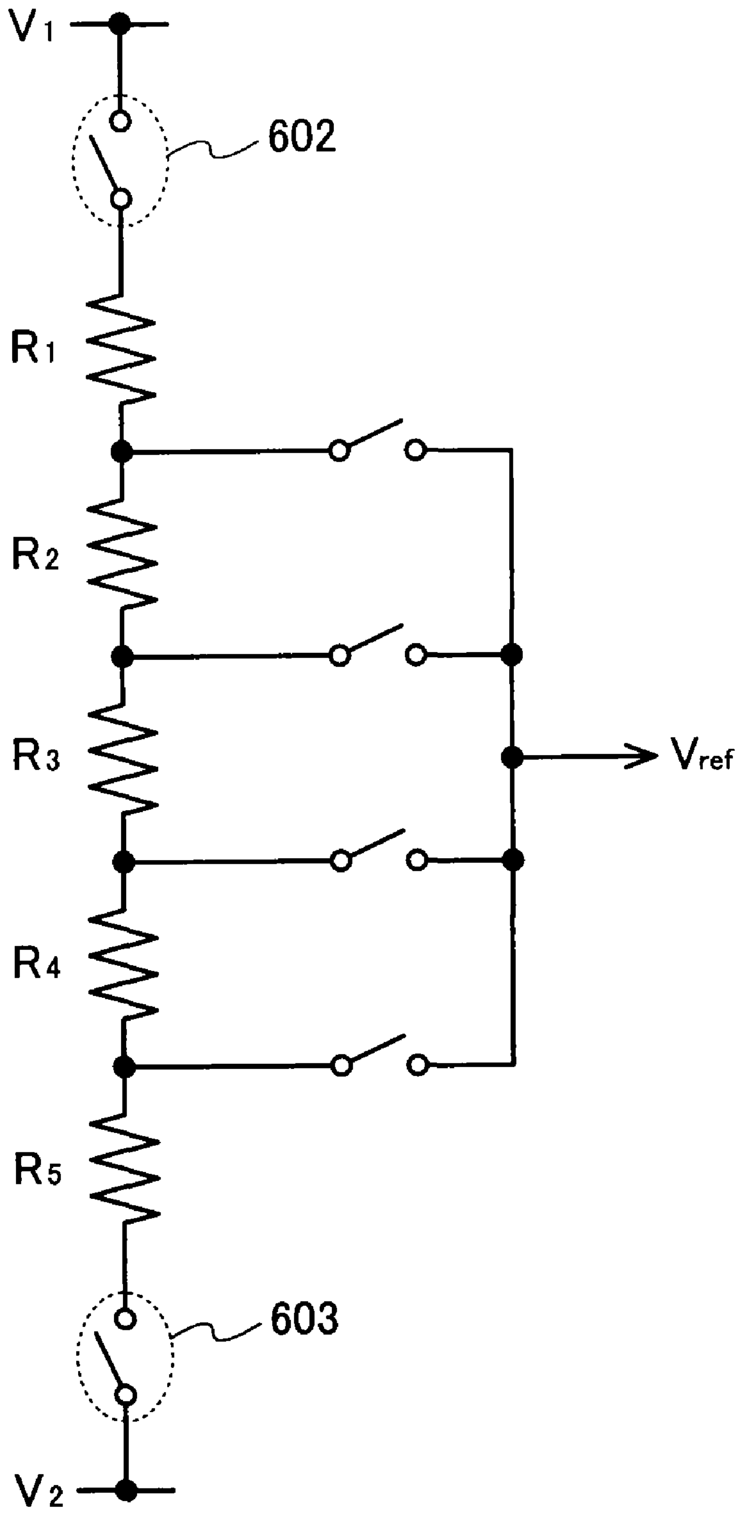
FIG. 7 illustrates a configuration of a display device of the invention.

Note that in order to change the reference potential Vref depending on the circumstance, many resistors may be connected as shown in FIG. 7, so that the output node can be switched.

Figure 8:
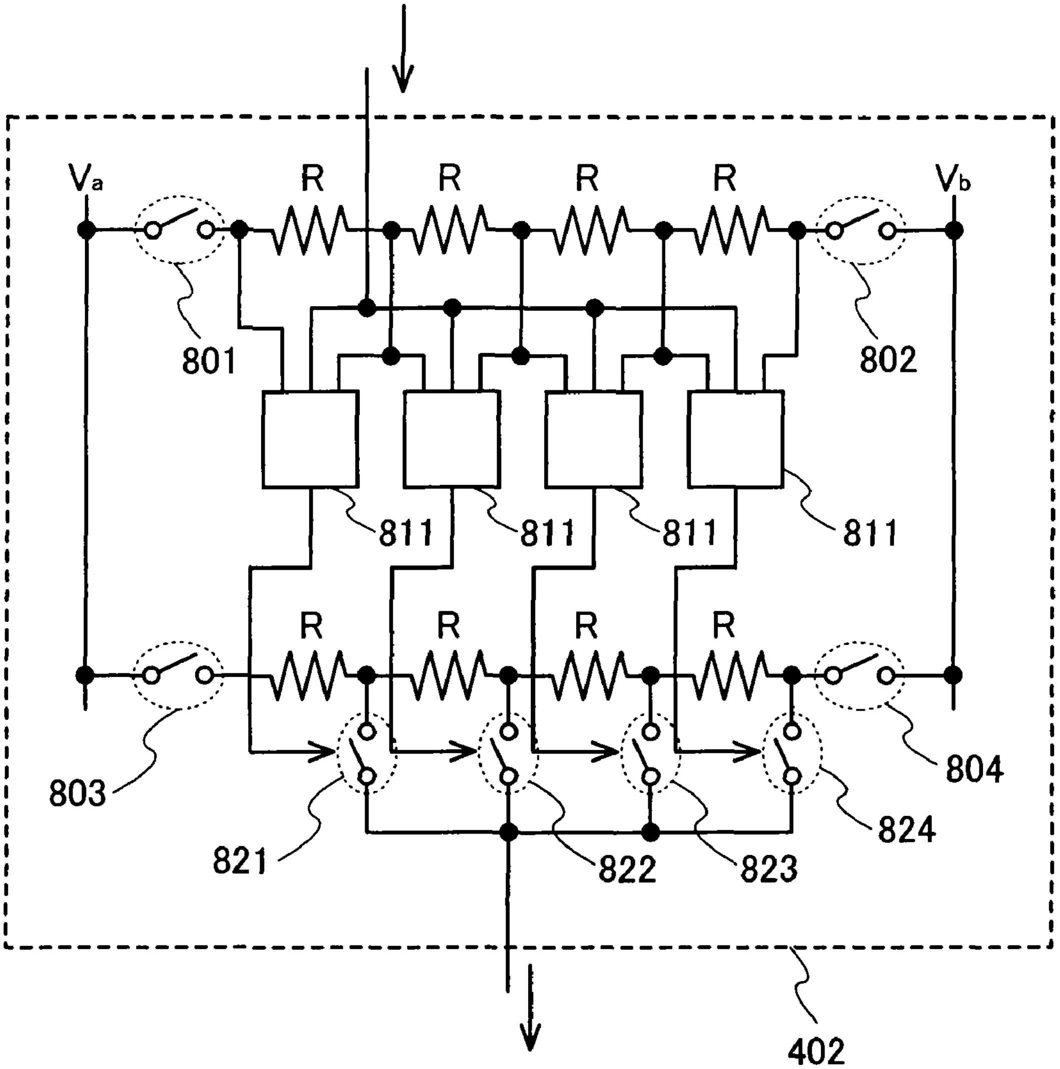
FIG. 8 illustrates a configuration of a display device of the invention.

Next, FIG. 8 shows a specific configuration of the signal value conversion circuit 402. An input signal is input to each of determination circuits 811. In addition, two voltages which correspond to the reference potentials are input to the determination circuit 811. When a potential of a signal input to the determination circuit 811 falls within the range of the two reference potentials, the determination circuit 811 outputs an H signal. As a result, one of switches 821 to 824 is turned on to output a voltage obtained by sampling video data. Switches 801 to 804 are required to be turned on only when operating the signal value conversion circuit 402. As a result, a period in which a current flows through Va and Vb can be shortened, thereby power consumption can be reduced.

Figure 9:
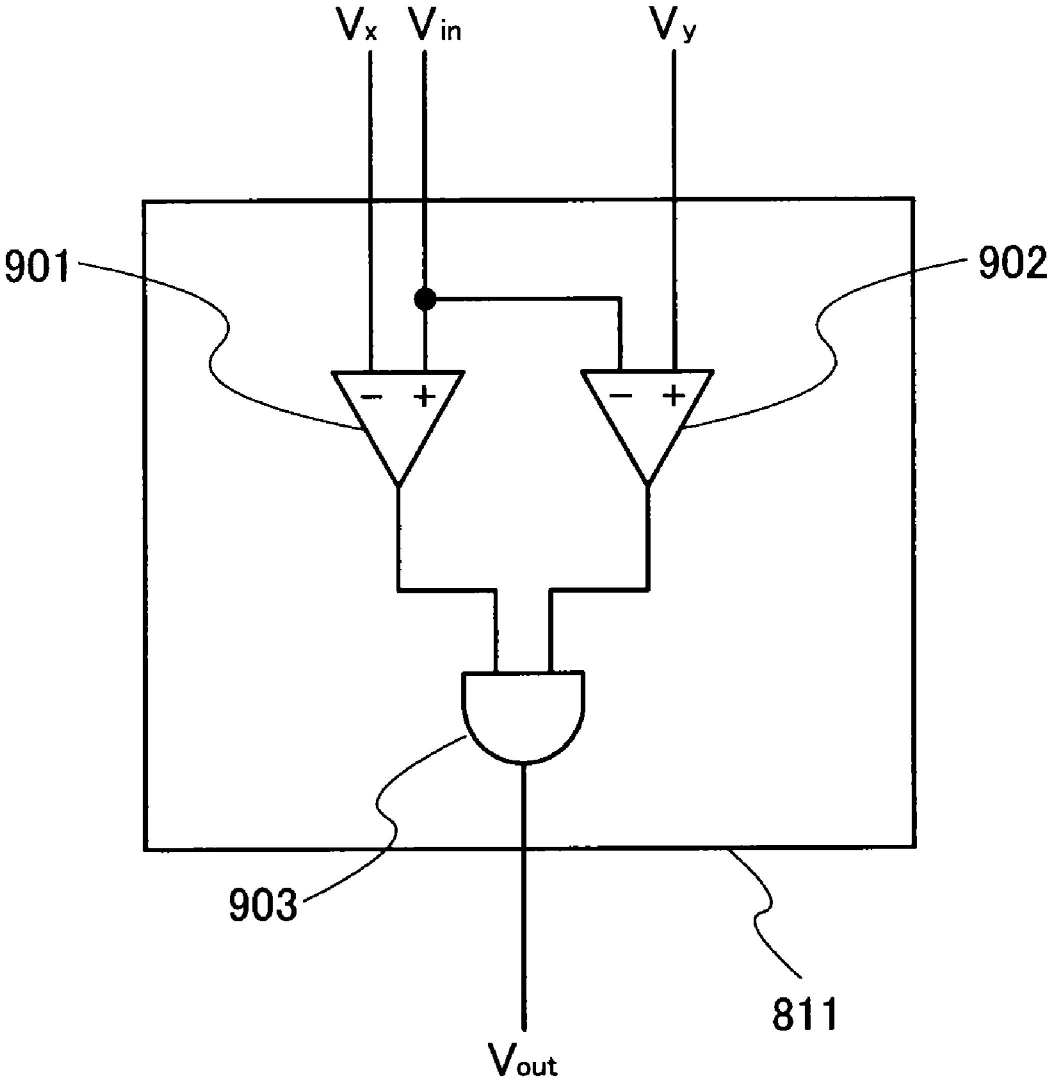
FIG. 9 illustrates a configuration of a display device of the invention.

FIG. 9 shows a specific configuration of the determination circuit 811. A comparator circuit is constructed by using operational amplifiers 901 and 902. The operational amplifiers 901 and 902 respectively output H signals when a potential Vin of an input signal is not lower than a reference potential Vx and not higher than a reference potential Vy. Then, the signals are input to an AND circuit 903. When the both signals input to the AND circuit 903 are H signals, the AND circuit 903 outputs an H signal.

Although FIG. 9 shows an example of using an AND circuit, the invention is not limited to this configuration. A similar function can also be implemented by using an OR circuit, a NAND circuit, or a NOR circuit.

In this manner, when display is performed with a digital mode or a multivalued mode, thresholding is performed to sample video data. As a result, even if an image is mixed with noise, the noise can be removed when actually displaying an image. In addition, since adjacent gray scales can have a big difference in luminance, clear display is realized with improved contrast.

Selection of such display modes can be controlled in accordance with the intensity of outside light. In this manner, by controlling the number of gray scales of an image to be displayed in accordance with the surrounding illuminance, a display device with excellent visibility can be provided. That is, a display device which exhibits high visibility in various environments can be provided, in the wide range from, for example, dark places or dark places or indoors (e.g., under a fluorescent lighting) to outdoors (e.g., under the sunlight).

Note that various types of elements, such as an electric switch or a mechanical switch may be used for the switches shown in FIGS. 2, 3, and 5, for example, the sampling switch 201. That is, anything which can control a current flow can be used, and various elements may be used without limiting to a certain element. For example, it may be a diode (e.g., a PN junction diode, a PIN diode, a Schottky diode, or a diode-connected transistor), or a logic circuit configured with them. Therefore, in the case of using a transistor as a switch, a polarity thereof (conductivity) is not particularly limited because it operates just as a switch. However, when off-current is preferred to be small, a transistor of a polarity with small off-current is desirably used. As a transistor with small off-current, there is a transistor provided with an LDD region or a transistor having a multi-gate structure. Further, it is desirable that an n-channel transistor be employed when a potential of a source terminal of the transistor which is operated as a switch is closer to the low-potential-side power supply potential (e.g., Vss, GND, or 0 V), while a p-channel transistor be employed when the potential of the source terminal is closer to the high-potential-side power supply potential (e.g., Vdd). This helps the switch operate efficiently as the absolute value of the gate-source voltage of the transistor can be increased. Note also that a CMOS switch may be constructed by using both n-channel and p-channel transistors. When a CMOS is used as a switch, it can appropriately operate either in the case where a voltage to be output through the switch (i.e., an input voltage of a switch) is high or low compared to an output voltage.

Figure 14A:
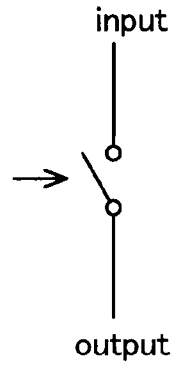
FIGS. 14A to 14D illustrate configurations of a display device of the invention.
Figure 14B:
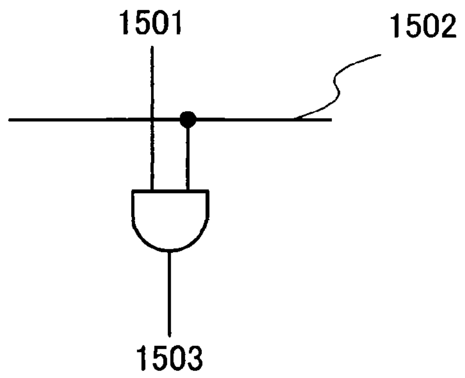

FIGS. 14A to 14D show examples of a switch. FIG. 14A schematically shows a switch. FIG. 14B shows a switch using an AND circuit. Whether a signal from an input 1501 is transmitted to an output 1503 or not is controlled with a control line 1501. Note that in FIG. 14B, such a control is possible that an L signal is output from the output 1503 regardless of an input signal. However, the output 1503 is never in a floating state. Accordingly, the switch shown in FIG. 14B is preferably used in the case where the output 1503 is connected to an input of a digital circuit or the like. In the case of bringing the output 1503 into a floating state, the switch shown in FIG. 14B cannot be used. This is because a digital circuit will never have an output in a floating state even when an input thereof is set in a floating state. Provided that an input of a digital circuit is set in a floating state, an output thereof undesirably becomes unstable. Therefore, in order to be connected to an input of a digital circuit, the switch shown in FIG. 14B can be preferably used.

Although FIG. 14B shows a configuration using an AND circuit, the invention is not limited to this. A similar function can be implemented by using an OR circuit, a NAND circuit, or a NOR circuit.

Figure 14C:
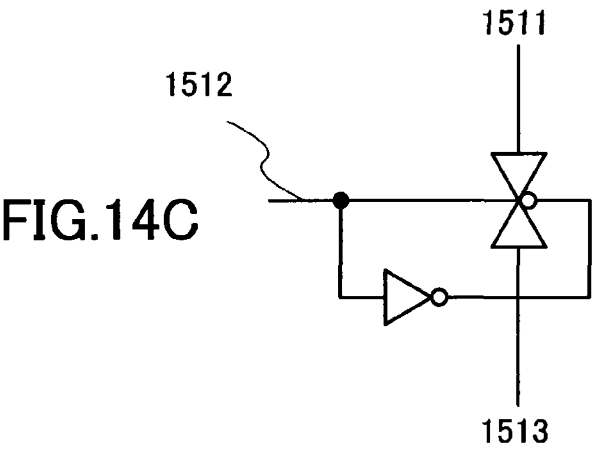
Figure 14D:
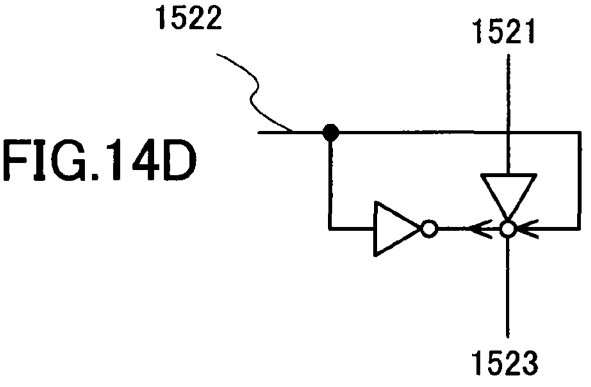

On the other hand, in order to set an input to be in a floating state, a switch shown in FIG. 14C or FIG. 14D is preferably used. FIG. 14C shows a circuit called a transmission gate or an analog switch. In FIG. 14C, a potential of an input 1511 is almost directly transmitted to an output 1513. Therefore, this is suitable for transmitting analog signals. FIG. 14D is a circuit called a clocked inverter. In FIG. 14D, a signal from an input 1521 is inverted to be transmitted to an output 1523. Therefore, this is suitable for transmitting digital signals.

Thus, the switch shown in FIG. 14C is preferably used for the sampling switch 201, the switch 305, the switch 602, the switch 801, or the like. Meanwhile, since the switch 304 or the like is required to have an output in a floating state, the switch shown in FIG. 14C or FIG. 14D is preferably used therefor. Note that the switch shown in FIG. 14D is more preferable since an input to the switch 304 is a digital signal.

Embodiment Mode 2

In Embodiment Mode 1, description has been made of the case where a video signal input to the video signal generating circuit 106 has an analog value. Next, description will be made of the case where a signal with a digital value is input.

Figure 24:
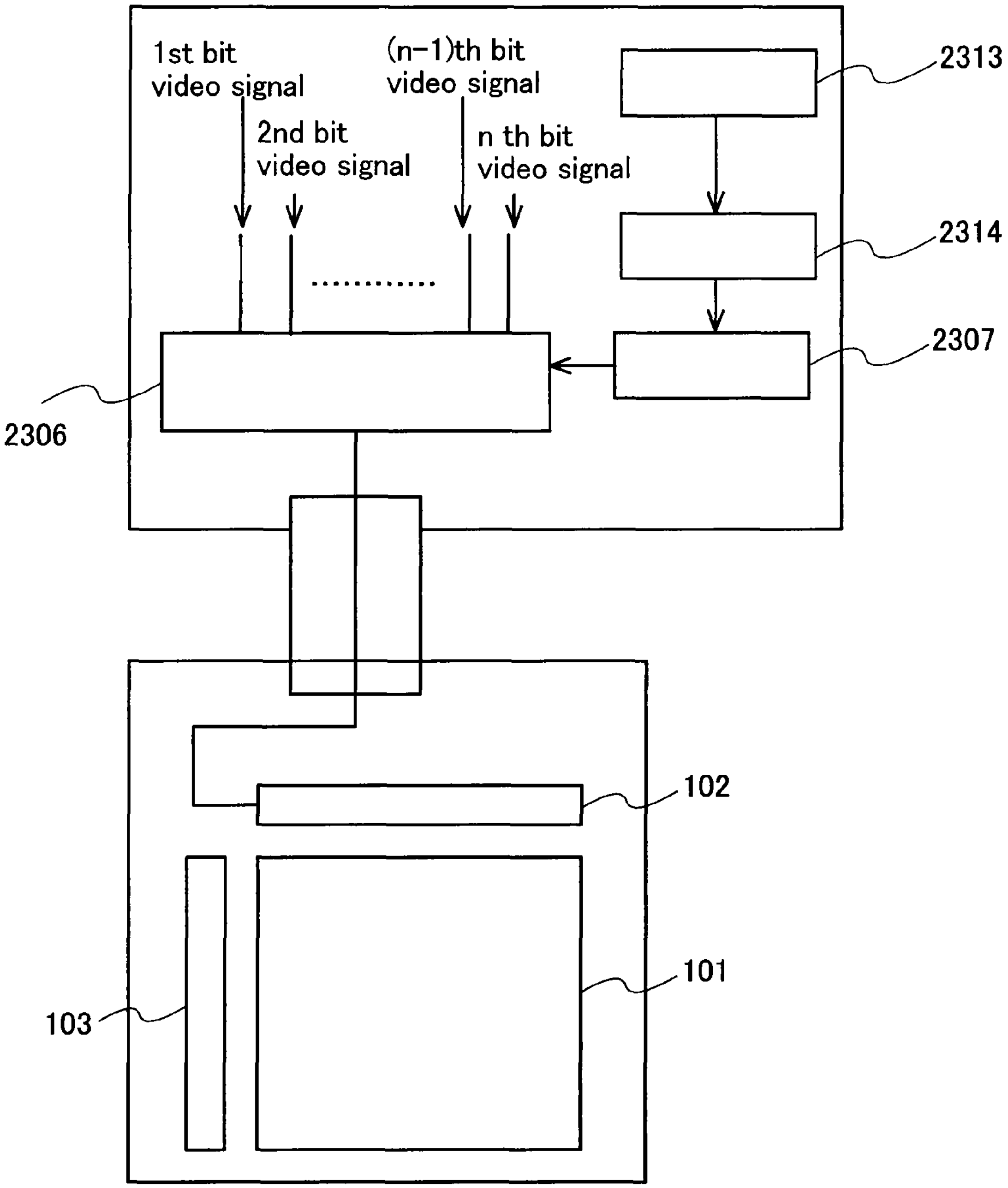
FIG. 24 illustrates a configuration of a display device using the invention.

FIG. 24 shows a schematic view of a display device. A video signal input to the source driver 102 is generated in accordance with each display mode, in a circuit 2306 for generating video signals in accordance with each display mode (hereinafter simply referred to as a video signal generating circuit 2306). The video signal generating circuit 2306 is controlled by a controller 2307. The video signal generating circuit 2306 receives an original video signal. Then, the video signal generating circuit 2306 generates a video signal corresponding to each display mode based on the original video signal, and outputs the signal to the source driver 102.

An optical sensor 2313 detects outside light (light from outside that the display device receives), and the output is supplied to an amplifier 2314. The amplifier 2314 amplifies an electric signal output from the optical sensor 2313, and supplies the amplified signal to a controller 2307. Note that the amplifier 2314 is not required if the electric signal output from the optical sensor 2313 is sufficiently large.

A controller 2307 controls the video signal generating circuit 2306 based on the signal input from the optical sensor 2313. Thus, the number of gray scales of a video signal supplied to the source driver 102 is controlled by using the signal from the optical sensor 113, that is, in accordance with the surrounding brightness. In order to control the number of gray scales, the number of gray scales may be gradually changed in accordance with the surrounding brightness, or it may be changed by providing several display modes, so that one display mode is switched to another display mode.

The display mode, that is, the number of gray scales to be displayed is changed based on the output of the optical sensor 2313. Specifically, when the display device receives strong light from outside and the output of the optical sensor 2313 exceeds a certain value, the total number of gray scales of an image to be displayed on the display screen is controlled to be reduced. When the display device receives strong light from outside, the boundary between adjacent gray scales becomes ambiguous, thereby an image displayed on the display screen is blurred. However, when the number of gray scales is reduced in accordance with the outside light that the display device receives, the boundary between adjacent gray scales can be made clear, thereby visibility of an image displayed on the display panel can be improved.

Note that the amplifier 2314 and the optical sensor 2313 may be provided over the same substrate as the pixel array 101. In that case, they may be formed over the same substrate as the pixel array 101. Alternatively, the amplifier 2314 and the optical sensor 2313 may be attached onto the substrate having the pixel array 101 by COG (Chip On Glass) bonding or bump bonding.

A display mode can be broadly classified into an analog mode and a digital mode. In the analog mode, a video signal input to a pixel has an analog value. In the digital mode, on the other hand, a video signal input to a pixel has a digital value.

Figure 25:
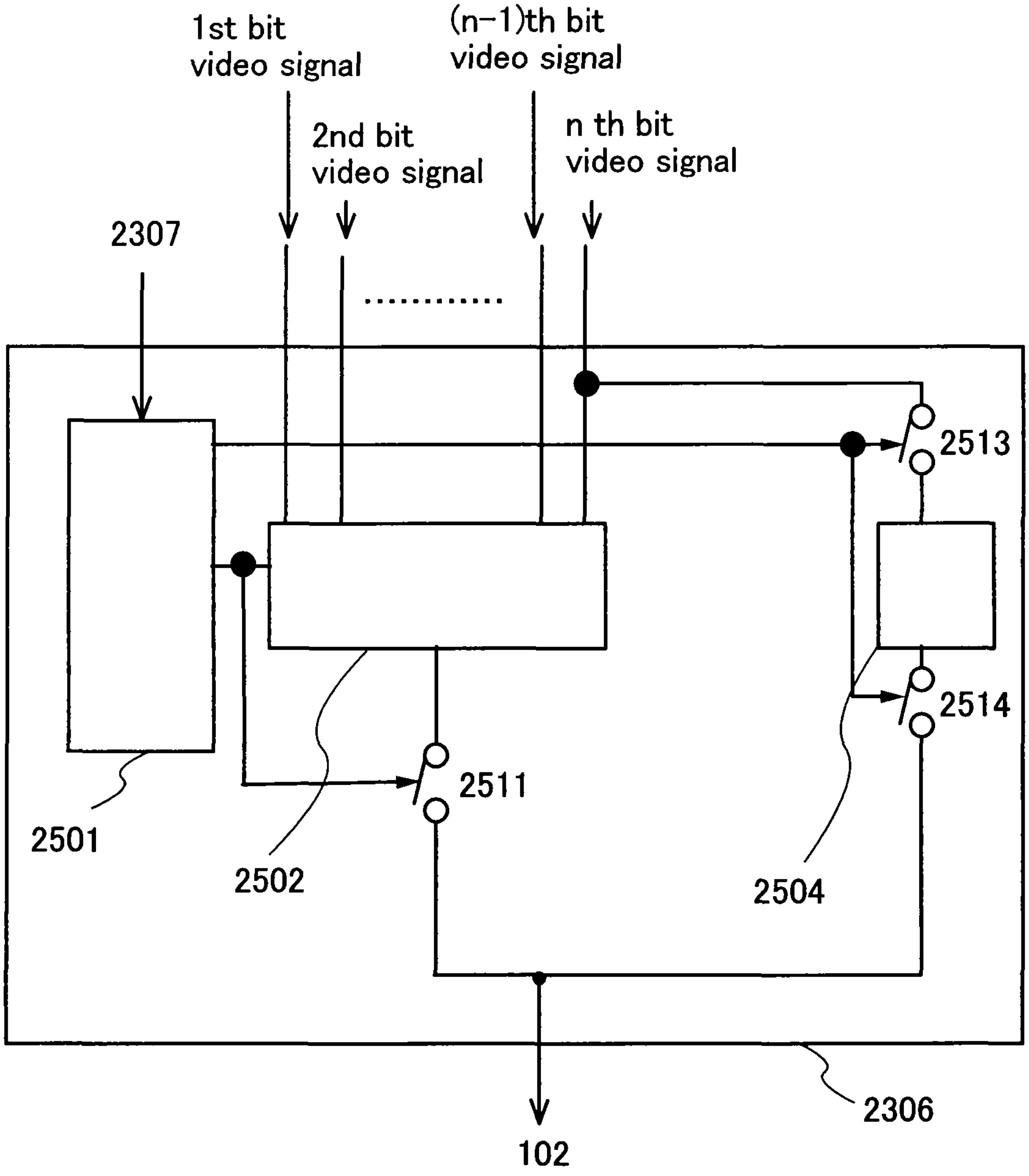
FIG. 25 illustrates a configuration of a display device of the invention.

FIG. 25 shows a specific configuration of the video signal generating circuit 2306. A display mode controlling circuit 2501 performs control based on a signal input from the controller 2307, so that display can be performed in accordance with each display mode. For example, when a digital mode is selected, switches 2513 and 2514 are turned on and only a video signal with the most significant bit is output to the source driver 102. Note that there is sometimes a case where a potential level of a video signal with the most significant bit in the analog mode does not correspond to the potential level of a video signal in the digital mode. In that case, the potential level is required to be increased to a required level. Thus, in such a case, a level converter circuit 2504 is disposed. On the other hand, when an analog mode is selected, a video signal is input to a D/A converter 2502, which outputs a new signal with an appropriate analog value to the source driver 102 through a switch 2511.

Although FIG. 25 illustrates the case of using two kinds of display modes, which are an analog mode and a digital mode, the invention is not limited to these.

Figure 26:
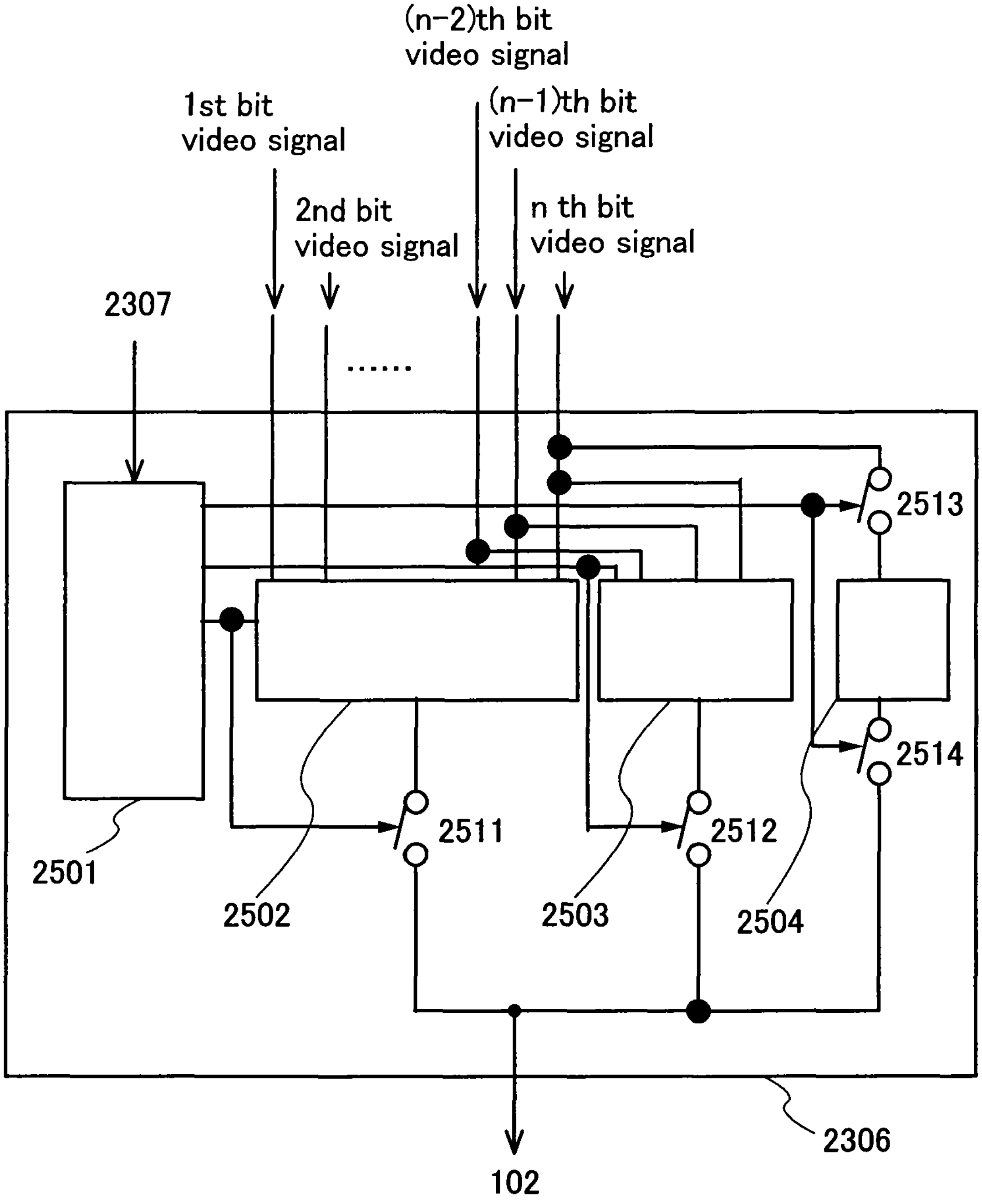
FIG. 26 illustrates a configuration of a display device of the invention.

FIG. 26 shows a specific configuration of the video signal generating circuit 2306 which corresponds to the case of a multivalued mode in addition to the aforementioned analog mode and digital mode. The display mode controlling circuit 2501 performs control based on a signal input from the controller 2307, so that display can be performed in accordance with each display mode. When an analog mode or a digital mode is selected, a similar operation to that in FIG. 25 is performed. When a multivalued mode is selected, only a video signal with a high-order bit is input to a D/A converter circuit 2503, and a signal with a low-order bit is not input. Thus, not a smooth image display but a rough display is performed.

Figure 27:
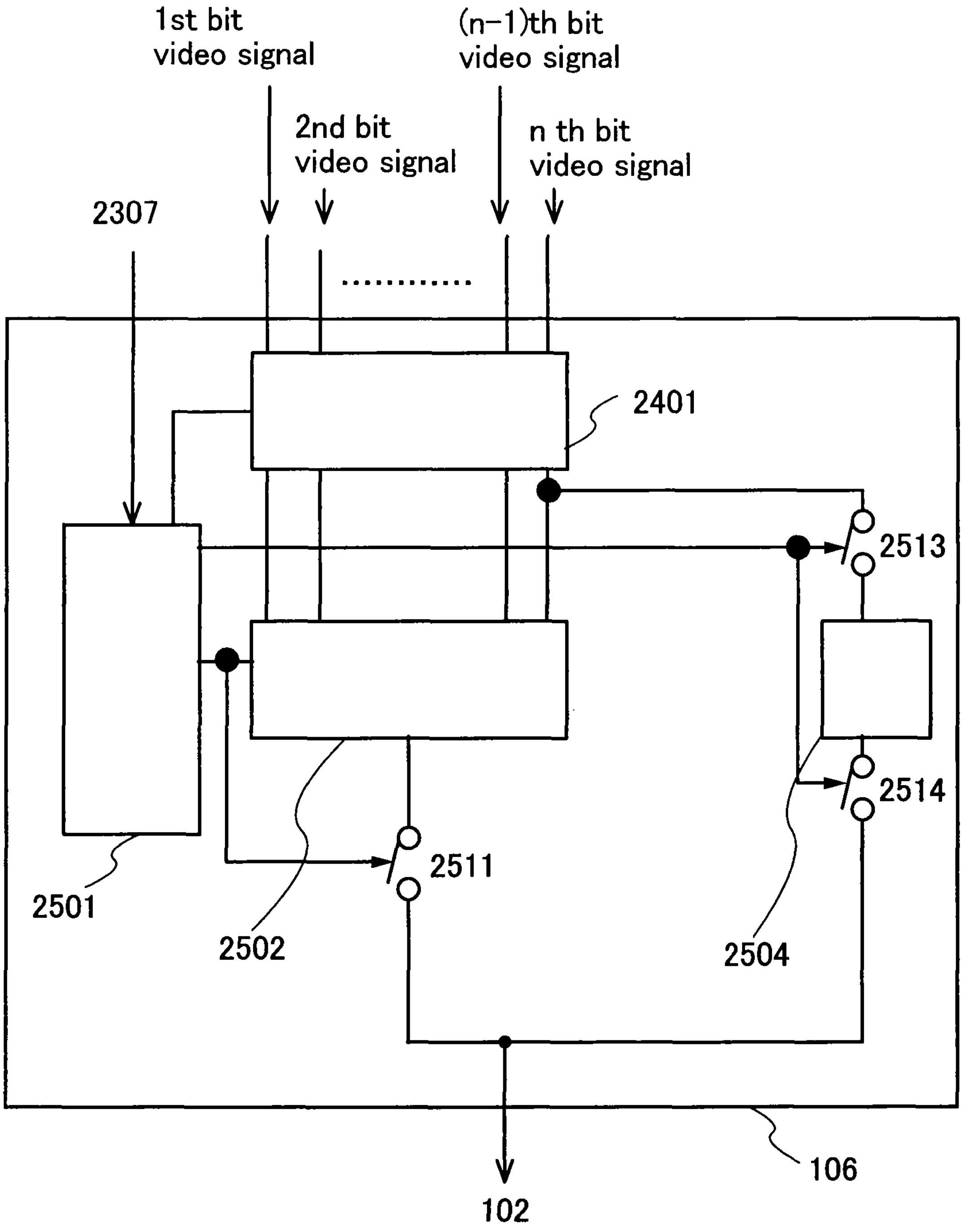
FIG. 27 illustrates a configuration of a display device of the invention.

Note that since sampling is only required to be performed without using a low-order bit in the multivalued mode, the invention is not limited to the configuration shown in FIG. 26. For example, as shown in FIG. 27, a low-order-bit data removing circuit 2401 may be disposed at the input side of the D/A converter circuit 2502. As a result, a value of a low-order bit is forcibly turned into 0 (or an L signal) in accordance with a signal from the display mode control circuit. Thus, not a smooth image display but a rough display is performed.

Figure 28:
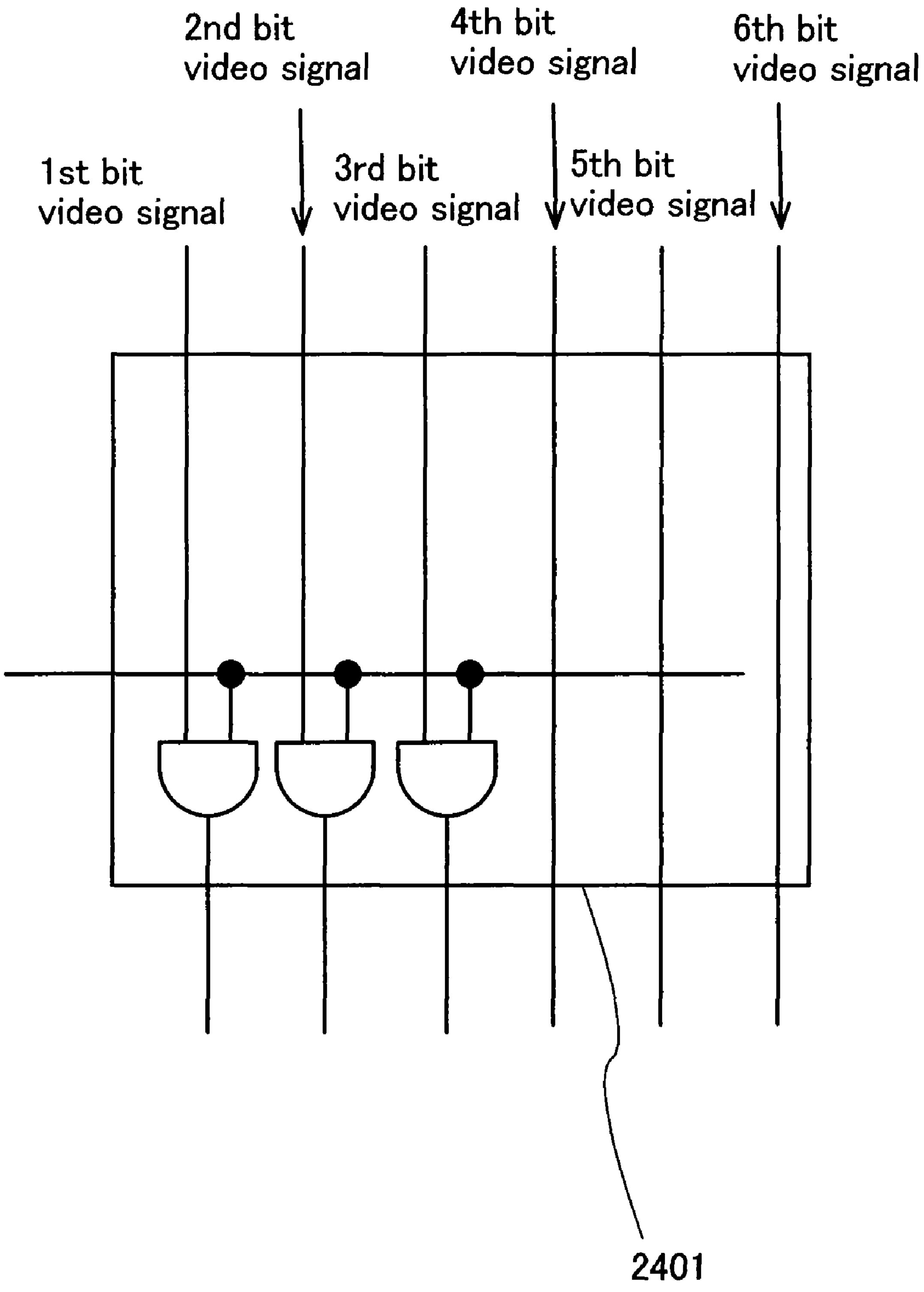
FIG. 28 illustrates a configuration of a display device of the invention.

FIG. 28 shows an example of the low-order-bit data removing circuit 2401. Data on three low-order bits can be forcibly brought into 0 (or L signals) by using AND circuits.

Although FIG. 28 shows an example of using AND circuits, the invention is not limited to such a configuration. A similar function can be implemented by using an OR circuit, a NAND circuit, or a NOR circuit. In addition, although FIG. 28 shows an example of inputting 6-bit video signals and data on the three low-order bits is forcibly turned into 0 (or L signals), the invention is not limited to such a configuration. Thus, the configuration may be modified as appropriate.

Figure 29:
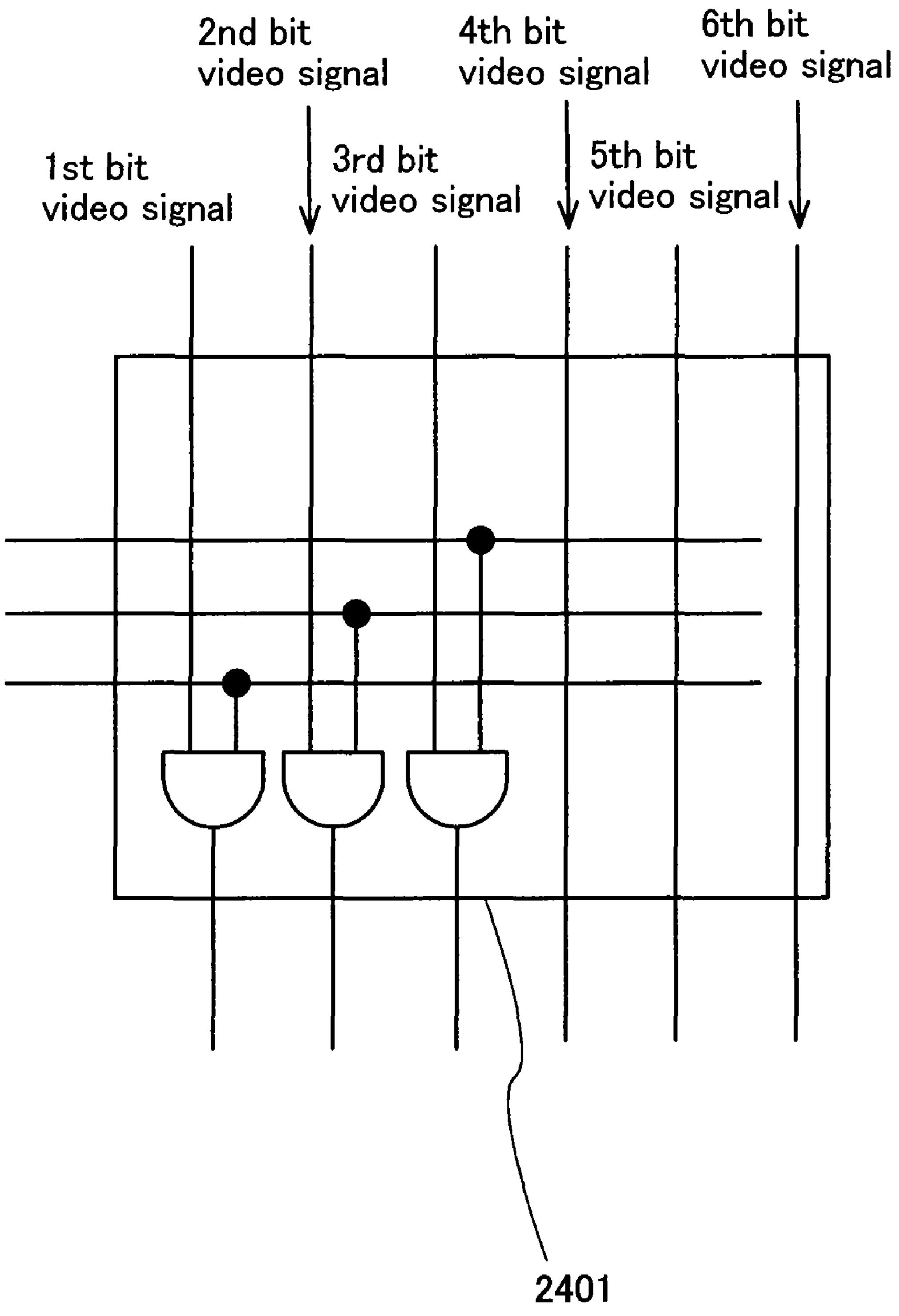
FIG. 29 illustrates a configuration of a display device of the invention.

Such modification is possible that the number of bit data to be forcibly brought into 0 (or L signals) is determined when actually operating the circuit. FIG. 29 shows a circuit diagram of such a case. Since separate signals are input to respective AND circuits, each circuit can be controlled independently of each other.

Figure 30:
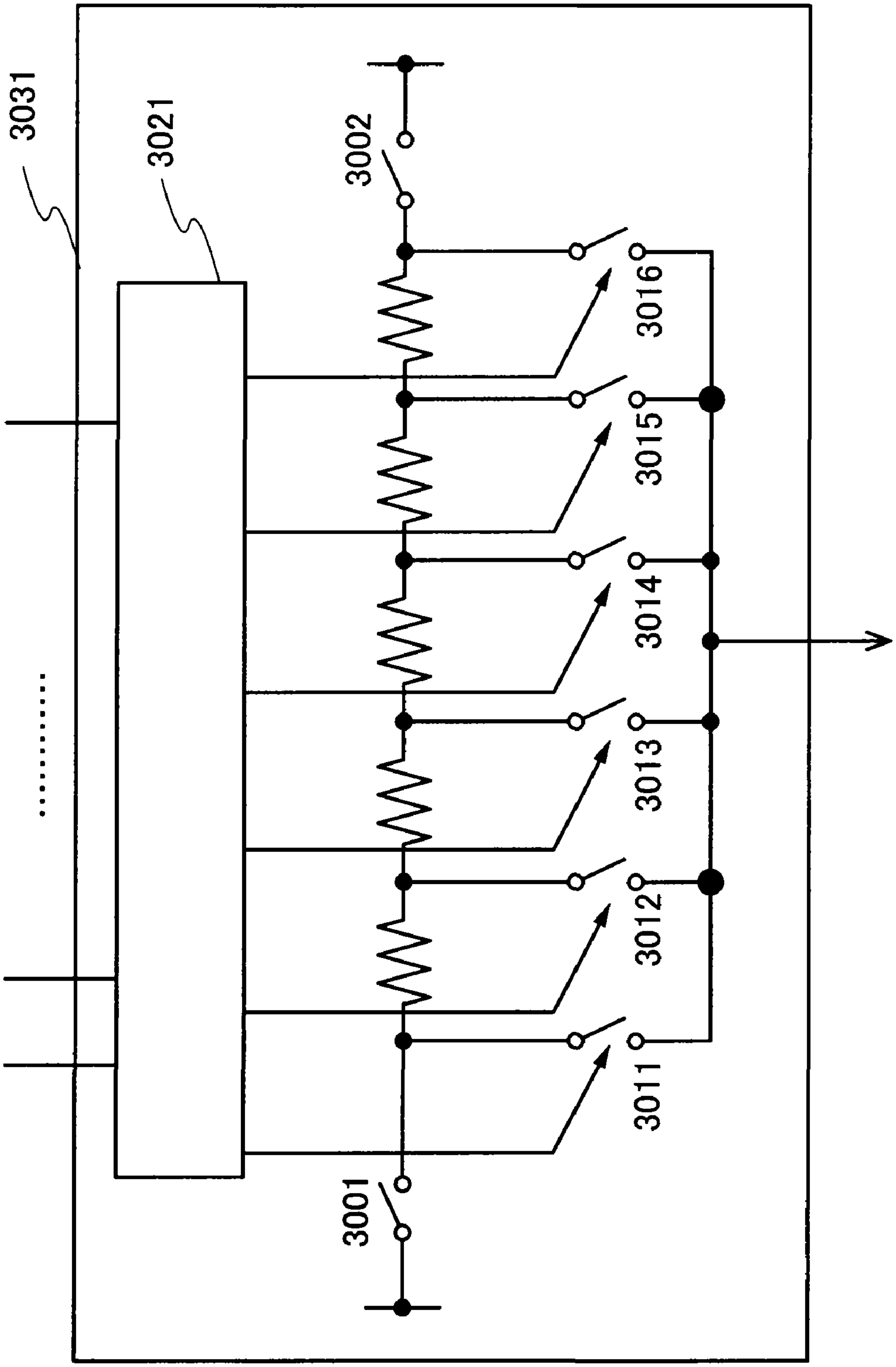
FIG. 30 illustrates a configuration of a display device of the invention.

Next, FIG. 30 shows a specific configuration of the D/A converter circuit shown in FIGS. 25 to 27. A decoder 3021 decodes the number of digital signals input, thereby the corresponding number of switches are turned on among switches 3011 to 3016. Thus, an analog voltage is output. Switches 3001 and 3002 are required to be turned on only when operating the D/A converter circuit. As a result, a period in which a current flows through resistors can be shortened to reduce power consumption.

In this manner, when display is performed with a digital mode or a multivalued mode, thresholding is performed to sample video data. As a result, even if an image is mixed with noise, the noise can be removed when actually displaying an image. In addition, since adjacent gray scales can have a big difference in luminance, clear display is realized with improved contrast.

Selection of such display modes can be controlled in accordance with the intensity of outside light. In this manner, by controlling the number of gray scales of an image to be displayed in accordance with the surrounding illuminance, a display device with excellent visibility can be provided. That is, a display device which exhibits high visibility in various environments can be provided, in the wide range from, for example, dark places or indoors (e.g., under a fluorescent lighting) to outdoors (e.g., under the sunlight).

This embodiment mode can be implemented in combination with any of the other embodiment modes as appropriate.

Embodiment Mode 3

In this embodiment mode, a driving method of a pixel in an analog mode will be described.

Figure 16A:
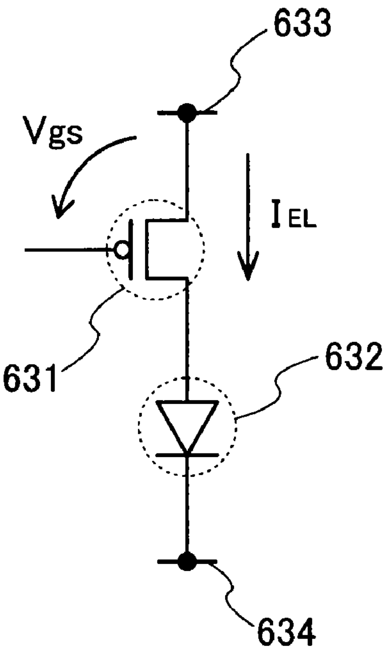
FIGS. 16A and 16B illustrate configurations of a display device of the invention.
Figure 16B:
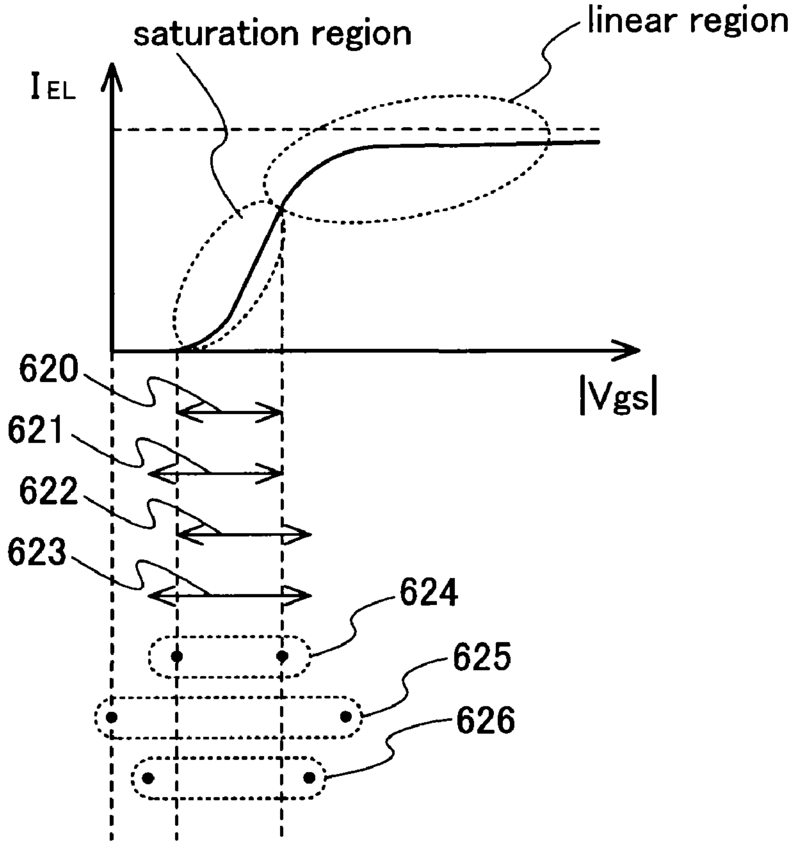

FIGS. 16A and 16B show the relationship between a voltage applied to a driving transistor and a light-emitting element, and a current flowing therein. FIG. 16A shows a circuit of a driving transistor 631 and a light-emitting element 632. The driving transistor 631 and the light-emitting element 632 are connected in series between a wire 633 and a wire 634. Since the wire 634 has a higher potential than the wire 634, a current flows from the driving transistor 631 to the light-emitting element 632.

The driving transistor 1706 in FIG. 15 corresponds to the driving transistor 631 in FIG. 16A, and the light-emitting element 1707 in FIG. 15 corresponds to the light-emitting element 632 in FIG. 16A.

FIG. 16B shows the relationship between a gate-source voltage (i.e., absolute value) of the driving transistor 631 and a current flowing in the driving transistor 631 and the light-emitting element 632. When the gate source voltage (i.e., absolute value) is increased, the current value increases correspondingly. This is because the driving transistor 631 operates in the saturation region. In the saturation region, a current flowing in a transistor increases in proportion to the square of the gate-source voltage thereof. When the gate-source voltage (i.e., absolute value) is further increased, a voltage applied to the light-emitting element 632 increases, thereby the drain-source voltage becomes lower to operate the driving transistor 631 in the linear region. Then, the increasing rate of the current value becomes smaller in accordance with the decrease in the drain-source voltage. Then, a current value higher than a certain value does not flow into the transistor any more.

In the analog mode, gray scales are expressed by using an analog gray scale method. Thus, it is desirable to operate the driving transistor 631 and the light-emitting element 632 in such a manner than a current flowing therein changes in an analog manner by changing the gate-source voltage (i.e., absolute value) of the driving transistor 631 in an analog manner.

For example, the gate-source voltage (i.e., absolute value) of the driving transistor 631 may be controlled in accordance with the condition as indicated by 620 which has a range from the point at which few current flows in the driving transistor to the point immediately before the transistor starts to operate in the saturation region. The condition that few current flows in the driving transistor corresponds to the case where the gate-source voltage (i.e., absolute value) of the driving transistor 631 is about equal to the threshold voltage of the driving transistor 631.

Alternatively, the gate-source voltage (i.e., absolute value) of the driving transistor 631 may be controlled in accordance with the condition as indicated by 621, such that the gate-source voltage (i.e., absolute value) of the driving transistor 631 is increased gradually from the condition of being certainly lower than the threshold voltage of the driving transistor 631 so as to operate the transistor in the saturation region finally. In this manner, by controlling the gate-source voltage (i.e., absolute value) of the driving transistor 631 to be certainly lower than the threshold voltage of the driving transistor 631 in order to perform a black display, a black display can be certainly performed. For example, when the current characteristics of the driving transistor 631 vary, the threshold voltage thereof varies accordingly. Therefore, even when a black display is performed in a certain pixel, it is possible that another pixel slightly emits light. As a result, contrast is decreased. Thus, in order to prevent such a circumstance, it is preferable to operate the driving transistor 631 in the voltage range indicated by 621.

Although the driving transistor 631 is operated in the saturation region in the conditions of 620 and 621 even when the gate-source voltage (i.e., absolute value) of the driving transistor 631 is increased, the invention is not limited to these. For example, the driving transistor 631 may be operated by using the linear region as well as the saturation region. The driving transistor 631 may be operated in the linear region as long as a current flowing in the driving transistor 631 and the light-emitting element 632 changes in an analog manner by changing the gate-source voltage (i.e., absolute value) of the driving transistor 631 in an analog manner.

Next, description will be made of a case of optimizing a gate-source voltage of the driving transistor 631 in accordance with the emission color of the light-emitting element 632 in order to keep a proper color balance. Luminance or a current value of the light-emitting element 632 changes in accordance with the emission color. Therefore, it is required to keep a proper color balance. In order to keep a proper color balance, it is desirable to change the gate-source voltage (i.e., absolute value) of the driving transistor 631 for each color. Alternatively, it is desirable to change the current supply capability of the driving transistor 631 (i.e., width of the transistor) for each color. As a further alternative, it is desirable to change a light-emitting area of the light-emitting element 632 for each color. In addition, the aforementioned methods are desirably combined with each other. Accordingly, a proper color balance can be maintained.

Note that it is also possible to change the potential of the wire 633 for each color. However, there arises such a disadvantage that a voltage for turning off the driving transistor 631 also changes between each color. Therefore, the potential of the wire 633 is preferably the same between all colors.

Although description has been made heretofore of the case where the driving transistor 631 is a p-channel transistor, the invention is not limited to this. Those skilled in the art can easily change the direction of a current flow by employing an n-channel transistor for the driving transistor 631. In such a case, a level of the gate-source voltage of the driving transistor 631 is affected by the voltage-current characteristics of the light-emitting element 632.

Although this embodiment mode illustrates the case of an analog mode, it can similarly applied to the case of a multi-valued mode.

Note that this embodiment mode corresponds to the detailed description of the pixel in Embodiment Mode 1. Therefore, this embodiment mode can be implemented in combination with any of Embodiment Modes 1 and 2 as appropriate.

Embodiment Mode 4

In this embodiment, description will be made of a driving method of a pixel in a digital mode.

FIG. 16B is referred to, which shows the relationship between a gate-source voltage (i.e., absolute value) of the driving transistor 631 and a current flowing in the driving transistor 631 and the light-emitting element 632. In the digital mode, a binary value is used for control operation such as on/off or H/L. That is, whether to supply a current to the light-emitting element 632 or not is controlled. First, a case of supplying no current to the light-emitting element 632 is considered. In that case, a gate-source voltage (i.e., absolute value) of the driving transistor 631 is required to be at least 0 V with no current being supplied, that is, not higher than the threshold voltage of the driving transistor 631 as indicated by 624, 625, and 626.

Next, a case of supplying a current to the light-emitting element 632 is considered. In that case, a gate-source voltage (i.e., absolute value) of the driving transistor 631 is required to be within such a range that the transistor operates in the saturation region or the linear region, or a region where the current value will not be increased any more, as indicated by 624, 625, and 626.

For example, in the case where the driving transistor 631 is operated in the saturation region, there is such an advantage that the value of current flowing in the light-emitting element 632 does not change even when the voltage-current characteristics thereof degrade. Therefore, image burn-in (ghosting) is unlikely to occur. However, when the current characteristics of the driving transistor 631 vary, a current flowing therein also varies. In such a case, display unevenness may occur.

To the contrary, when the driving transistor 631 is operated in the linear region, the value of current flowing therein is hardly affected even when the current characteristics of the driving transistor 631 vary. Therefore, display unevenness is unlikely to occur. In addition, since the gate-source voltage (i.e., absolute value) of the driving transistor 631 can be prevented from increasing too much, and further there is no need to increase the voltage between the wire 633 and the wire 634, power consumption can be suppressed.

Further, when the gate-source voltage (i.e., absolute value) of the driving transistor 631 is increased, the value of current flowing therein is hardly affected even when the current characteristics of the driving transistor 631 vary. However, when the voltage-current characteristics of the light-emitting element 632 degrade, the value of current flowing therein may change. Therefore, image burn-in becomes more likely to occur.

In this manner, when the driving transistor 631 is operated in the saturation region, the value of current flowing therein does not change even when the characteristics of the light-emitting element 632 change. Therefore, in such a case, the driving transistor 631 can be regarded as operating as a current source. Thus, such a drive is to be called a constant current drive.

In addition, when the driving transistor 631 is operated in the linear region, the value of current flowing therein does not change even when the current characteristics of the driving transistor 631 change. Therefore, in such a case, the driving transistor 631 can be regarded as operating as a switch. In addition, it can be regarded that the voltage of the wire 633 is directly applied to the light-emitting element 632. Thus, such a drive is to be called a constant voltage drive.

In the digital mode, either a constant voltage drive or a constant current drive may be used. Note that the constant voltage drive is preferably used since it is not affected by variations of transistors and power consumption can be suppressed.

Next, description will be made of a case of optimizing a gate-source voltage of the driving transistor 631 in accordance with the emission color of the light-emitting element 632 in order to keep a proper color balance. The optimization in the case of a constant current drive is similar to the one in the analog mode.

In the case of a constant voltage drive, the value of current flowing in the driving transistor 631 does not change much even when the gate-source voltage (i.e., absolute value) of the driving transistor 631 or the current supply capability (e.g., width of the transistor) thereof is changed for each color. This is because the driving transistor 631 operates just as a switch.

Therefore, it is desirable to change a light-emitting area of the light-emitting element 632 for each color. Alternatively, the potential of the wire 633 may be changed for each color. As a further alternative, the aforementioned methods are desirably combined with each other. Accordingly, a proper color balance can be maintained.

Note that in the case of performing a color display in the digital mode, a binary value is used for displaying each of RGB; therefore, a total of eight colors can be displayed.

Note also that this embodiment mode corresponds to the detailed description of the pixel in Embodiment Mode 1. Therefore, this embodiment mode can be implemented in combination with any of Embodiment Modes 1 to 3 as appropriate.

Embodiment Mode 5

Figure 17:
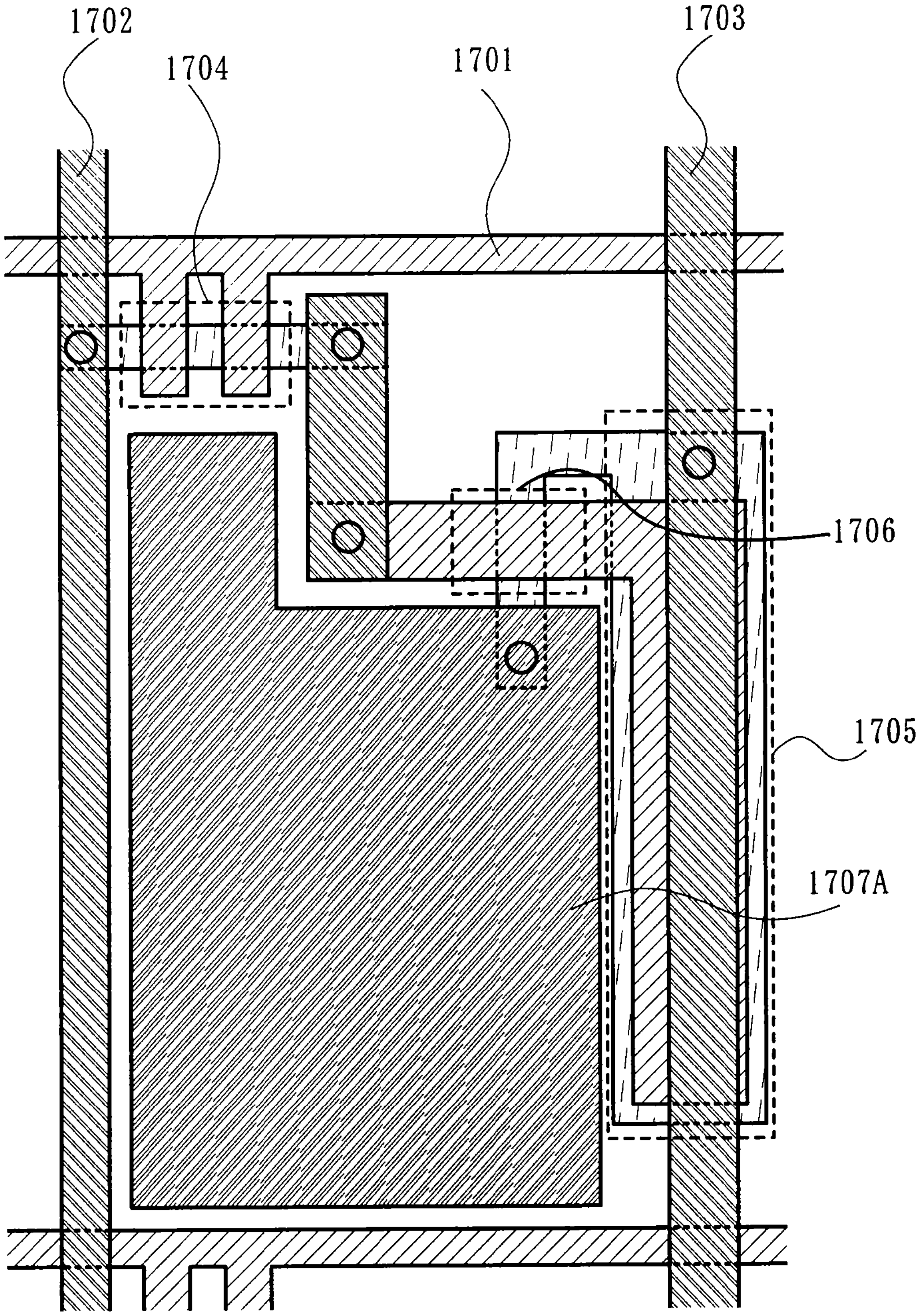
FIG. 17 illustrates a layout structure of a display device of the invention.

Next, a layout of a pixel in the display device of the invention will be described. FIG. 17 shows a layout view of the circuit diagram shown in FIG. 15. Note that the circuit diagram and the layout view are not limited to those in FIG. 15 and FIG. 17.

The selection transistor 1704, the driving transistor 1706, and thr electrode 1707A of the light-emitting element 1707 are disposed. A source and a drain of the selection transistor 1704 are connected to the source signal line 1702 and a gate of the driving transistor 1706 respectively. A gate of the selection transistor 1704 is connected to the gate signal line 1701. A source and a drain of the driving transistor 1706 are connected to the power supply line 1703 and the electrode 1707A of the light-emitting element 1707 respectively. The capacitor 1705 is connected between the gate of the driving transistor 1706 and the power supply line 1703.

The source signal line 1702 and the power supply line 1703 are formed of a second wire, while the gate signal line 1701 is formed of a first wire.

In the case of a top-gate structure, a substrate, a semiconductor layer, a gate insulating film, a first wire, an interlayer insulating film, and a second wire are formed in this order to form a film. In the case of a bottom-gate structure, a substrate, a first wire, a gate insulating film, a semiconductor layer, an interlayer insulating film, and a second wire are formed in this order to form a film.

Figure 10:
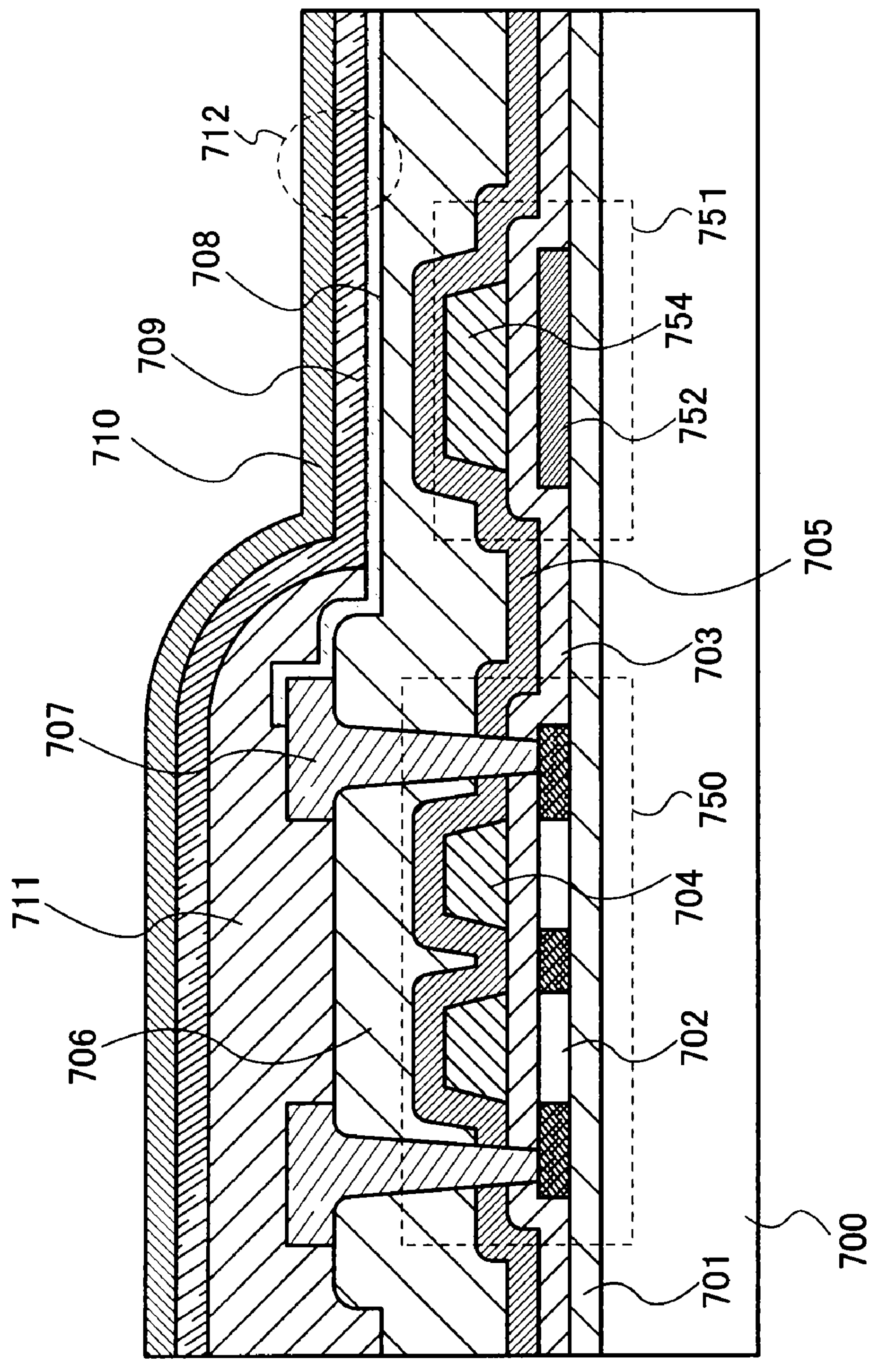
FIG. 10 illustrates a structure of a display device of the invention.

Next, FIG. 10 shows a cross-sectional view of a pixel which has a thin film transistor (TFT) and a light-emitting element connected thereto.

In FIG. 10, a base layer 701, a semiconductor layer 702 for forming a TFT 750, and a semiconductor layer 752 for forming one electrode of a capacitor 751 are formed over a substrate 700. A first insulating layer 703 is formed thereover, which functions as a gate insulating layer of the TFT 750 as well as functioning as a dielectric layer for forming a capacitance of the capacitor 751.

A gate electrode 704 and a conductive layer 754 for forming the other electrode of the capacitor 751 are formed over the first insulating layer 703. A wire 707 connected to the TFT 750 is connected to a first electrode 708 of a light-emitting element 712. The first electrode 708 is formed over a third insulating layer 706. A second insulating layer 705 may be formed between the first insulating layer 703 and the third insulating layer 706. The light-emitting element 712 is formed of the first electrode 708, an EL layer 709, and a second electrode 710. Further, a fourth insulating layer 711 is formed covering a peripheral edge of the first electrode 708 and a connecting portion between the first electrode 708 and the wire 707.

Next, the details of the aforementioned structure will be described. The substrate 700 may be, for example, a glass substrate such as barium borosilicate glass or alumino borosilicate glass, a quartz substrate, a ceramic substrate, or the like. Alternatively, it may be a metal substrate containing stainless steel or a semiconductor substrate having a surface covered with an insulating film. As a further alternative, a substrate formed of a flexible synthetic resin such as plastic may be used. The surface of the substrate 700 may be planarized by polishing such as chemical mechanical polishing (CMP).

The base layer 701 may be an insulating film formed of silicon oxide, silicon nitride, silicon nitride oxide, or the like. The base layer 701 can function to prevent diffusion of alkaline metals such as Na or alkaline earth metals which are contained in the substrate 700 into the semiconductor layer 702, which would adversely affect the characteristics of the TFT 750. Although FIG. 10 shows an example where the base layer 701 has a single-layer structure, it may have two or more layers. Note that the base layer 701 is not necessarily required when the diffusion of impurities is not of a big concern such as the case of using a quartz substrate.

In addition, the surface of the glass substrate may be directly treated by high-density plasma with the conditions of microwave excitation, an electron temperature of 2 eV or less, ion energy of 5 eV or less, and an electron density of about $10^{11}$ to $10^{13}/cm^3$. Plasma can be generated by using a plasma processing apparatus with microwave excitation with the use of a radial slot antenna. At this time, by adding a nitrogen gas such as nitrogen ($N_2$), ammonia ($NH_3$), or nitrous oxide ($N_2O$), the surface of the glass substrate can be nitrided. The nitride layer formed on the surface of the glass substrate has silicon nitride as its main component; therefore, it can be used as a blocking layer against impurities which are diffused from the substrate side. A silicon oxide film or a silicon oxynitride film may be formed over the nitride layer by plasma CVD, so as to be used as the base layer 701 as well.

Alternatively, when similar treatment is performed to the surface of the base layer 701 by using silicon oxide, silicon oxynitride, or the like, the surface of the base layer 701 or a part of the base layer 701 (from the surface to a depth of 1 to 10 nm) can be nitrided. Such an extremely thin silicon nitride layer can function as a blocking layer without adversely affecting the semiconductor layer formed thereover.

Each of the semiconductor layer 702 and the semiconductor layer 752 is preferably formed with a patterned crystalline semiconductor film. Note that patterning means a process of transforming a film into a particular shape (e.g., forming a contact hole in photosensitive acrylic or processing photosensitive acrylic into the shape of a spacer), etching with a mask pattern by a photolithography technique, and the like. The crystalline semiconductor film can be obtained by crystallizing an amorphous semiconductor film. As a crystallization method, there is laser crystallization, thermal crystallization using RTA or an annealing furnace, thermal crystallization using metal elements which promote crystallization, and the like. The semiconductor layer 702 has a channel formation region and a pair of impurity regions doped with impurity elements which impart one conductivity type. Note that another pair of impurity regions which are doped with the aforementioned impurity elements at a low concentration may be provided between the channel formation region and the pair of the impurity regions. The semiconductor layer 752 may have such a structure that the whole layer is doped with impurity elements which impart one conductivity type or impurity elements which impart the opposite conductivity thereto.

The first insulating layer 703 can be formed by stacking silicon oxide, silicon nitride, silicon nitride oxide, or/and the like, in a single layer or a plurality of layers. In this case, similarly to the aforementioned treatment, the surface of the insulating film may be oxidized or nitrided so as to be densified by high-density plasma treatment with the conditions of microwave excitation, an electron temperature of 2 eV or less, ion energy of 5 eV or less, and an electron density of about $10^{11}$ to $10^{13}/cm^3$. This treatment may precede the film deposition of the first insulating layer 703. That is, plasma treatment may be performed to the surface of the semiconductor layer 702. At this time, a favorable interface can be formed with a gate insulating layer to be stacked thereon by performing plasma treatment with the conditions of a substrate temperature of 300 to 450° C. and an oxygen atmosphere (e.g., $O_2$ or $N_2O$) or a nitrogen atmosphere ($N_2$ or $NH_3$).

Each of the gate electrode 704 and the conductive layer 754 may be formed to have a single-layer structure or a stacked-layer structure, with an element selected from among Ta, W, Ti, Mo, Al, Cu, Cr, and Nd, or an alloy or compound containing such elements.

The TFT 750 is formed of the semiconductor layer 702, the gate electrode 704, and the first insulating layer 703 sandwiched between the semiconductor layer 702 and the gate electrode 704. FIG. 10 shows an example where the TFT 750 which constitutes a pixel is connected to the first electrode 708 of the light-emitting element 712. The TFT 750 has a multi-gate structure where a plurality of the gate electrodes 704 are formed over the semiconductor layers 702. That is, a plurality of TFTs are connected in series. With such a structure, off-current can be prevented from increasing more than necessary. Although FIG. 10 shows an example where the TFT 750 is a top-gate TFT, a bottom-gate TFT having a gate electrode below a semiconductor layer, or a dual-gate TFT having gate electrodes above and below a semiconductor layer may be employed as well.

The capacitor 751 is formed of the first insulating layer 703 functioning as a dielectric and a pair of electrodes, namely the semiconductor layer 752 and the conductive layer 754 facing each other by sandwiching the first insulating layer 703. Although FIG. 10 shows an example where the semiconductor layer 752 formed concurrently with the semiconductor layer 702 of the TFT 750 is used as one of a pair of the electrodes of a capacitor which is provided in a pixel, the conductive layer 754 formed concurrently with the gate electrode 704 is used as the other electrode, the invention is not limited to such a structure.

The second insulating layer 705 is desirably a barrier insulating film having a blocking property against ionic impurities, such as a silicon nitride film. The second insulating film 705 is formed of silicon nitride or silicon oxynitride. The second insulating layer 705 has a function as a protective film for preventing contamination of the semiconductor layer 702. After depositing the second insulating film 705, it may be hydrogenated by high-density plasma treatment with microwave excitation of a hydrogen gas similarly to the aforementioned treatment. Alternatively, the second insulating film 705 may be nitrided and hydrogenated by adding an ammonia gas. As a further alternative, the second insulating film 705 may be oxynitrided and hydrogenated by adding an oxygen gas, an $N_2O$ gas, hydrogen gas, and the like. By performing nitriding, oxidizing, or oxynitriding treatment with the aforementioned method, the surface of the second insulating layer 705 can be densified. Accordingly, its function as the protective film can be reinforced. The hydrogen added into the second insulating layer 705 made of silicon nitride can be discharged by performing thermal treatment at 400 to 450° C., thereby the semiconductor layer 702 can be hydrogenated.

The third insulating layer 706 can be formed with an inorganic insulating film or an organic insulating film. The inorganic insulating film includes a silicon oxide film formed by CVD, an SOG (Spin On Glass) film (silicon oxide film formed by coating), and the like. The organic insulating film includes a film made of polyimide, polyamide, BCB (benzocyclobutene), acrylic, a positive photosensitive organic rein, a negative photosensitive organic resin, or the like. In addition, the second insulating layer 705 may be formed with a material having a skeletal structure of silicon (Si) and oxygen (O). As a substituent of such material, an organic group containing at least hydrogen (e.g., an alkyl group or aromatic hydrocarbon) is used. As a substituent, a fluoro group may be used as the substituent. As a further alternative, both an organic group containing hydrogen and a fluoro group may be used as the substituent.

The wire 707 may be formed to have a single-layer structure or a stacked-layer structure of an element selected from among Al, Ni, C, W, Mo, Ti, Pt, Cu, Ta, Au, and Mn, or an alloy containing such elements.

One of either the first electrode 708 or the second electrode 710 may be formed as a light-transmissive electrode. As a light-transmissive electrode, there is indium oxide containing tungsten trioxide (IWO), indium oxide containing tungsten oxide (IWZO), indium oxide containing titanium oxide (ITiO), indium tin oxide containing titanium oxide (ITTiO), indium tin oxide containing molybdenum (ITMO), or the like. Needless to say, indium tin oxide (ITO), indium zinc oxide (IZO), indium tin oxide doped with silicon oxide (ITSO), or the like may be used as well.

At least one of either the first electrode 708 or the second electrode 710 may be formed with a non-light-transmissive electrode. For example, it may be formed with alkaline metals such as Li or Cs, alkaline earth metals such as Mg, Ca, or Sr, an alloy containing such metals (e.g., MgAg, AlLi, or MgIn), a compound containing such metals (e.g., $CaF_2$ or $Ca_3N_2$), or rare earth metals such as Yb or Er.

The fourth insulating layer 711 may be formed with a similar material to the third insulating layer 706.

The light-emitting element 712 is formed of the first electrode 708, the second electrode 710, and the EL layer 709 sandwiched therebetween. One of either the first electrode 708 or the second electrode 710 corresponds to an anode, while the other corresponds to a cathode. The light-emitting element 712 emits light with a current flowing through the anode to the cathode when a voltage higher than the threshold voltage is forwardly applied between the anode and the cathode.

The EL layer 709 is formed with a single layer or a plurality or layers. When the EL layer 709 is formed with a plurality of layers, these layers can be classified into a hole injecting layer, a hole transporting layer, a light-emitting layer, an electron transporting layer, an electron injecting layer, and the like in view of the carrier transporting property. Note that the boundary between each layer is not necessarily clear, and there may be a case where the boundary is unclear since a material for forming each layer is mixed with each other. Each layer may be formed with an organic material or an inorganic material. As the organic material, any of a high molecular compound, a medium molecular compound, and a low molecular compound may be used.

The EL layer 709 is preferably formed with a plurality of layers having different functions such as a hole injecting/transporting layer, a light-emitting layer, and an electron injecting/transporting layer. The hole injecting/transporting layer is preferably formed with a composite material containing an organic compound material with a hole transporting property and an inorganic compound material which exhibits an electron accepting property with respect to the organic compound material. By employing such a structure, many hole carriers are generated in the organic compound which inherently has few carriers, thereby an excellent hole injecting/transporting property can be obtained. According to such an effect, driving voltage can be suppressed than that in the conventional structure. Further, since the hole injecting/transporting layer can be formed thick without causing an increase of the driving voltage, short circuit of the light-emitting element resulting from dust or the like can be suppressed.

As an organic compound material with a hole transporting property, there is, for example, copper phthalocyanine (abbreviation: CuPc); 4,4',4"-tris[N-(3-methylphenyl)-N-phenylamino] triphenylamine (abbreviation: MTDATA); 1,3,5-tris[N,N-di(m-tolyl)amino]benzene (abbreviation: m-MTDAB); N,N'-diphenyl-N,N'-bis(3-methylphenyl)-1,1'-biphenyl-4,4'-diamine (abbreviation: TPD); 4,4'-bis[N-(1-naphthyl)-N-phenylamino]biphenyl (abbreviation: NPB); 4,4'-bis[N-[4-{N,N-bis(3-methylphenyl)amino}phenyl]-N-phenylamino]biphenyl (abbreviation: DNTPD); or the like. However, the invention is not limited to these.

As an inorganic compound material which exhibits an electron accepting property, there is titanium oxide, zirconium oxide, vanadium oxide, molybdenum oxide, tungsten oxide, rhenium oxide, zinc oxide, or the like. In particular, vanadium oxide, molybdenum oxide, tungsten oxide, and rhenium oxide are preferable since they can be deposited in vacuum, and are easy to be handled.

The electron injecting/transporting layer is formed with an organic compound material with an electron transporting property. Specifically, there is tris(8-quinolinolato)aluminum (abbreviation: $Almq_3$); bis(2-methyl-8-quinolinolato)(4-phenylphenolato)aluminum (abbreviation: BAlq); bathocuproin (abbreviation: BCP); 2-(4-biphenylyl)-5-(4-tert-buthylphenyl)-1,3,4-oxadiazole (abbreviation: PBD); 3-(4-biphenylyl)-4-phenyl-5-(4-tert-butylphenyl)-1,2,4-triazole (abbreviation: TAZ); or the like. However, the invention is not limited to these.

The EL layer can be formed with, for example, 9,10-di(2-naphthyl)anthracene (abbreviation: DNA); 9,10-di(2-naphthyl)-2-tert-butylanthracene (abbreviation: t-BuDNA); 4,4'-bis(2,2-diphenylvinyl)biphenyl (abbreviation: DPVBi); coumarin 30; coumarin 6; coumarin 545; coumarin 545T; rubrene; 2,5,8,11-tetra(tert-butyl)perylene (abbreviation: TBP); 9,10-diphenylanthracene (abbreviation: DPA); 4-(dicyanomethylene)-2-methyl-6-(p-dimethylaminostyryl)-4H-pyran (abbreviation: DCM1); 4-(dicyanomethylene)-2-methyl-6-(9-julolidyl)ethinyl-4H-pyran (abbreviation: DCM2); or the like. Alternatively, the following compounds capable of generating phosphorescence can be used: bis{2-[3',5'-bis(trifluoromethyl)phenyl]pyridinato-N,$C^{2'}$}iridium(picolinate) (abbreviation: $Ir(CF_3 ppy)_2(pic)$); tris(2-phenylpyridinato-N,$C^{2'}$)iridium (abbreviation: $Ir(ppy)_3$); bis(2-phenylpyridinato-N,$C^{2'}$)iridium(acetylacetonate) (abbreviation: $Ir(ppy)_2(acac)$); bis[2-(2'-thienyl)pyridinato-N,$C^{3'}$]iridium (acetylacetonate) (abbreviation: $Ir(thp)_2(acac)$); bis(2-phenylquinolinato-N,$C^{2'}$)iridium(acetylacetonate) (abbreviation: $Ir(pq)_2(acac)$); or the like.

Further, the EL layer may be formed by using a singlet excitation light-emitting material as well as a triplet excitation light-emitting material including a metal complex. For example, among light-emitting pixels for red emission, green emission, and blue emission, the light-emitting pixel for red emission which has a relatively short luminance half decay period is formed by using a triplet excitation light-emitting material while the other light-emitting pixels are formed by using a singlet excitation light-emitting material. The triplet excitation light-emitting material has high luminous efficiency, which is advantageous in that lower power consumption is required for obtaining the same luminance. That is, when the triplet excitation light-emitting material is applied to the pixel for red emission, the amount of current supplied to the light-emitting element can be suppressed, resulting in the improved reliability. In order to suppress the power consumption, the light-emitting pixels for red emission and green emission may be formed by using a triplet excitation light-emitting material, while the light-emitting element for blue emission may be formed by using a singlet excitation light-emitting material. When forming the light-emitting element for green emission which is highly visible to human eyes by using the triplet excitation light-emitting material, further lower power consumption can be achieved.

As a structure of the EL layer, a light-emitting layer having a different emission spectrum may be formed in each pixel to perform color display. Typically, light-emitting layers corresponding to the respective colors of R (red), G (green), and B (blue) are formed. In this case also, color purity can be improved as well as a mirror-like surface (glare) of the pixel portion can be prevented by adopting a structure where a filter for transmitting light with the aforementioned emission spectrum is provided on the emission side of the pixel. By providing the filter, a circularly polarizing plate and the like which have conventionally been required can be omitted, which can recover the loss of light emitted from the light-emitting layer. Further, changes in color tone, which are recognized when the pixel portion (display screen) is seen obliquely, can be reduced.

When a pixel with the structure shown in FIG. 10 is combined with an external-light-intensity detector, luminance of a display screen can be controlled by changing the light-emitting time of a light-emitting element. In addition, since it can be prevented that the light-emission time is increased more than necessary by controlling the light emission of a light-emitting element with an external-light-intensity detector, power consumption of the display panel can be reduced, which will prolong the operating life.

Note that the transistor is not limited to the one using polysilicon for its semiconductor layer, and therefore, a transistor using amorphous silicon may be used as well.

Figure 12A:
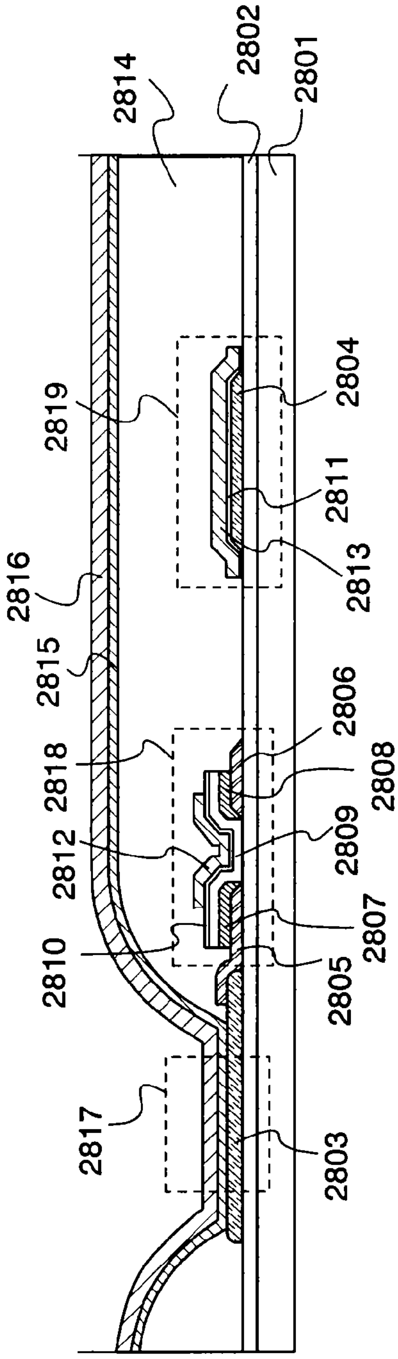
FIGS. 12A and 12B illustrate structures of a display device of the invention.
Figure 12B:
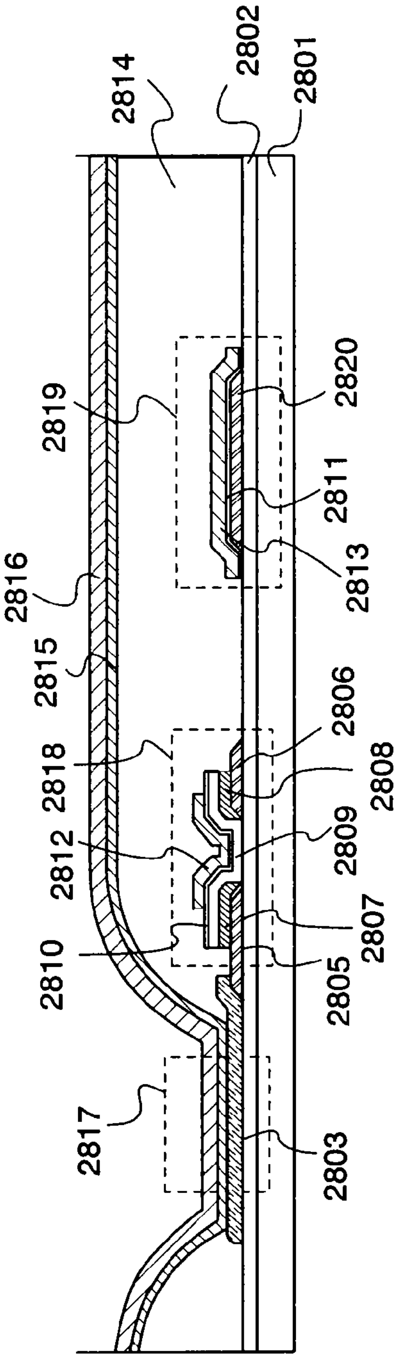

Next, description is made of the case of using an amorphous silicon (a-Si:H) film for a semiconductor layer of a transistor. FIGS. 12A and 12B show examples of a top-gate transistor, while FIGS. 13A and 13B and FIGS. 35A and 35B show examples of a bottom-gate transistor.

FIG. 12A shows a cross section of a top-gate transistor which uses amorphous silicon as its semiconductor layer. As shown in FIG. 12A, a base film 2802 is formed over a substrate 2801. Further, a pixel electrode 2803 is formed over the base film 2802. In addition, a first electrode 2804 is formed with the same material and in the same layer as the pixel electrode 2803.

The substrate may be any of a glass substrate, a quartz substrate, a ceramic substrate, and the like. In addition, the base film 2802 may be formed with aluminum nitride (MN), silicon oxide ($SiO_2$), and/or oxynitride silicon ($SiO_xN_y$), in a single layer or stacked layers.

In addition, a wire 2805 and a wire 2806 are formed over the base film 2802, and an end of the pixel electrode 2803 is covered with the wire 2805. Over the wire 2805 and the wire 2806, an n-type semiconductor layer 2807 and an n-type semiconductor layer 2808 each having n-type conductivity are formed respectively. A semiconductor layer 2809 is formed between the wire 2806 and the wire 2805, and over the base film 2802. A part of the semiconductor layer 2809 is extended to cover the n-type semiconductor layer 2807 and the n-type semiconductor layer 2808. Note that the semiconductor layer 2809 is formed with a non crystalline semiconductor film such as amorphous silicon (a-Si:H) or a microcrystalline semiconductor (μ-Si:H). A gate insulating film 2810 is formed over the semiconductor layer 2809. In addition, an insulating film 2811 is formed with the same material and in the same layer as the gate insulating film 2810, over the first electrode 2804. Note that the gate insulating film 2810 is formed of a silicon oxide film, a silicon nitride film, or the like.

A gate electrode 2812 is formed over the gate insulating film 2810. In addition, a second electrode 2813 is formed with the same material and in the same layer as the gate electrode 2812, over the first electrode 2820 with the insulating film 2811 sandwiched therebetween. Thus, a capacitor 2819 is formed in a region where the insulating film 2811 is sandwiched between the first electrode 2804 and the second electrode 2813. An interlayer insulating film 2814 is formed covering ends of the pixel electrode 2803, a driving transistor 2818, and the capacitor 2819.

A layer 2815 containing an organic compound and a counter electrode 2816 are formed over the interlayer insulating film 2814 and the pixel electrode 2803 positioned in an opening of the interlayer insulating film 2814. Thus, a light-emitting element 2817 is formed in a region where the layer 2815 containing an organic compound is sandwiched between the pixel electrode 2803 and the counter electrode 2816.

The first electrode 2804 shown in FIG. 12A may be replaced by a first electrode 2820 as shown in FIG. 12B. The first electrode 2820 is formed with the same material and in the same layer as the wires 2805 and 2806.

Figure 13A:
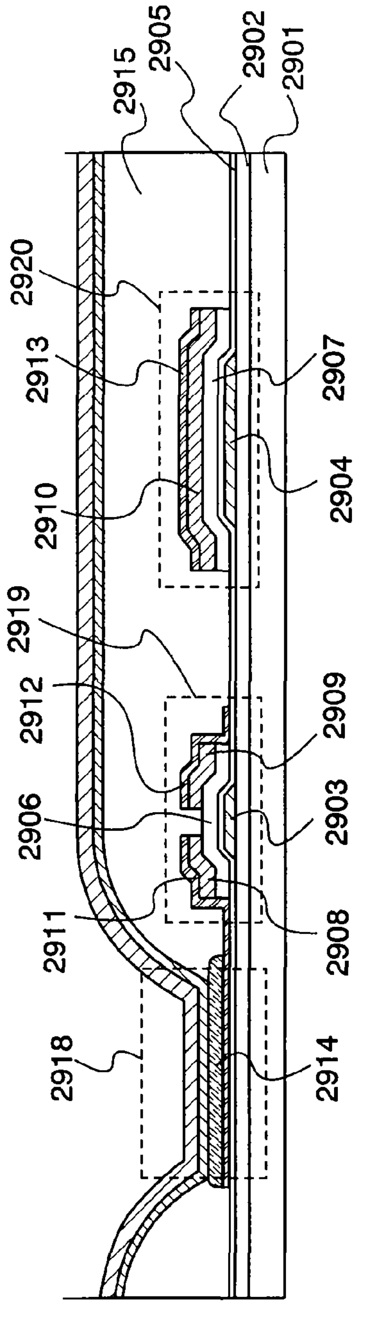
FIGS. 13A and 13B illustrate structures of a display device of the invention.
Figure 13B:
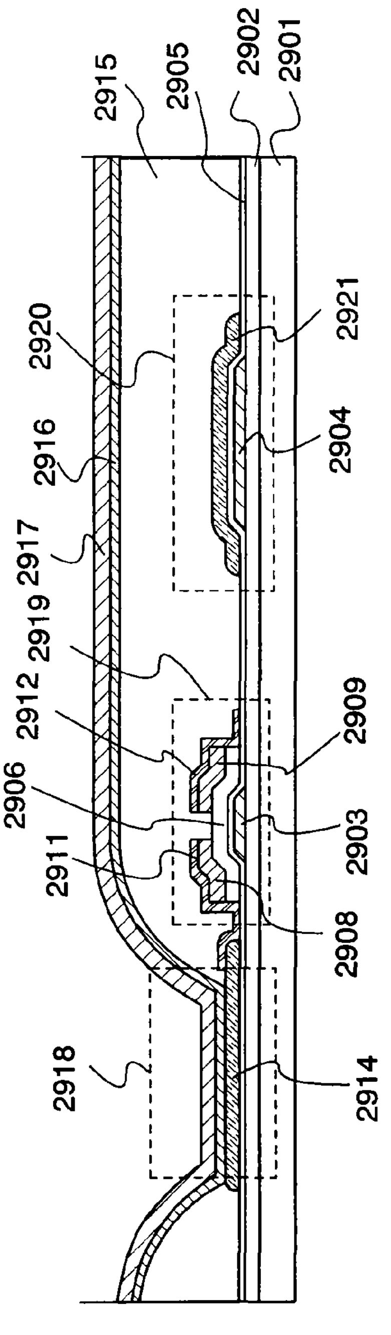

FIGS. 13A and 13B show partial cross sections of a panel of a display device which has a bottom-gate transistor using amorphous silicon for its semiconductor layer.

A base film 2902 is formed over a substrate 2901. Further, a gate electrode 2903 is formed over the base film 2902. In addition, a first electrode 2904 is formed in the same layer and with the same material as the gate electrode 2903. As a material of the gate electrode 2903, polysilicon doped with phosphorus can be used. Not only polycrystalline silicon, but also silicide which is a compound of a metal and silicon may be used as well.

In addition, a gate insulating film 2905 is formed covering the gate electrode 2903 and the first electrode 2904. The gate insulating film 2905 is formed of a silicon oxide film, a silicon nitride film, or the like.

A semiconductor layer 2906 is formed over the gate insulating film 2905. In addition, a semiconductor layer 2907 is formed with the same material and in the same layer as the semiconductor layer 2906.

The substrate may be any of a glass substrate, a quartz substrate, a ceramic substrate, and the like. In addition, the base film 2802 may be formed with aluminum nitride (MN), silicon oxide ($SiO_2$), and/or oxynitride silicon ($SiO_xN_y$), in a single layer or stacked layers.

N-type semiconductor layers 2908 and 2909 each having n-type conductivity are formed over the semiconductor layer 2906, while an n-type semiconductor layer 2910 is formed over the semiconductor layer 2907.

Wires 2911, 2912, and 2913 are formed respectively over the n-type semiconductor layers 2908, 2909, and 2910, and a conductive layer 2913 is formed with the same material and in the same layer as the wires 2911 and 2912, over the n-type semiconductor layer 2910.

A second electrode is formed of the semiconductor layer 2907, the n-type semiconductor layer 2910, and the conductive layer 2913. Note that a capacitor 2920 is formed in a region where the gate insulating film 2905 is sandwiched between the second electrode and the first electrode 2904.

In addition, a part of the wire 2911 is extended, and a pixel electrode 2914 is formed in contact with the top surface of the extended portion of the wire 2911.

An insulator 2915 is formed covering ends of the pixel electrode 2914, a driving transistor 2919, and the capacitor 2920.

A layer 2916 containing an organic compound and a counter electrode 2917 are formed over the pixel electrode 2914 and the insulator 2915, and a light-emitting element 2918 is formed in a region where the layer 2916 containing an organic compound is sandwiched between the pixel electrode 2914 and the counter electrode 1917.

The semiconductor layer 2907 and the n-type semiconductor 2910 which partially function as a second electrode of the capacitor are not necessarily provided. That is, only the conductive layer 2913 may be used as the second electrode so as to provide a capacitor having such a structure that a gate insulating film is sandwiched between the first electrode 2904 and the conductive layer 2913.

Note that by forming the pixel electrode 2914 before forming the wire 2911 shown in FIG. 13A, a capacitor 2920 as shown in FIG. 13B can be formed, which has a structure where the gate insulating film 2905 is sandwiched between the second electrode 2921 formed of the same material as the pixel electrode 2914 and the first electrode 2914.

Although FIGS. 13A and 13B show examples of an inversely staggered transistor with a channel-etched structure, a transistor with a channel-protective structure may be employed as well. Next, description is made of the case of a transistor with a channel-protective structure, with reference to FIGS. 35A and 35B.

Figure 35A:
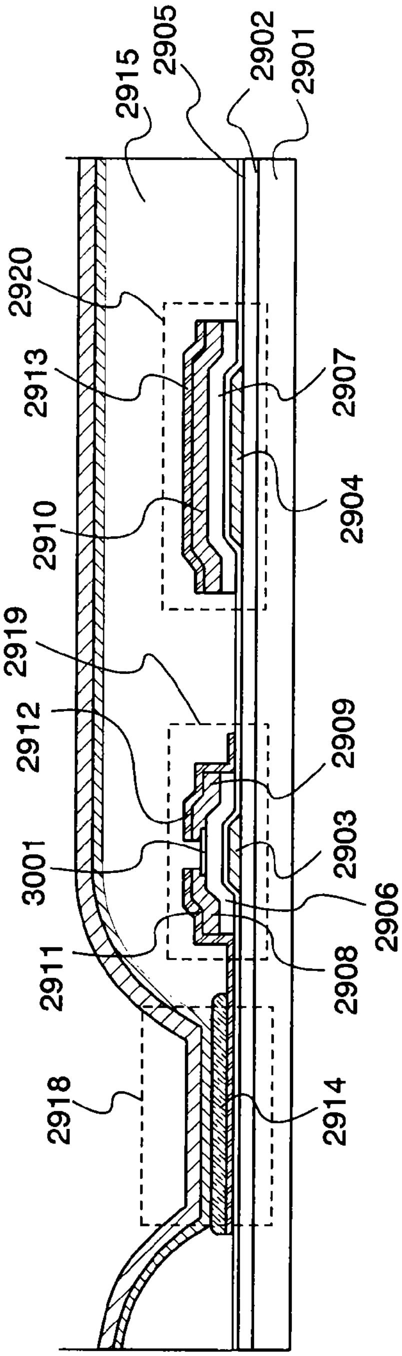
FIGS. 35A and 35B illustrate structures of a display device of the invention.

A transistor with a channel-protective structure shown in FIG. 35A is different from the driving transistor 2919 with a channel-etched structure shown in FIG. 13A in that an insulator 3001 serving as an etching mask is provided over a channel formation region in the semiconductor layer 2906. Common portions between FIGS. 35A and 13A are denoted by common reference numerals.

Figure 35B:
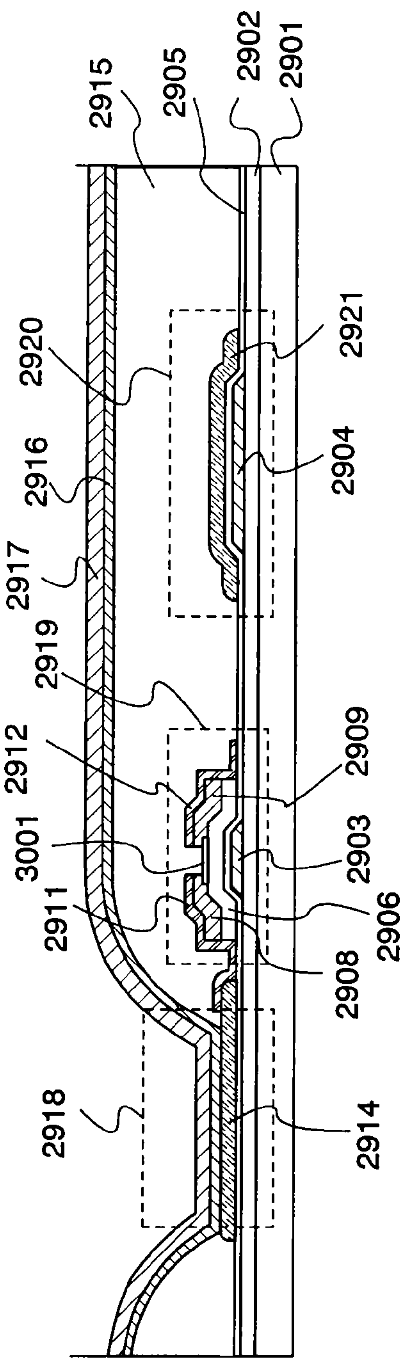

Similarly, a transistor with a channel-protective structure shown in FIG. 35B is different from the driving transistor 2919 with a channel-etched structure shown in FIG. 13B in that an insulator 3001 serving as an etching mask is provided over a channel formation region in the semiconductor layer 2906. Common portions between FIGS. 35A and 13A are denoted by common reference numerals.

By using an amorphous semiconductor film for a semiconductor layer (e.g., a channel formation region, a source region, or a drain region) of a transistor which constitutes a pixel of the invention, manufacturing cost can be reduced. For example, an amorphous semiconductor film can be used in the case of using the pixel structure shown in FIG. 10.

Note that the structure of transistors or capacitors to which the pixel structure of the invention can be applied is not limited to the structures described heretofore, and various structures of transistors or capacitors can be employed.

Note also that this embodiment mode can be implemented in combination with any of Embodiment Modes 1 to 4 as appropriate.

Embodiment Mode 6

An optical sensor which detects the intensity of outside light may be incorporated in a part of a display device. The optical sensor may be mounted on a display device as a component part or integrated into a display panel. When it is integrated into a display panel, a display surface can be used as a receiving surface of the optical sensor, thereby an advantageous effect for designs can be provided. That is, gray scales can be controlled based on the intensity of outside light without being recognized by a user that the optical sensor is incorporated in the display device.

Figure 11:
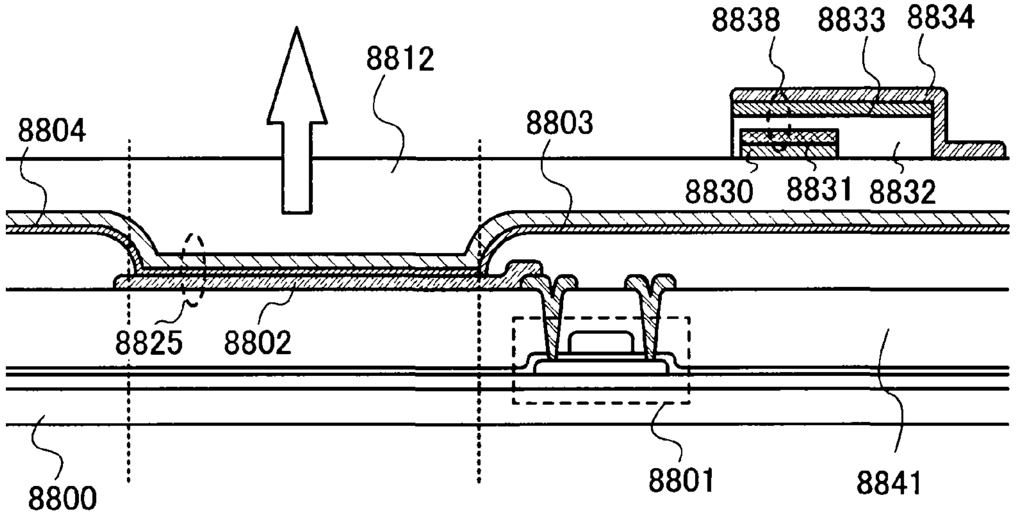
FIG. 11 illustrates a structure of a display device of the invention.

FIG. 11 shows a view showing an example where an optical sensor is integrated into a display panel. Note that FIG. 11 shows the case where a pixel is formed with a light-emitting element which exhibits electroluminescence and a TFT for controlling the operation thereof.

In FIG. 11, a driving TFT 8801, a first electrode (pixel electrode) 8802 formed of a light-transmissive material, an EL layer 8803, and a second electrode (counter electrode) 8804 formed of a light-transmissive material are provided over a light-transmissive substrate 8800. The first electrode (pixel electrode) 8802 is formed over an insulating film 8841. A light-emitting element 8825 emits light in the upward direction (arrow direction). Over an insulating film 8812 formed over the second electrode 8804, a photoelectric conversion element 8838 having a stack of a p-channel layer 8831, a substantially intrinsic (i-type) layer 8832, and an n-type layer 8833 is provided as well as an electrode 8830 connected to the p-type layer 8831 and an electrode 8834 connected to the n-type layer 8833. Note that the photoelectric conversion element 8838 may be formed over the insulating film 8841 as well.

In this embodiment, the photoelectric conversion element 8838 is used as an optical sensor element. The light-emitting element 8825 and the photoelectric conversion element 8838 are formed over the same substrate 8800, and light emitted from the light-emitting element 8825 composes an image to be viewed by a user. Meanwhile, the photoelectric conversion element functions to detect outside light and transmit a detection signal to a controller. In this manner, the light-emitting element and the optical sensor (photoelectric conversion element) can be formed over the same substrate, which contributes to downsizing of a set.

Note that this embodiment mode can be implemented in combination with any of Embodiment Modes 1 to 5 as appropriate.

Embodiment Mode 7

In this embodiment mode, description is made of hardware for controlling the display device, described in Embodiment Modes 1 to 5.

Figure 18:
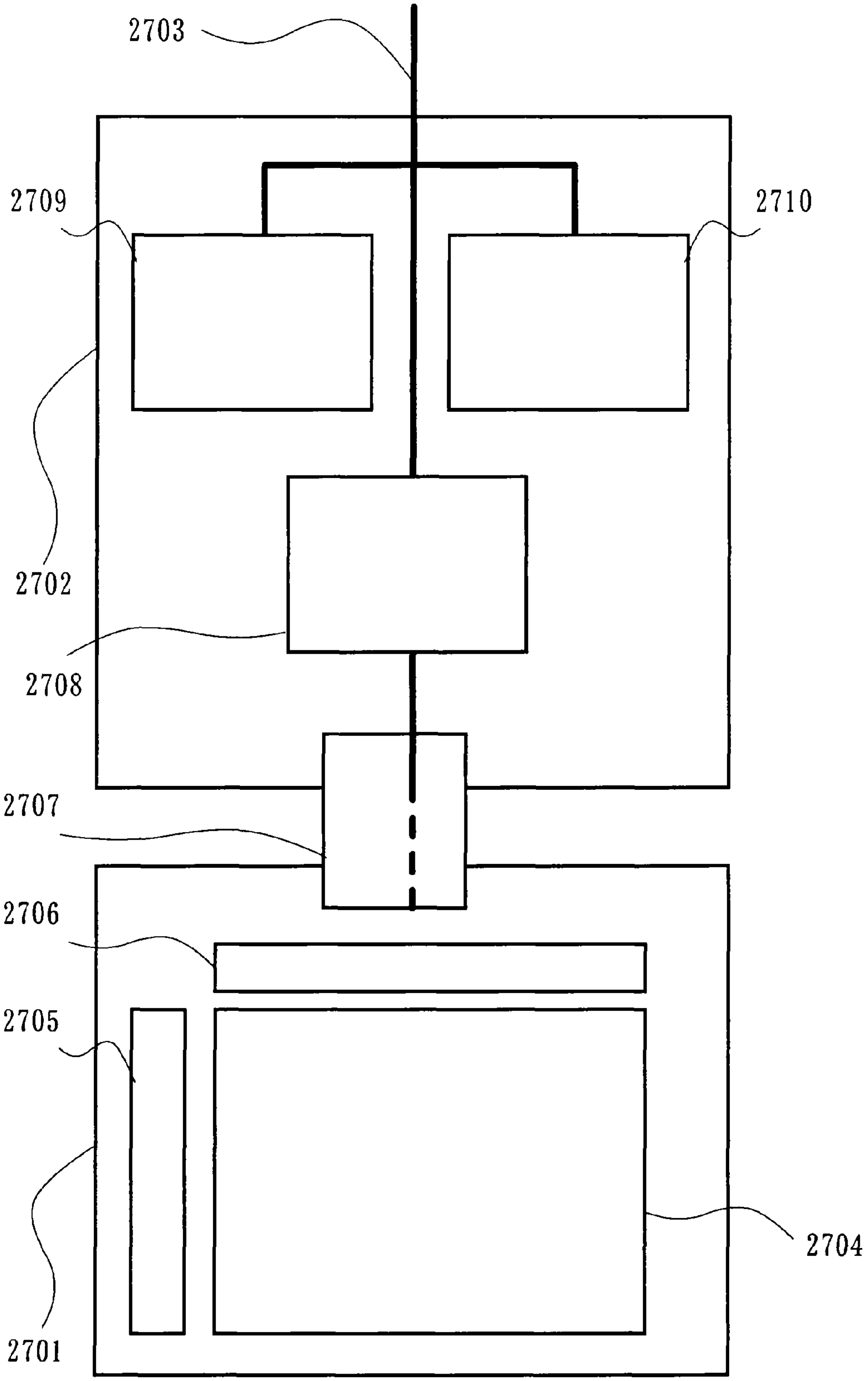
FIG. 18 illustrates a configuration of a display device of the invention.

FIG. 18 shows a schematic view. A pixel array 2704 is provided over a substrate 2701. A source driver 2706 and a gate driver 2705 are formed over the same substrate in many cases. Besides, a power supply circuit, a precharge circuit, a timing generating circuit, or the like may also be provided. There is also a case where the source driver 2706 or the gate driver 2705 is not provided over the same substrate. In that case, a circuit which is not provided over the substrate 2701 is often formed in an IC. The IC is often mounted on the substrate 2701 by COG (Chip On Glass) bonding. Alternatively, the IC may be mounted on a connecting board 2707 for connecting a peripheral circuit substrate 2702 to the substrate 2701.

A signal 2703 is input to the peripheral circuit substrate 2702, and a controller 2708 controls the signal to be stored in a memory 2709, a memory 2710, or the like. In the case where the signal 2703 is an analog signal, it is often subjected to analog-digital conversion before being stored in the memory 2709, the memory 2710, or the like. The controller 2708 outputs a signal to the substrate 2701 by using the signal stored in the memory 2709, the memory 2710, or the like.

In order to realize the driving methods described in Embodiment Modes 1 to 5, the controller 2708 controls various signals such as pulse signals, and outputs them to the substrate 2701.

Note that this embodiment mode can be implemented in combination with any of Embodiment Modes 1 to 6 as appropriate.

Embodiment Mode 8

Figure 19:
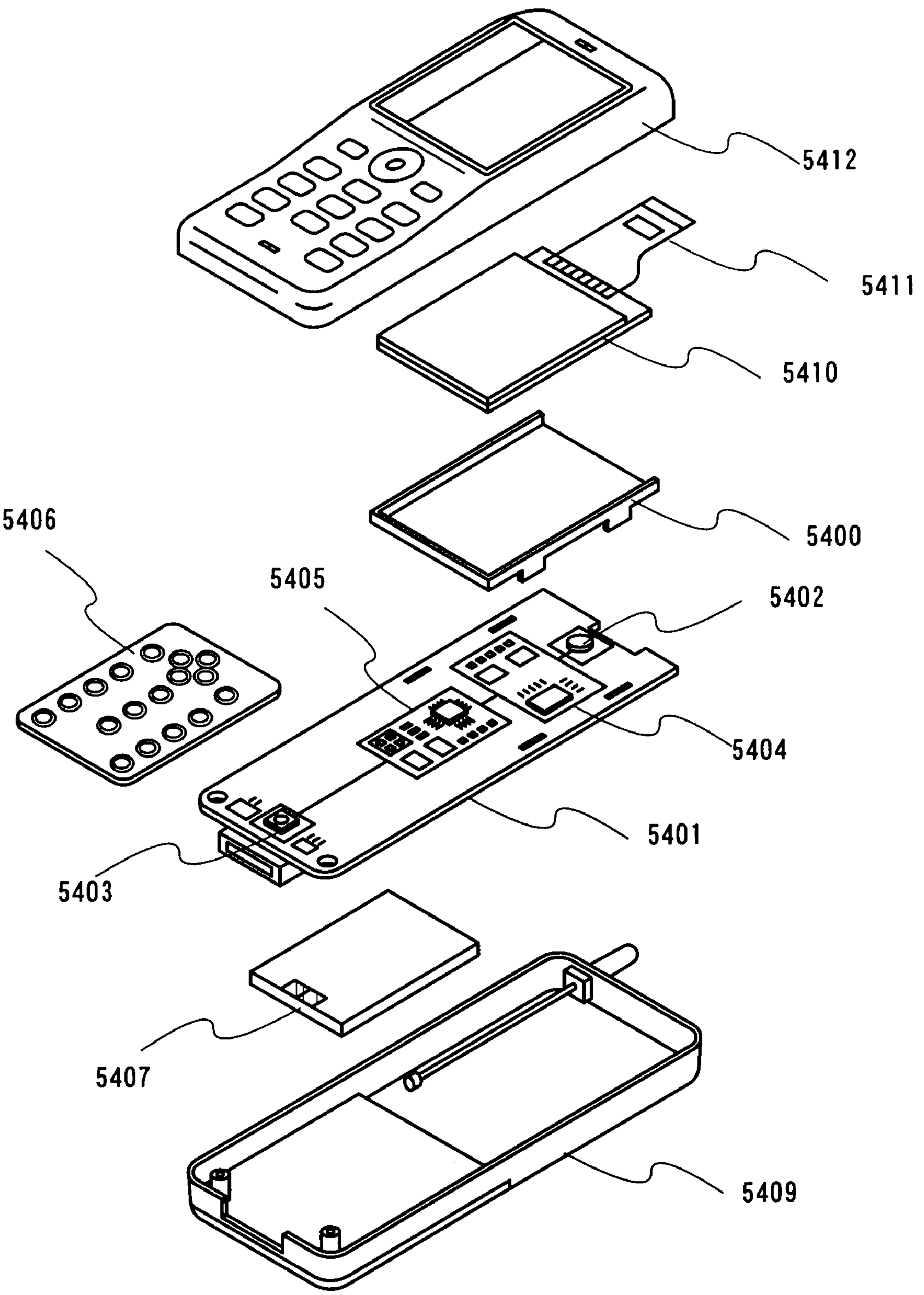
FIG. 19 illustrates an electronic apparatus using the invention.

Description is made of an exemplary structure of a mobile phone which has the display device of the invention, with reference to FIG. 19.

A display panel 5401 is incorporated into a housing 5400 in an attachable/detachable manner. The shape and size of the housing 5400 can be appropriately changed in accordance with the size of the display panel 5410. The housing 5400 to which the display panel 5410 is fixed is fit into a printed board 5401 so as to assemble a module.

The display panel 5410 is connected to the printed board 5401 through an FPC 5411. On the printed board 5401, a speaker 5402, a microphone 5403, a transmission/reception circuit 5404, and a signal processing circuit 5405 including a CPU, a controller and the like are formed. Such a module is combined with an input means 5406 and a battery 5407, and then incorporated into housings 5409 and 5412. A pixel portion of the display panel 5410 is disposed so that it can be seen from an open window formed in the housing 5412.

Figure 20B:
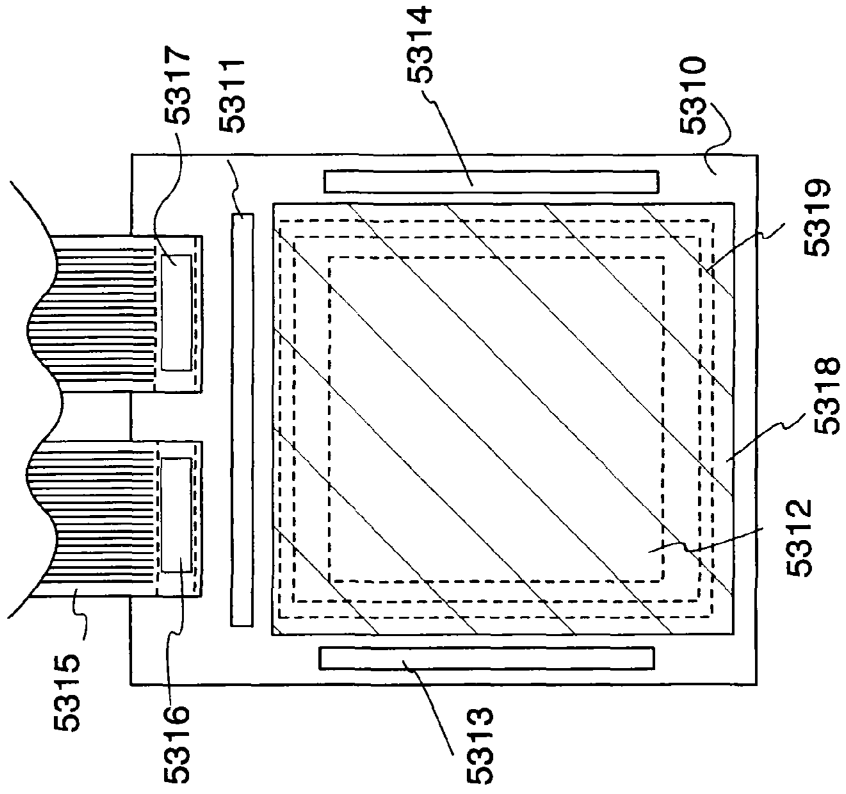
FIGS. 20A and 20B illustrate configurations of a display device of the invention.
Figure 20A:
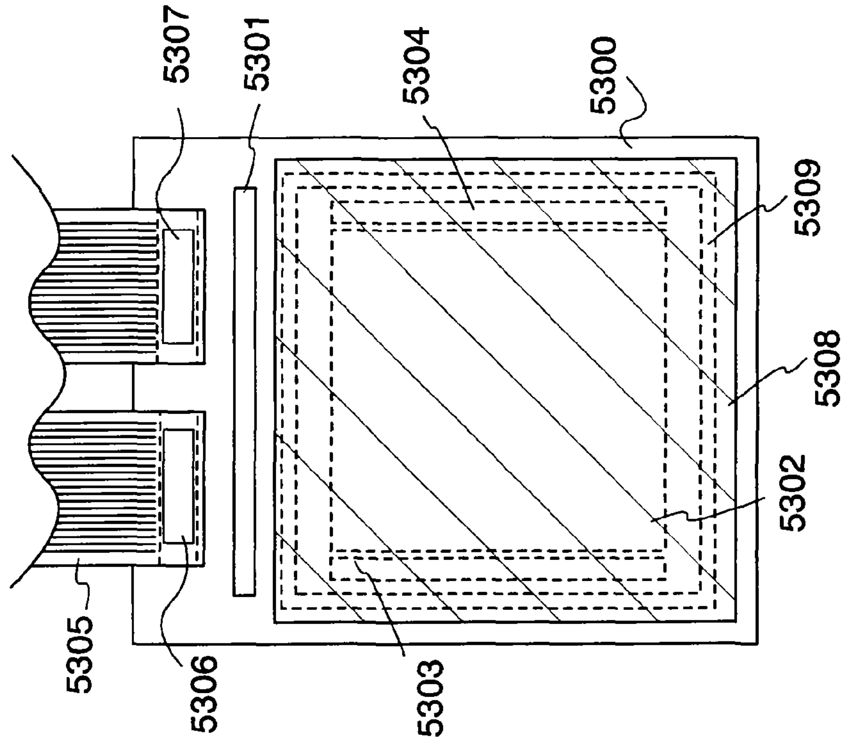

The display panel 5410 may be constructed in such a manner that a part of peripheral driver circuits (e.g., a driver circuit having a low operating frequency among a plurality of driver circuits) is formed over the same substrate as a pixel portion by using TFTs, while another part of the peripheral driver circuits (a driver circuit having a high operating frequency among the plurality of driver circuits) is formed in an IC chip. Then, the IC chip may be mounted on the display panel 5410 by COG (Chip On Glass) bonding. Alternatively, the IC chip may be connected to a glass substrate by TAB (Tape Automated Bonding) or by use of a printed board. FIG. 20A shows an exemplary structure of such a display panel where a part of peripheral driver circuits is formed over the same substrate as a pixel portion, while another part of the peripheral driver circuits is formed in an IC chip to be mounted on the substrate by COG bonding or the like. By employing such a structure, power consumption of a display device can be reduced and an operating time per charge of a mobile phone can be lengthened. In addition, cost reduction of a mobile phone can be achieved.

In addition, by impedance-converting signals set to scan lines or signal lines with a buffer, time required for writing signals into pixels in one row can be shortened. Thus, a high-resolution display device can be provided.

In addition, in order to further reduce power consumption, such a structure may be employed that a pixel portion is formed over a substrate with TFTs, and all the peripheral circuits are formed in IC chips to be mounted on the display panel by COG (Chip On Glass) bonding.

With such a display device of the invention, fine and high-contrast images can be provided.

Note that the configuration shown in this embodiment mode is only an illustrative mobile phone, and therefore, the display device of the invention can be applied to mobile phones with various structures without limiting to the mobile phone with the aforementioned structure.

Note also that this embodiment mode can be implemented in combination combined with any of Embodiment Modes 1 to 7 as appropriate.

Embodiment Mode 9

Figure 21:
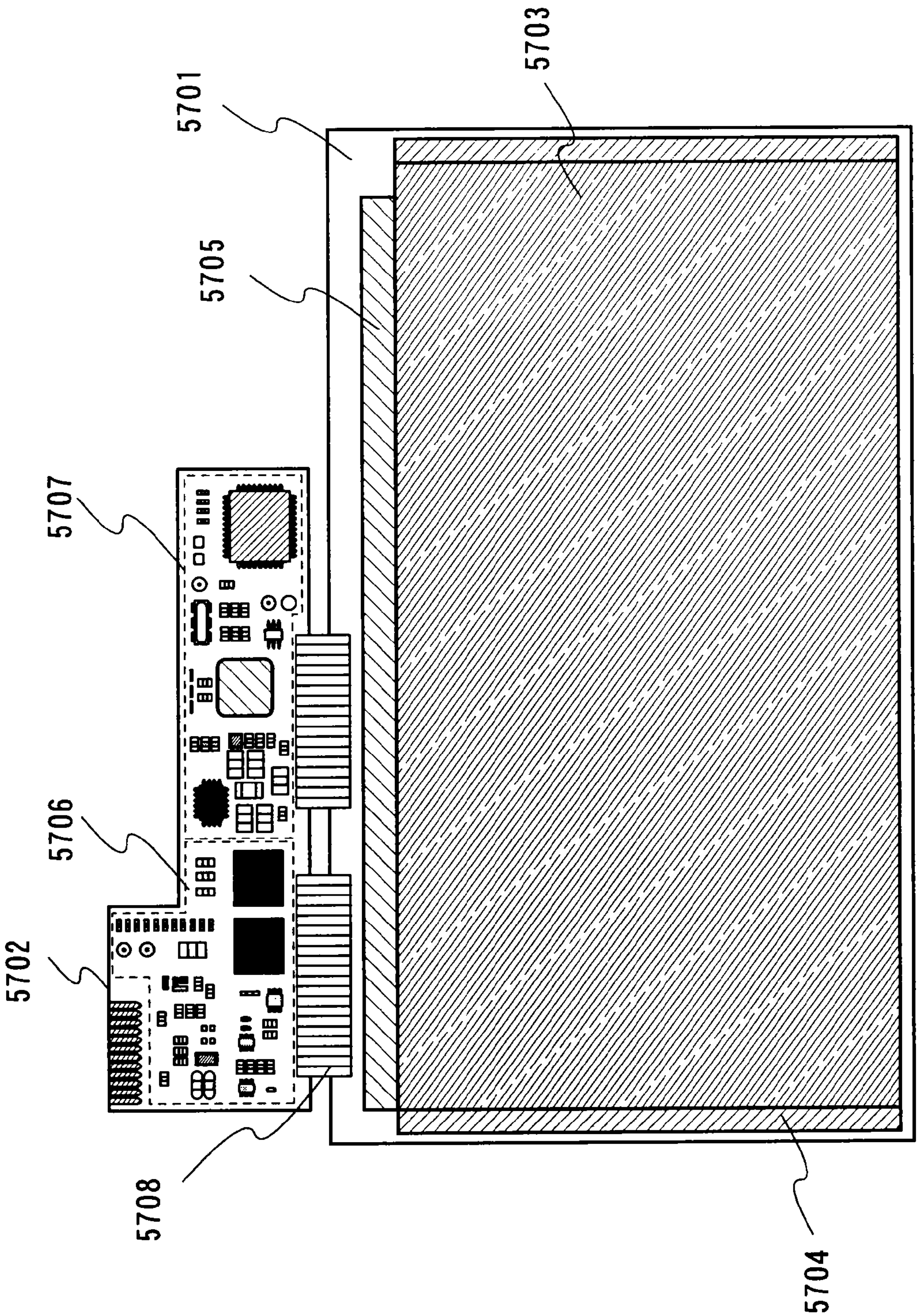
FIG. 21 illustrates a configuration of a display device of the invention.

FIG. 21 shows an EL module constructed by combining a display panel 5701 with a circuit board 5702. The display panel 5701 includes a pixel portion 5703, a scan line driver circuit 5704, and a signal line driver circuit 5705. Over the circuit board 5702, a control circuit 5706, a signal dividing circuit 5707, and the like are formed, for example. The display panel 5701 and the circuit board 5702 are connected to each other with a connecting wire 5708. The connecting wire can be formed with an FPC or the like.

The control circuit 5706 corresponds to the controller 2708, the memory 2709, the memory 2710, or the like in Embodiment Mode 7. The control circuit 5706 mainly controls the arranging order of subframes or the like.

The display panel 5701 may be constructed in such a manner that a part of peripheral driver circuits (e.g., a driver circuit having a low operating frequency among a plurality of driver circuits) is formed over the same substrate with a pixel portion by using TFTs, while another part of the peripheral driver circuits (a driver circuit having a high operating frequency among the plurality of driver circuits) is formed in an IC chip, so that the IC chip is mounted on the display panel 5701 by COG (Chip On Glass) bonding or the like. Alternatively, the IC chip may be mounted on the display panel 5701 by TAB (Tape Automated Bonding) or by use of a printed board. FIG. 20A shows an exemplary configuration where a part of the peripheral driver circuits is formed over the same substrate as the pixel portion, and another part of the peripheral driver circuits is formed in an IC chip, so that the IC chip is mounted on the substrate by COG bonding or the like. By employing such a structure, power consumption of a display device can be reduced and an operating time per charge of a mobile phone can be lengthened. In addition, cost reduction of a mobile phone can be achieved.

In addition, by impedance-converting signals set to scan lines or signal lines with a buffer, time required for writing signals into pixels in one row can be shortened. Thus, a high-resolution display device can be provided.

In addition, in order to further reduce power consumption, such a structure may be employed that a pixel portion is formed over a glass substrate with TFTs, and the whole signal line driver circuit is formed in IC chips to be mounted onto the display panel by COG (Chip On Glass) bonding.

Note that such a structure is also desirable that a pixel portion is formed over a substrate with TFTs, and all of the peripheral driver circuits are formed in IC chips to be mounted onto the display panel by COG (Chip On Glass) bonding. FIG. 20B shows an exemplary structure where a pixel portion is formed over a substrate with TFTs, and peripheral driver circuits formed in IC chips are mounted on the substrate by COG bonding or the like.

Figure 22:
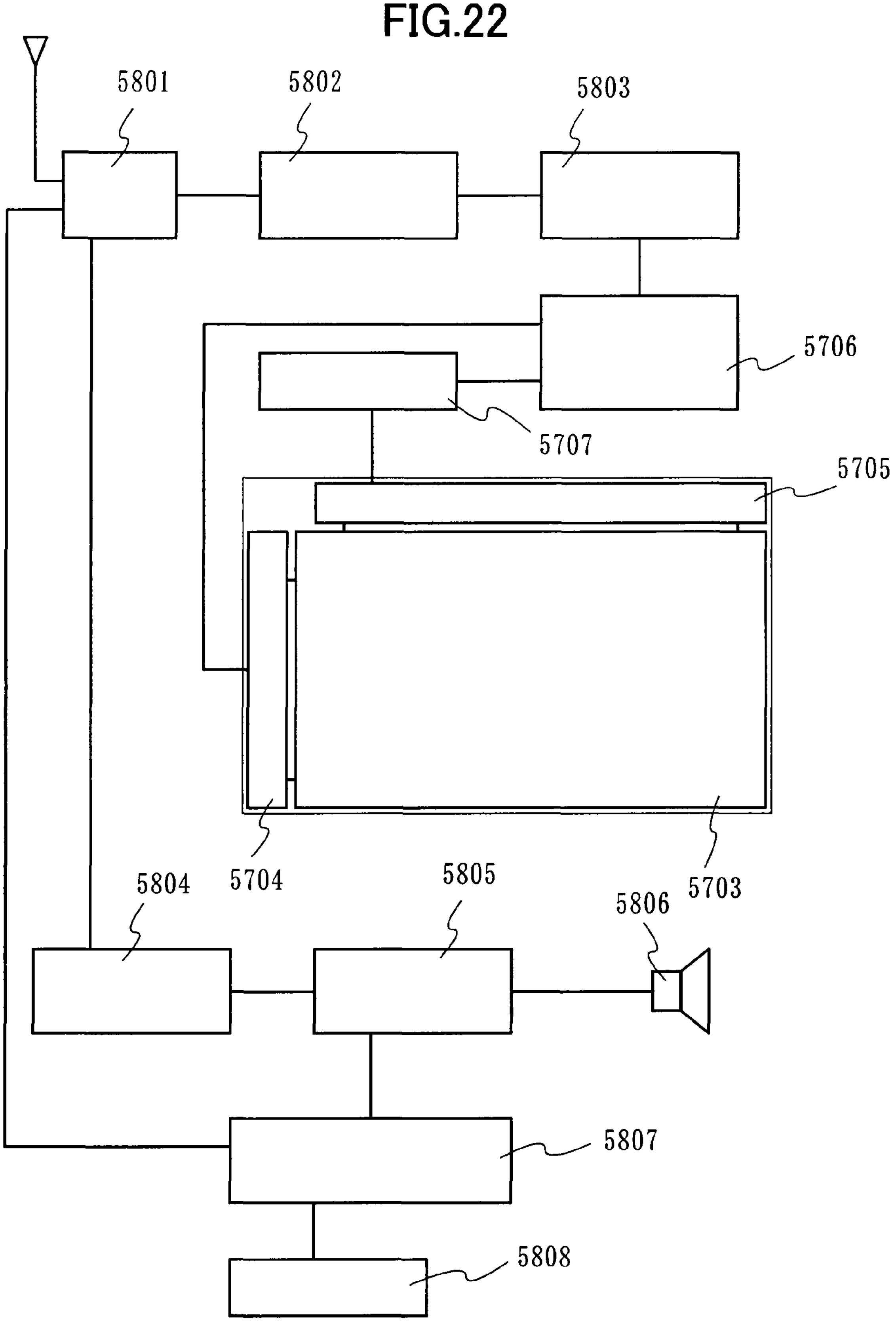
FIG. 22 illustrates a configuration of a display device of the invention.

With such an EL module, an EL television receiver can be completed. FIG. 22 is a block diagram showing the main configuration of an EL Television receiver. A tuner 5801 receives video signals and audio signals. The video signals are processed by a video signal amplifier circuit 5802, a video signal processing circuit 5803 for converting a signal output from the video signal amplifier circuit 5802 into a color signal corresponding to each color of red, green, and blue, and a control circuit 5706 for converting the video signal to be input into a driver circuit. The control circuit 5706 outputs signals to each of the scan line side and the signal line side. In the case of performing digital drive, a signal dividing circuit 5007 may be provided on the signal line side, so as to divide an input digital signal into m signals before being supplied to a pixel portion.

Among the signals received at the tuner 5801, audio signals are transmitted to an audio signal amplifier circuit 5804, and an output thereof is supplied to a speaker 5806 through an audio signal processing circuit 5805. A control circuit 5807 receives control data on a receiving station (reception frequency) or sound volume from an input portion 5808 and transmits signals to the tuner 5801 as well as the audio signal processing circuit 5805.

By incorporating the EL module into a housing, a TV receiver can be completed. A display portion of the TV receiver is formed with such an EL module. In addition, a speaker, a video input terminal, and the like are provided as appropriate.

It is needless to mention that the invention is not limited to the TV receiver, and can be applied to various objects as a display medium such as a monitor of a personal computer, an information display board at the train station, airport, or the like, or an advertisement display board on the street.

In this manner, by using the display device of the invention, fine and high-contrast images can be provided.

Note also that this embodiment mode can be implemented in combination with any of Embodiment Modes 1 to 8 as appropriate.

Embodiment Mode 10

This embodiment mode illustrates examples of an optical sensor and an amplifier.

Figure 39:
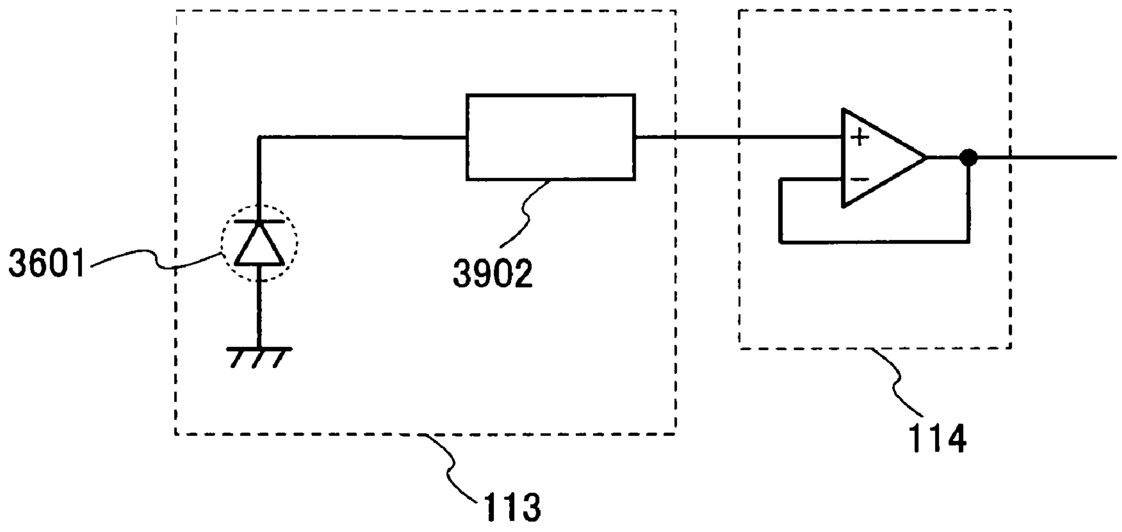
FIG. 39 illustrates a configuration of a display device of the invention.

FIG. 39 shows a basic configuration. When a photoelectric conversion element 3601 is irradiated with light, a current flows therein in accordance with the illuminance. The current is converted into a voltage signal in the current/voltage converter circuit 3902. In this manner, an optical sensor 113 is constructed of the photoelectric conversion element 3601 and the current/voltage converter circuit 3902. A signal output from the optical sensor 113 is input to an amplifier 114. Although FIG. 39 shows an example of a voltage follow circuit using an operational amplifier, the invention is not limited to this.

Figure 36:
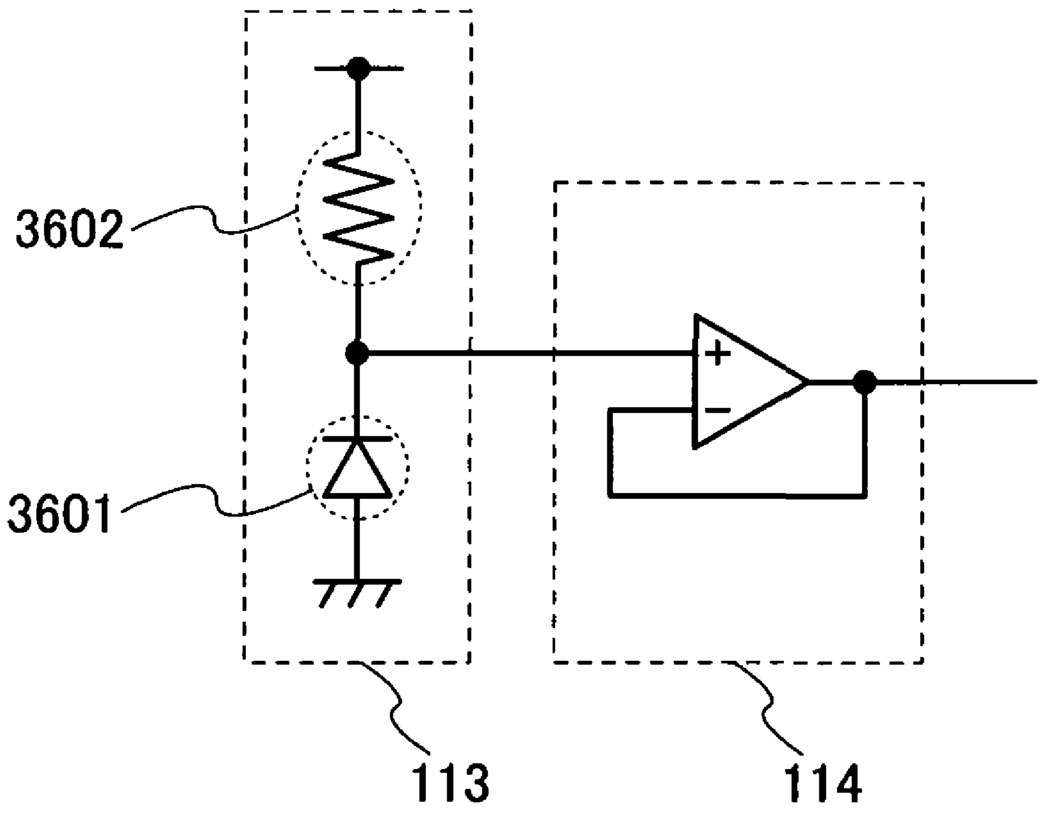
FIG. 36 illustrates a configuration of a display device of the invention.

As an example of the current/voltage converter circuit 3902, a resistor 3602 may be used as shown in FIG. 36. However, the invention is not limited to this. The circuit may be constructed by using an operational amplifier.

Figure 37:
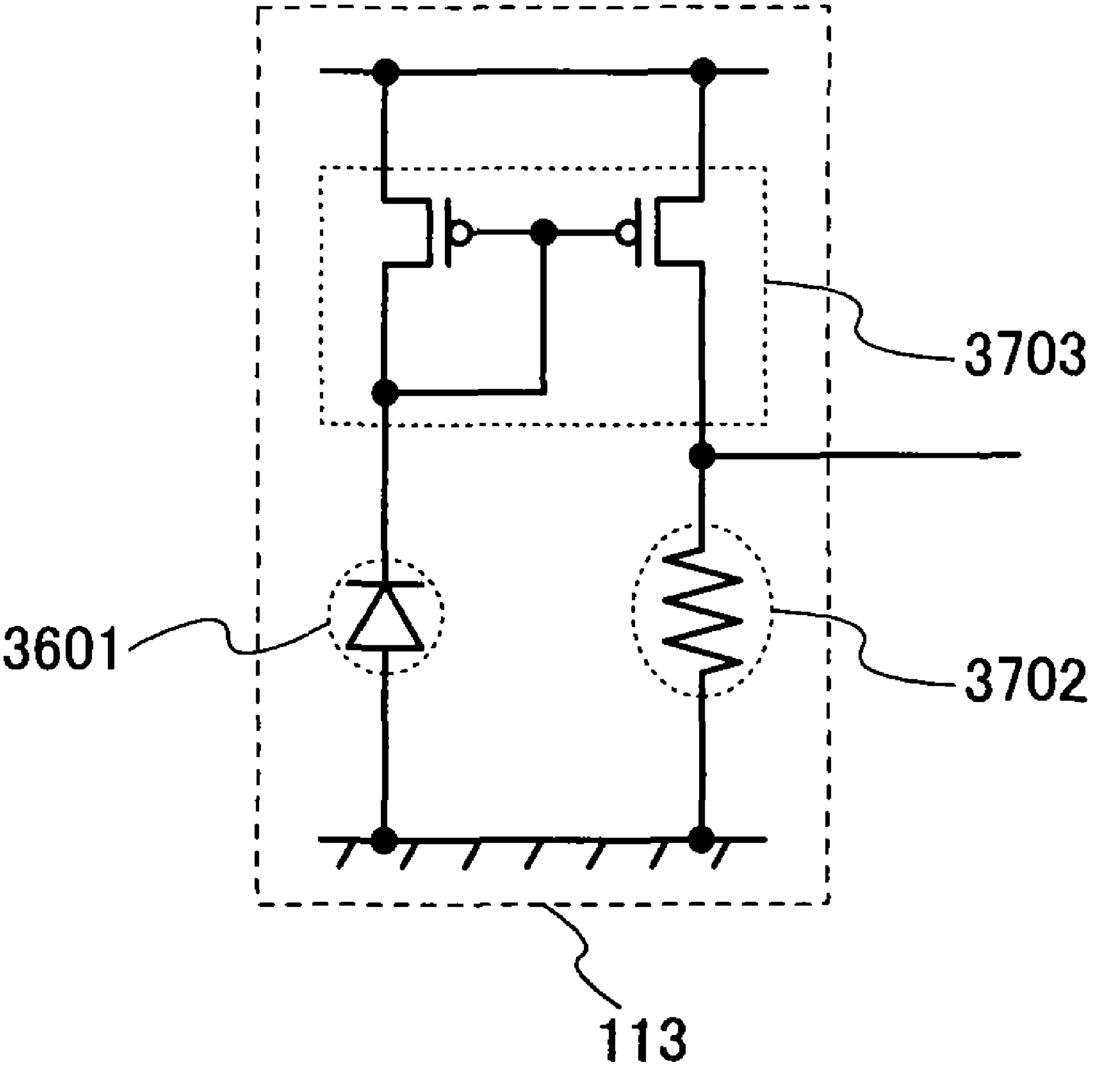
FIG. 37 illustrates a configuration of a display device of the invention.

Although a current flowing through the photoelectric conversion element 3601 is used in FIGS. 39 and 36, the current may be amplified as well. For example, as shown in FIG. 37, a current flowing through a resistor 3702 as a current/voltage converter circuit may be increased by using a current mirror circuit 3703. As a result, light sensitivity can be improved as well as the noise immunity can be improved.

Figure 38:
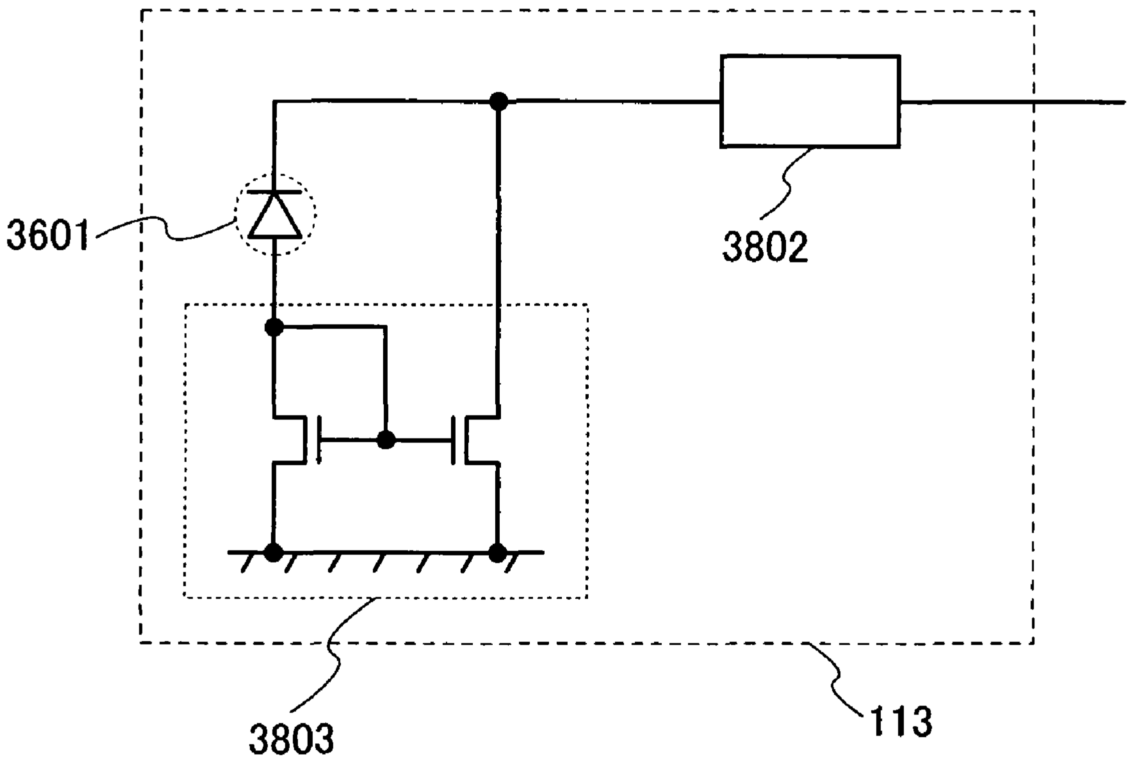
FIG. 38 illustrates a configuration of a display device of the invention.

In addition, as shown in FIG. 38, such a configuration may be employed that a current flowing through the photoelectric conversion element 3601 and a current mirror circuit 3803 is all supplied to a current/voltage converter circuit 3802 so that the light sensitivity can be improved as well as the noise immunity can be improved. With such a configuration, a wire connected to the photoelectric conversion element 3601 is connected to an output of the current mirror circuit; therefore, the number of connecting terminals can be reduced.

Note also that this embodiment mode can be implemented in combination with any of Embodiment Modes 1 to 9 as appropriate.

Embodiment Mode 11

The invention can be applied to various electronic apparatuses. Specifically, the invention can be applied to a display portion of an electronic apparatus. As examples of such an electronic apparatus, there are a video camera, a digital camera, a goggle display, a navigation system, an audio reproducing apparatus (e.g., a car stereo or an audio component set), a computer, a game machine, a portable information terminal (e.g., a mobile computer, a mobile phone, a portable game machine, or an electronic book), an image reproducing device provided with a recording medium (specifically, a device for reproducing a recording medium such as a digital versatile disc (DVD) and having a light-emitting device for displaying the reproduced image), and the like.

Figure 23A:
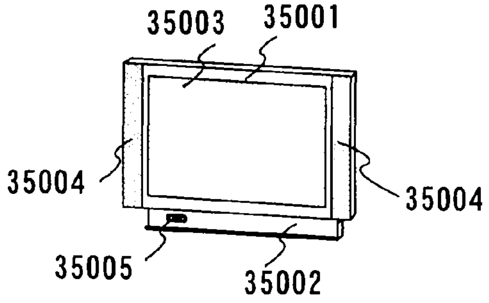
FIGS. 23A to 23H illustrate electronic apparatuses each using the invention.

FIG. 23A shows a light-emitting device which includes a housing 35001, a supporting base 35002, a display portion 35003, speaker portions 35004, a video input terminal 35005, and the like. The display device of the invention can be applied to the display portion 35003. Note that the light-emitting device includes all light-emitting devices for information display, such as a device for a personal computer, television broadcast reception, or advertisement display. With the light-emitting device having the display portion 35003 which employs the display device of the invention, fine and high-contrast images can be provided.

Figure 23B:
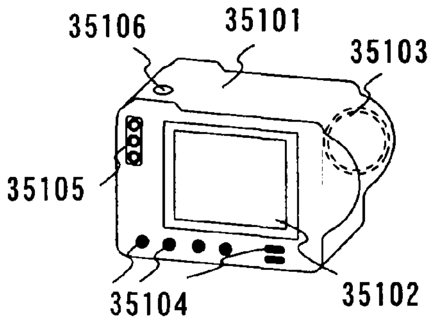

FIG. 23B shows a camera which includes a main body 35101, a display portion 35102, an image receiving portion 35103, operating keys 35104, an external connecting port 35105, a shutter 35106, and the like.

With the digital camera having the display portion 35003 which employs the display device of the invention, fine and high-contrast images can be provided.

Figure 23C:
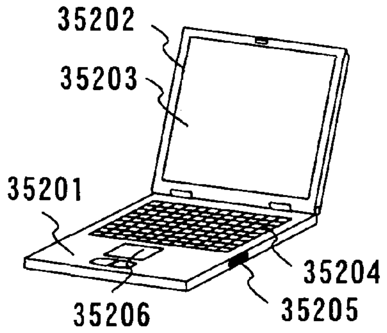

FIG. 23C shows a computer which includes a main body 35201, a housing 35202, a display portion 35203, a keyboard 35204, an external connecting port 35205, a pointing mouse 35206, and the like. With the computer having the display portion 35203 which employs the display device of the invention, fine and high-contrast images can be provided.

Figure 23D:
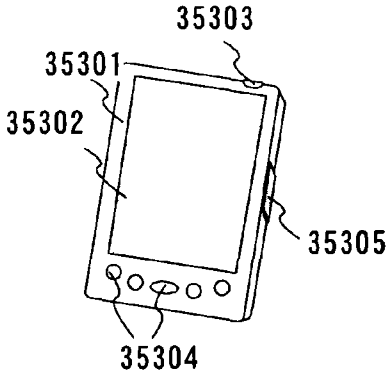

FIG. 23D shows a mobile computer which includes a main body 35301, a display portion 35301, a switch 35303, operating keys 35304, an IR port 35305, and the like. With the mobile computer having the display portion 35302 which employs the display device of the invention, fine and high-contrast images can be provided.

Figure 23E:
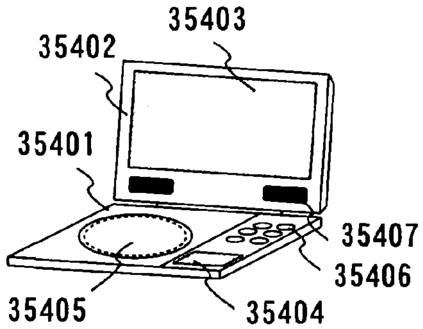

FIG. 23E shows a portable image reproducing device provided with a recording medium (specifically, a DVD reproducing device) which includes a main body 35401, a housing 35402, a display portion A35403, a display portion B35404, a recording medium (DVD) reading portion 35405, an operating key 35406, a speaker portion 35407, and the like. The display portion A35403 can mainly display image data, while the display portion B35404 can mainly display text data. With the image reproducing device having the display portions A35403 and 35404 each of which employs the display device of the invention, fine and high-contrast images can be provided.

Figure 23F:
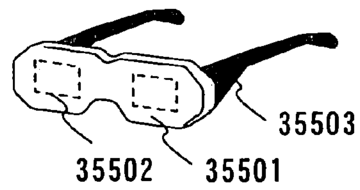

FIG. 23F shows a goggle display which includes a main body 35501, a display portion 35502, and an arm portion 35503. With the goggle display having the display portion 35502 which employs the display device of the invention, fine and high-contrast images can be provided.

Figure 23G:
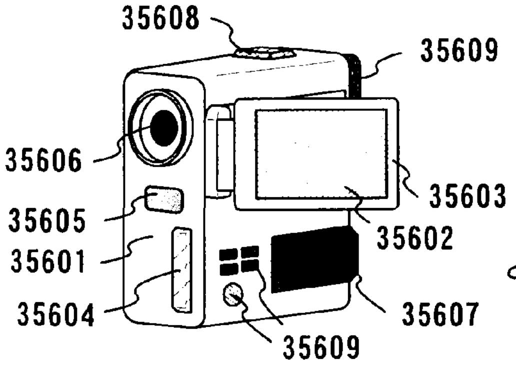

FIG. 23G shows a video camera which includes a main body 35601, a display portion 35602, a housing 35603, an external connecting port 35604, a remote controller receiving portion 35605, an image receiving portion 35606, a battery 35607, an audio input portion 35607, operating keys 35609, and the like. With the video camera having the display portion 35602 which employs the display device of the invention, fine and high-contrast images can be provided.

Figure 23H:
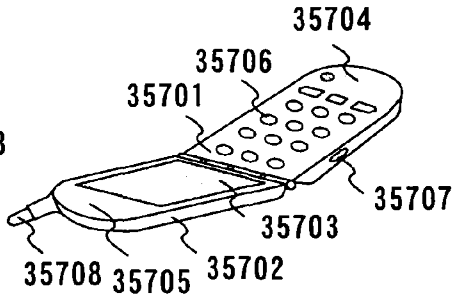

FIG. 23H shows a mobile phone which includes a main body 35701, a housing 35702, a display portion 35703, an audio input portion 35704, an audio output portion 35705, an operating key 35706, an external connecting port 35707, an antenna 35708, and the like. With the mobile phone having the display portion 35703 which employs the display device of the invention, fine and high-contrast images can be provided.

As described above, the applicable range of the invention is so wide that it can be applied to electronic apparatuses of various fields.

The present application is based on Japanese Priority application No. 2005-148833 filed on May 20, 2005 with the Japanese Patent Office, the entire contents of which are hereby incorporated by reference.

What is claimed is:

1. A display device including a matrix arrangement of a plurality of pixels, comprising:
- a source driver;
- a gate driver;
- a video signal generating circuit comprising a level converter circuit; and
- a pixel portion,
- wherein the display device displays at least one of a first image in accordance with a first display mode and a second image in accordance with a second display mode in the pixel portion,
- wherein the first display mode and the second display mode are switched in accordance with an intensity of outside light in such a manner that an analog signal is supplied to the source driver in the first display mode, while a digital signal is supplied to the source driver in the second display mode,
- wherein the video signal generating circuit is configured to supply the analog signal to the source driver by inputting a video signal to a D/A converter in the first display mode,
- wherein the video signal generating circuit is configured to supply the digital signal by supplying only a most significant bit of the video signal to the level converter circuit, and
- wherein the level converter circuit increases a potential level of the digital signal so as to correspond with a potential level of the analog signal.

2. The display device according to claim 1, wherein the display device is an EL display.

3. An electronic apparatus comprising the display device according to claim 1.

4. The display device according to claim 1, wherein the display device is driven by using an analog gray scale method.

5. The display device according to claim 1, wherein the intensity of outside light is detected by an optical sensor.

6. The display device according to claim 1,
- wherein the pixel portion comprises a transistor, and
- wherein the transistor is configured to operate in a saturation region in the first display mode and to operate in a linear region in the second display mode.

7. The display device according to claim 6,
- wherein the transistor comprises an oxide comprising indium and zinc.

8. A display device including a matrix arrangement of a plurality of pixels, comprising:
- a source driver;
- a gate driver;
- a video signal generating circuit comprising a level converter circuit; and
- a pixel portion,
- wherein the display device displays at least one of a first image in accordance with a first display mode and a second image in accordance with a second display mode in the pixel portion,
- wherein the first display mode and the second display mode are switched in accordance with an intensity of outside light in such a manner that an analog signal is supplied to the source driver to be supplied to the pixel portion in the first display mode, while a digital signal is supplied to the source driver to be supplied to the pixel portion in the second display mode,
- wherein the video signal generating circuit is configured to supply the analog signal to the source driver by inputting a video signal to a D/A converter in the first display mode,
- wherein the video signal generating circuit is configured to supply the digital signal by supplying only a most significant bit of the video signal to the level converter circuit, and
- wherein the level converter circuit increases a potential level of the digital signal so as to correspond with a potential level of the analog signal.

9. The display device according to claim 8, wherein the display device is an EL display.

10. An electronic apparatus comprising the display device according to claim 8.

11. The display device according to claim 8, wherein the display device is driven by using an analog gray scale method.

12. The display device according to claim 8, wherein the intensity of outside light is detected by an optical sensor.

13. The display device according to claim 8,
- wherein the pixel portion comprises a transistor, and
- wherein the transistor is configured to operate in a saturation region in the first display mode and to operate in a linear region in the second display mode.

14. The display device according to claim 13,
- wherein the transistor comprises an oxide comprising indium and zinc.

15. A display device including a matrix arrangement of a plurality of pixels, comprising:
- a source driver;
- a gate driver;
- a video signal generating circuit comprising a level converter circuit; and
- a pixel portion,
- wherein the display device displays at least one of a first image in accordance with a first display mode and a second image in accordance with a second display mode in the pixel portion,
- wherein the video signal generating circuit is configured to supply an analog signal to the source driver by inputting a video signal to a D/A converter in the first display mode, wherein the video signal generating circuit is configured to supply the analog signal to the source driver by inputting a video signal to a D/A converter in the first display mode, wherein the video signal generating circuit is configured to supply the digital signal by supplying only a most significant bit of the video signal to the level converter circuit, wherein the level converter circuit increases a potential level of the digital signal so as to correspond with a potential level of the analog signal, and wherein the first display mode and the second display mode are switched in accordance with an intensity of outside light.

16. The display device according to claim 15, wherein the display device is an EL display.

17. An electronic apparatus comprising the display device according to claim 15.

18. The display device according to claim 15, wherein the display device is driven by using an analog gray scale method.

19. The display device according to claim 15, wherein the intensity of outside light is detected by an optical sensor.

20. The display device according to claim 19, further comprising a controller configured to control the video signal generating circuit based on an output of the optical sensor.

21. The display device according to claim 20, further comprising an amplifier configured to amplify an electric signal output from the optical sensor and to supply the amplified signal to the controller.

22. The display device according to claim 15, further comprising:

a display mode controlling circuit; and a binarization circuit.

23. The display device according to claim 15, further comprising:

a display mode control circuit.

24. The display device according to claim 15, wherein the pixel portion comprises a transistor, and wherein the transistor is configured to operate in a saturation region in the first display mode and to operate in a linear region in the second display mode.

25. The display device according to claim 24, wherein the transistor comprises an oxide comprising indium and zinc.

26. A display device including a matrix arrangement of a plurality of pixels, comprising:

a source driver;

a gate driver;

a video signal generating circuit comprising a level converter circuit; and a pixel portion, wherein the display device displays at least one of a first image in accordance with a first display mode and a second image in accordance with a second display mode in the pixel portion, wherein the video signal generating circuit is configured to supply the analog signal to the source driver by inputting a video signal to a D/A converter in the first display mode, wherein the video signal generating circuit is configured to supply the digital signal by supplying only a most significant bit of the video signal to the level converter circuit, wherein the level converter circuit increases a potential level of the digital signal so as to correspond with a potential level of the analog signal, and wherein the first display mode and the second display mode are switched in accordance with an intensity of outside light.

27. The display device according to claim 26, wherein the display device is an EL display.

28. An electronic apparatus comprising the display device according to claim 26.

29. The display device according to claim 26, wherein the display device is driven by using an analog gray scale method.

30. The display device according to claim 26, wherein the intensity of outside light is detected by an optical sensor.

31. The display device according to claim 30, further comprising a controller configured to control the video signal generating circuit based on an output of the optical sensor.

32. The display device according to claim 31, further comprising an amplifier configured to amplify an electric signal output from the optical sensor and to supply the amplified signal to the controller.

33. The display device according to claim 26, further comprising:

a display mode controlling circuit; and a binarization circuit.

34. The display device according to claim 26, further comprising:

a display mode control circuit.

35. The display device according to claim 26, wherein the pixel portion comprises a transistor, and wherein the transistor is configured to operate in a saturation region in the first display mode and to operate in a linear region in the second display mode.

36. The display device according to claim 35, wherein the transistor comprises an oxide comprising indium and zinc.

37. A driving method of a display device including a matrix arrangement of a plurality of pixels, a source driver, and a gate driver, comprising the steps of:

switching between a first display mode and a second display mode in accordance with an intensity of outside light;

supplying an analog signal to the source driver by inputting a video signal to a D/A converter in the first display mode; and supplying a digital signal to the source driver by supplying only a most significant bit of the video signal to a level converter circuit, wherein the level converter circuit increase a potential level of the digital signal so as to correspond with a potential level of the analog signal.

38. The driving method according to claim 37, wherein the display device is driven by using an analog gray scale method.

39. The driving method according to claim 37, wherein the intensity of outside light is detected by an optical sensor.

40. The driving method according to claim 39, further comprising controlling a video signal generating circuit based on an output of the optical sensor by a controller.

41. The driving method according to claim 40, further comprising:

amplifying an electric signal output from the optical sensor by an amplifier; and supplying the amplified signal to the controller.

42. The driving method according to claim 37, wherein each of the plurality of pixels comprises a transistor, wherein the transistor operates in a saturation region in the first display mode, and wherein the transistor operates in a linear region in the second display mode.

43. The driving method according to claim 42, wherein the transistor comprises an oxide comprising indium and zinc.

44. A driving method of a display device including a matrix arrangement of a plurality of pixels in a pixel portion, a source driver, and a gate driver, comprising the steps of:

switching between a first display mode and a second display mode in accordance with an intensity of outside light;

supplying an analog signal to the source driver to be supplied to the pixel portion by inputting a video signal to a D/A converter in the first display mode; and supplying a digital signal to the source driver to be supplied to the pixel portion by supplying only a most significant bit of the video signal to a level converter circuit, wherein the level converter circuit increase a potential level of the digital signal so as to correspond with a potential level of the analog signal.

45. The driving method according to claim 44, wherein the display device is driven by using an analog gray scale method.

46. The driving method according to claim 44, wherein the intensity of outside light is detected by an optical sensor.

47. The driving method according to claim 46, further comprising controlling a video signal generating circuit based on an output of the optical sensor by a controller.

48. The driving method according to claim 47, further comprising:

amplifying an electric signal output from the optical sensor by an amplifier; and supplying the amplified signal to the controller.

49. The driving method according to claim 44, wherein each of the plurality of pixels comprises a transistor, wherein the transistor operates in a saturation region in the first display mode, and wherein the transistor operates in a linear region in the second display mode.

50. The driving method according to claim 49, wherein the transistor comprises an oxide comprising indium and zinc.

* * * * *

UNITED STATES PATENT AND TRADEMARK OFFICE

CERTIFICATE OF CORRECTION

PATENT NO. : 8,059,109 B2
APPLICATION NO. : 11/382622
DATED : November 15, 2011
INVENTOR(S) : Shunpei Yamazaki It is certified that error appears in the above-identified patent and that said Letters Patent is hereby corrected as shown below:

In the Specification:
Column 6, line 6, after "or a layer" replace "13" with "D"

In the Claims:
Column 37, lines 1-4 (claim 15), delete "wherein the video signal generating circuit is configured to supply the analog signal to the source driver by inputting a video signal to D/A converter in the first display mode,"

Signed and Sealed this
Twenty-seventh Day of March, 2012

David J. Kappos
*Director of the United States Patent and Trademark Office*